US009176951B2

(12) United States Patent  (10) Patent No.: US 9,176,951 B2
Patrudu  (45) Date of Patent: Nov. 3, 2015

(54) MECHANISM AND SYSTEM FOR REPRESENTING AND PROCESSING ACTIVITY MODELS

(71) Applicant: Pilla Gurumurty Patrudu, Plainville, MA (US)

(72) Inventor: Pilla Gurumurty Patrudu, Plainville, MA (US)

(*) Notice: Subject to any disclaimer, the term of this patent is extended or adjusted under 35 U.S.C. 154(b) by 366 days.

(21) Appl. No.: 13/851,168

(22) Filed: Mar. 27, 2013

(65) Prior Publication Data

US 2013/0268258 A1  Oct. 10, 2013

Related U.S. Application Data

(60) Provisional application No. 61/686,349, filed on Apr. 4, 2012.

(51) Int. Cl.
*G06F 9/44* (2006.01)
*G06F 9/45* (2006.01)
*G06F 17/28* (2006.01)
*G06N 5/02* (2006.01)

(52) U.S. Cl.
CPC . *G06F 17/28* (2013.01); *G06N 5/02* (2013.01)

(58) Field of Classification Search
CPC ... G06Q 10/06; G06Q 10/10; G06Q 10/0633; G06F 8/10; G06F 8/20; G06F 8/24; G06F 8/355; G06F 17/28
See application file for complete search history.

(56) References Cited

U.S. PATENT DOCUMENTS

| | | | |
|---|---|---|---|
| 6,370,681 B1 | 4/2002 | Dellarocas | |
| 7,065,493 B1 | 6/2006 | Homsi | |
| 7,191,429 B2 | 3/2007 | Brassard | |
| 7,289,966 B2 | 10/2007 | Ouchi | |
| 7,506,302 B2 | 3/2009 | Bahrami | |
| 7,676,539 B2 | 3/2010 | Jhoney | |
| 8,117,233 B2 | 2/2012 | Liu | |
| 8,250,521 B2 | 8/2012 | Zhang | |
| 8,452,714 B2 | 5/2013 | Matichuk | |
| 8,468,244 B2* | 6/2013 | Redlich et al. | 709/225 |
| 8,473,263 B2* | 6/2013 | Tolone et al. | 703/2 |
| 8,671,021 B2* | 3/2014 | Maharajh et al. | 705/14.66 |
| 8,805,270 B2* | 8/2014 | Maharajh et al. | 455/3.01 |
| 2002/0170035 A1* | 11/2002 | Casati et al. | 717/127 |
| 2005/0038687 A1* | 2/2005 | Galdes | 705/9 |
| 2009/0006997 A1* | 1/2009 | Jiang et al. | 715/771 |
| 2009/0254572 A1* | 10/2009 | Redlich et al. | 707/10 |
| 2012/0215560 A1* | 8/2012 | Ofek et al. | 705/3 |

OTHER PUBLICATIONS

Stern et al., Population of a knowledge base for news metadata from unstructured text and web data, Jun. 2012, 6 pages.*
Dupplaw et al., A distributed, service-based framework for knowledge applications with multimedia, Nov. 2009, 29 pages.*

(Continued)

*Primary Examiner* — Thuy Dao

(57) ABSTRACT

This invention (KBM), extends the concept called color, of my previous invention KB (ref-1), to cover process oriented concepts, and linguistic notions. Colors of KBM are now capable of depicting a very wide variety of scenarios of information, biological, and mechanical systems. KBM provides a novel framework (called DSC) for operational modeling, which can be used to compose larger process structures from small process structures. KBM also provides a novel framework for model checking, and for planning a workflow. Thus, KBM may be used to build and execute complex workflows.

17 Claims, 31 Drawing Sheets

(56) References Cited

OTHER PUBLICATIONS

Figure 1:
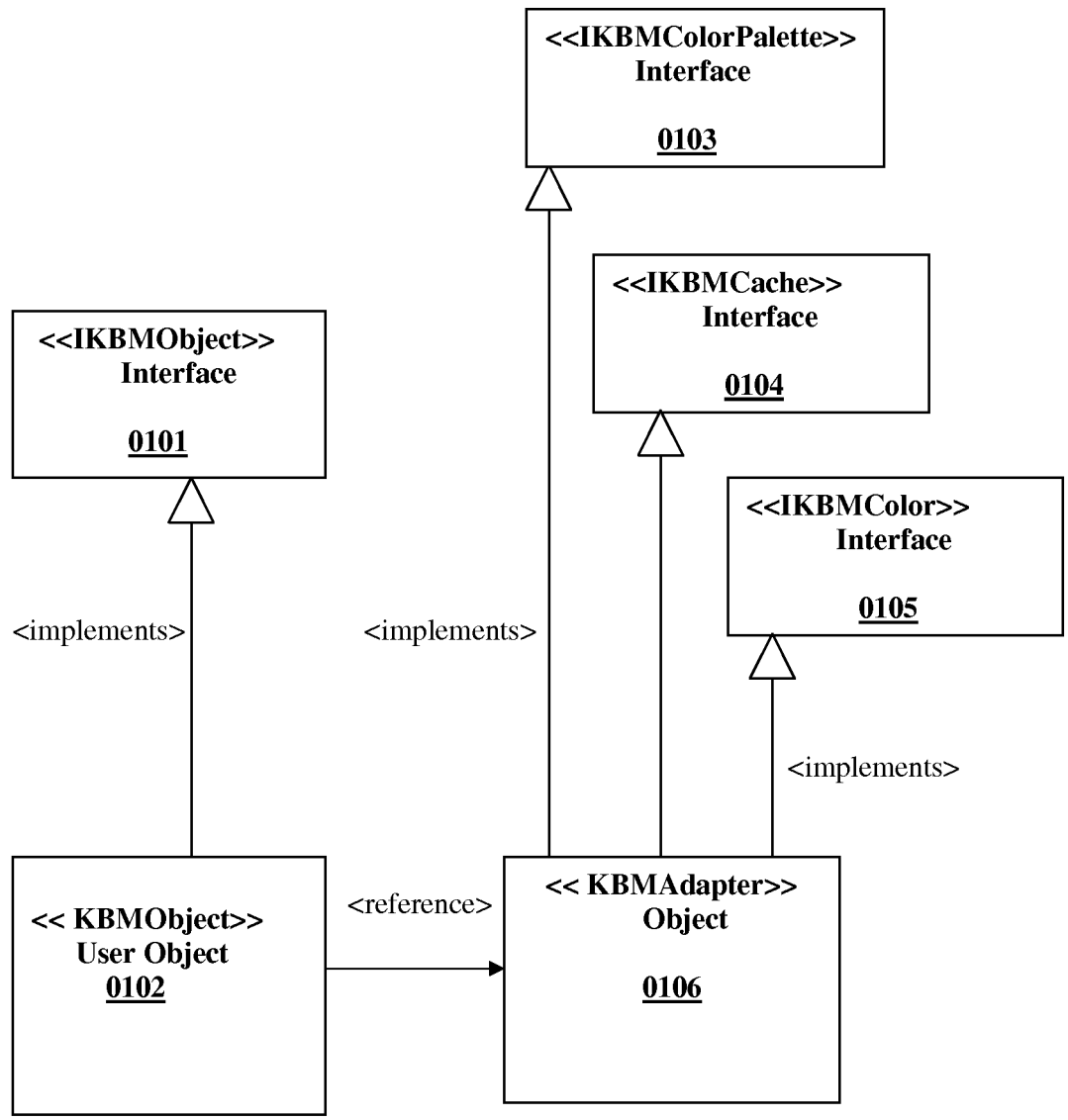

Viorica Chifu, Ioan Salomie, A Fluent Calculus Approach to Automatic Web Service Composition, Advances in Electrical and Computer Engineering, Date 2009, pp. 75-83, vol. 9, No. 3, ISSN:1582-7445.

Rajesh Thiagarajan, Markus Stumptner, and Wolfgang Mayer, SemanticWeb Service Composition by Consistency-based Model Refinement, APSCC 2007,Date 2007, pp. 336-343, ISBN:0-7695-3051-6.

Shankar R. Ponnekanti and Armando Fox Sword: A Developer Toolkit for Web Service Composition, in Proceedings of the 11th International WWW Conference (WWW2002), Date 2002, pp. 1-19.

Peter Bartalos, M'aria Bielikov'a, Automatic Dynamic Web Service Composition: A Survey and Problem Formalization, Computing and Informatics, Date 2011, pp. 793-827, vol. 30, No. 4.

Ibrahima Kalil Toure, Yang Yang2 and Shariq Hussain, Survey on Services Composition Synthesis Model, IJCSI International Journal of Computer Science Issues, date Jan. 2013, pp. 754-763, vol. 10, Issue 1, No. 3.

Florian Lautenbacher, Bernhard Bauer, A Survey on Workflow Annotation & Composition Approaches, Proceedings of the Workshop on Semantic Business Process and Product Lifecycle Management (SemBPM) in the context of the European Semantic Web Conference (ESWC), Date Jun. 7, 2007, pp. 12-23, Innsbruck, Austria.

Kalpesh Lad, Trupti Manik, Comparison of Approaches of Semantic Web Service Composition, International Journal of Comp. Sci. and Management Research, Date Feb. 2013, pp. 1521-1524, vol. 2 Issue 2.

Jinghai Rao and Xiaomeng Su, A Survey of Automated Web Service Composition Methods, SWSWPC date 2004, pp. 43-54, ISBN:3-540-24328-3, ISBN:978-3-540-24328-1, San Diego, CA, USA.

Xudong Song ,Wanchun Dou, Jinjun Chen, A workflow framework for intelligent service composition, Future Generation Computer Systems 27(2011), Date May 2011, pp. 627-636, vol. 27 Issue 5, Elsevier Science Publishers.

Joachim Peer Web Service Composition as AI Planning—a Survey Technical Report, Univ. of St. Gallen, Date Mar. 22, 2005, pp. 1-63.

* cited by examiner

```
<ENTITYMAP>

<ABSTRACTID> Abstract-id </ABSTRACTID>

<COLORMAP>
    <COLORMAPENTRY>
      <COLORPREFIX>        %prefix-              </COLORPREFIX>
      <COLORNAME>          color-name            </COLORNAME>

<RULEBASED>          true | false          </RULEBASED>
      <REEVALRULE>         true |  false         </REEVALRULE>
      <KBMRULE>            lhs of kbm rule       </KBMRULE>

<COLORINFOENTRY>     Entity Proc Name      </COLORINFOENTRY>
      <COLORINFOENTRY>     method for init       </COLORINFOENTRY>
      <COLORINFOENTRY>     color of method       </COLORINFOENTRY>

<COLORPARMS>
        <TARGETNAME>       </TARGETNAME>
        <TARGETPARMS>      </TARGETPARMS>
      </COLORPARMS>
      -    -    -    -    -    Repeat COLORPARMS
    </COLORMAPENTRY>
    -    -    -    -    -    Repeat  COLORMAPENTRY
  </COLORMAP>

<INTERFACEMAP>
    <INTFMAPENTRY> intf-001 </INTFMAPENTRY>
    -    -    -    -    -    Repeat  INTFMAPENTRY
  </INTERFACEMAP>

<EVENTMAP>
    <EVENTMAPENTRY>
      <EVENTNAME>                </EVENTNAME>
      <EVENTHANDLERCLASS>        </EVENTHANDLERCLASS>
      <EVENTHANDLERMETHOD>       </EVENTHANDLERMETHOD>
    </EVENTMAPENTRY>
    -    -    -    -    -    Repeat  EVENTMAPENTRY
  </EVENTMAP>

</ENTITYMAP>
```

Figure – 03

```
<InteractionMap>

<Name>      name of Interaction Map          </Name>

<ARG>       name of Abstract Rule Graph      </ARG>

<MapEntry>

<AuxRule>
            AbstractEntity.%tax-taxonomy_id.%aux-auxiliary_color.token
                              - or -
            AbstractEntity.%tax-taxonomy_id.%aux-auxiliary_color * . . . *
            AbstractEntity.%tax-taxonomy_id.%aux-auxiliary_color
      </AuxRule>

<SemRule>
            AbstractEntity.SemanticRole.method+method_colors
                              - or -
            Abstract rule graph (ARG)
      </SemRule>

</MapEntry>

-    -    -  more map entries

</InteractionMap>
```

Figure - 04A

```
<ProcessSemantics>

<Name>   name of process semantics object  </Name>

<MapEntry>

<SemRule>
                AbstractEntity.SemanticRole.method+method_colors
        </SemRule>

<KBMRule>
               kbm rule + verb color
        </KBMRule>

</MapEntry>

-     -     -     -    -   more map entries

</ProcessSemantics>
```

Figure - 04B

| Name | String | 0601 |
|---|---|---|
| Type | String | 0602 |
| Abstract-id | String | 0603 |
| IKBMColorPalette | Object | 0604 |
| Ref | Object | 0605 |
| Components | Vector <KBMCPTObject> | 0606 |
| Ports | Vector <KBMCPTObject> | 0607 |
| Fluents | Vector <KBMCPTObject> | 0608 |
| Functions | Vector <FunctionEntry> | 0609 |

Figure – 06A

```
<RULEGRAPH>
    <NAME>      rule-graph-name       </NAME>
    <TYPE>      abstract / normal     </TYPE>
    <NODES>
        <NODE ID=node-id>
            <KBMRULE >       kbm rule              </KBMRULE>
            <ARCRULE>        kbm rule (optional)   </ARCRULE>
            <ARC  name=arc-name  type=arc-rule| node-rule>
            <VALUE> arc value (situation of rule-node) </VALUE>
                <KBMRULE > kbm rule (optional)  </KBMRULE>

<NEXTNODE> node-id </NEXTNODE>
            </ARC>
                            -     -     - repeat arcs
        </NODE>
                            -     -     - repeat nodes
    </NODES>
    <PATHS>
        <PATH  name=path-name>
            <NODELIST>
                nodeid.arcname.nodeid . . . nodeid
            </NODELIST>
            <SITUATIONS>
                <SITUATION>
                    <NAME> name </NAME>
                    <KBMRULE type="abstract | normal">
                        kbm rule
                    </KBMRULE>
                    <GRAPHSTATE  name=state-name>
                        desired/special/complex-1/complex-2
                    </GRAPHSTATE>
                    <EFFECTS>
                       <EFFECT  Type= Operational | Conceptual>
                            Effect rules    (for type = operational)
                            Mu-Functions   (for type = conceptual)
                       </EFFECT>
                                  -     -     - repeat effect
                    </EFFECTS>
                </SITUATION>
                       -    -    - repeat situations
            </SITUATIONS>
        </PATH>
                   -    -    - repeat paths
    </PATHS>
</RULEGRAPH>
```

Figure - 07

```
<GEAR>
    <NAME>    gear-name    </NAME>
    <NODES>
        <NODE ID=node-id>
            <RULEGRAPH PKG=pkg-name>
                kbm rule graph
            </RULEGRAPH>
            <ARC name=arc-name>
                <GRAPHSTATENAME>
                    graph-state-name
                </GRAPHSTATENAME>
                <NEXTNODE> node-id </NEXTNODE>
            </ARC>
                            -   -   - repeat arcs
        </NODE>
                            -   -   - repeat nodes
    </NODES>

<PATHS>
        <PATH name=path-name>
            <NODELIST>
                nodeid.arcname.nodeid . . . nodeid
            </NODELIST>
            <GEARSTATE name=state-name>
                desired/special/complex-1/complex-2
            </GEARSTATE>
            <EFFECTS>
               <EFFECT Type=Operational | Conceptual >
                    Effect rules    (for type = operational)
                    Mu-Functions (for type = conceptual)
               </EFFECT>

-   -   - repeat effect
            </EFFECTS>
        </PATH>
                            -   -   -   repeat paths
    </PATHS>
</GEAR>
```

Figure - 08

```
<ACTIVITYOM>
    <NAME> activity-name </NAME>
    <NODES>
        <NODE ID=node-id>
            <GEAR  PKG=pkg-name>
                kbm gear name
            </GEAR>
            <ARC  name=arc-name>
                <GEARSTATENAME>
                    gear-state-name
                </GEARSTATENAME>
                <NEXTNODE> node-id </NEXTNODE>
            </ARC>
                            -   -   - repeat arcs
        </NODE>
                            -   -   - repeat nodes
    </NODES>
    <PATHS>
        <PATH  name=path-name>
            <NODELIST>
                nodeid.arcname.nodeid . . . nodeid
            </NODELIST>
            <ACTIVITYSTATE  name=state-name>
                <TYPE>  desired/special   </TYPE>
                <WORKFLOWQUEUENAME>
                    logical-workflow-queue-name
                </WORKFLOWQUEUENAME>
                <WORKFLOWRECORD>
                    activity-failure-record or object
                </WORKFLOWRECORD>
            </ACTIVITYSTATE>
        </PATH>
                    -   -   -   repeat paths
    </PATHS>
    <MPCOLORMAP>
        <ENTRY>
            <MPCOLOR> mode of processing color name </MPCOLOR>
            <PROCESSCTLS> process controls object </PROCESSCTLS>
        </ENTRY>
                    -   -   -   repeat entries
    </MPCOLORMAP>
</ACTIVITYOM>
```

Figure-09A

```
<ACTIVITYCM>
    <NAME> activity-name </NAME>

<PLANNINGGEAR  PKG=pkg-name>
        <NAME>    kbm-planning-gear-name    </NAME>

<DISPCOLORMAP>
            <ENTRY>
                <GEARSTATENAME>
                    gear-state-name
                </GEARSTATENAME>
                <DISPCOLOR> disposition color name </DISPCOLOR>
            </ENTRY>
            -       -      - repeat Entry
        </DISPCOLORMAP>
    </PLANNINGGEAR>

<MACROENTITIES>
        <ENTITY>   entity name </ENTITY>
        -       -      - repeat entities
    </MACROENTITIES>

</ACTIVITYCM>
```

Figure - 09B

```
<ACTIVITYDEP>

<NAME> activity-name </NAME>

<OCONTEXT>
        <CDESCID>  Collaboration descriptor id    </CDESCID>

<ENTRY>
            <PKG>              package name  </PKG>
            <TYPE>             Entity type    </TYPE>
            <COLORS>           KB colors      </COLORS>
            <ABSTRACTID>       abstract id    </ABSTRACTID>
            <TAXONOMY>         taxonomy       </TAXONOMY>
        </ENTRY>

-    -    - repeat ENTRY

</OCONTEXT>

<DEFAULTMPCOLOR>
         default - mode of processing color
    </DEFAULTMPCOLOR>

<INPUTREQ>
       <INPUTREQENTRY>    field name   </INPUTREQENTRY>

-    -    - repeat INPUTREQENTRY

<INPUTREQ>

</ACTIVITYDEP>
```

Figure – 09C

```
<WORKFLOW>

<NAME> workflow name </NAME>

<SEQ>
        <ACTIVITY>
            <NAME>      activity name </NAME>
            <MPCOLOR>   mode of processing color </MPCOLOR>
        </ACTIVITY>
    </SEQ>

<CONCUR>
        <ACTIVITY>
            <NAME>      activity name </NAME>
            <MPCOLOR>   mode of processing color </MPCOLOR>
        </ACTIVITY>
            -       -       -     repeat activity
    </CONCUR>

-       -       - repeat SEQ or CONCUR elements

</WORKFLOW>
```

Figure- 10

|←Existing→|← - - - - - - - - - - - - - - - Current Invention - - - - - - - - - - - - - - - →|

| Existing Fields of KB Rules Table (Fig-11) of Ref #1 | Unique Rule Id 1101 | Group Rule Id 1102 | Type of Output 1103 | Type & Name of color 1104 | Effect Rule 1105 | Function Handler Class Name 1106 |
|---|---|---|---|---|---|---|
| | | | | | | |
| | | | | | | |
| | | | Boolean or Object | Eg: ctg-Seasonal | | |
| | | | | | | |
| | | | | | | |
| | | | | | | |

Figure- 11

| Structural Rule Id | Structural Rule Specification |
|---|---|
| 1201 | 1202 |
| | |
| | |
| | |
| | |

Figure – 12

| Data Set Name | Object Instances |
|---|---|
| Data set – 1 | Instances Vector |
| Data set – 2 | Instances Vector |
| . . . | . . . |
| Data set - n | Instances Vector |
| Temp – 1 : | Instances Vector |
| Temp – 2 : | Instances Vector |
| . . . | . . . |
| Temp – n : | Instances Vector |
| Save | Instances Vector |

Figure – 14

| Entity Type 1501 | Old Functional Color(s) 1502 | Process Structure Type 1503 | Process Structure Name + Process Execution color name 1504 | New Functional Color 1505 | Transformation Color 1506 |
|---|---|---|---|---|---|
| | | | | | |
| | | | | | |
| | | | | | |
| | | | | | |
| | | | | | |
| | | | | | |

Figure – 15

```
<MACROENTITY>

<NAME> name of macro entity </NAME>

<ASPECTS>
        <ASPECT>
            <NAME> aspect name  </ASPECT>
            <ASPECTRULES>
                <RULE  STATEID=num>  kbm rule  </RULE>
                <RULE  STATEID=num>  kbm rule  </RULE>

-      -      -      more kbm rules

</ASPECTRULES>
        <ASPECT>

-      -      -      more aspects

</ASPECTS>

<MACROENTITY>
```

Figure-17

| Workflow Execution ID 1901 | Type 1902 | Workflow/ Activity Name 1903 | Start Time-Stamp 1904 | End Time-Stamp 1905 | Status 1906 |
|---|---|---|---|---|---|
| | Workflow or Activity | | | | |
| | | | | | |
| | | | | | |
| | | | | | |
| | | | | | |
| | | | | | |
| | | | | | |
| | | | | | |

Figure-19

| Activity name | Disposition | Mode of processing | Start Macro Entity Aspect Vector | Target Macro Entity Aspect Vector | Control Macro Entity Aspect Vector |
|---|---|---|---|---|---|
| <u>2201</u> | <u>2202</u> | <u>2203</u> | <u>2204</u> | <u>2205</u> | <u>2206</u> |
| | | | | | |
| | | | | | |
| | | | | | |
| | | | | | |
| | | | | | |
| | | | | | |
| | | | | | |
| | | | | | |
| | | | | | |
| | | | | | |

Figure - 22

| Type of Process Structure 2501 | Starting Process Structure + process execution color + model color 2502 | List of Target Process Structures + process execution color + model color 2503 |
|---|---|---|
| Activity or Gear or Rule-Graph | | |
| | | |
| | | |
| | | |

Figure – 25

MECHANISM AND SYSTEM FOR REPRESENTING AND PROCESSING ACTIVITY MODELS

CROSS-REFERENCE TO RELATED APPLICATIONS

This application is entitled to the benefit of provisional patent application No. 61/686,349 filed on Apr. 4, 2012, and is incorporated in its entirety herewith.

BACKGROUND

1. Field of Invention

This invention is related to the computing domain for representing and processing activity models of a broad range of systems like information systems, mechanical systems and biochemical systems.

2. Description of Prior Art

The essence of all human endeavors lies in action. The Hindu God, Shiva, is referred to as "Laya Kara"; which means the force behind all actions. The Sanskrit word "Laya" strictly means commotion. Action therefore is not just an endeavor, but also a means to signify our existence. Western philosophers studied action mechanisms rigorously, and the essence of these studies, characterize action both as a linguistic phenomenon and as a philosophical notion. Computing is equally absorbed in actions, and their compositions into activities.

Activity modeling was studied extensively in prior art, Unified Modeling Language, UML (ref-4), may be considered as the condensed extract of most of the past research efforts. Business Process Execution Language, BPEL (ref-5) was a more recent effort, and may be considered as a fair standard of modeling services. DAML-S (ref-6) describes process ontology.

UML was originally conceived as a model documentation language, and although executable programs could be derived from it, UML lacks robust mechanisms for composing actions and interactions. Many of the modeling techniques of UML may be viewed as belonging to the class of flow-charting/documentation technique.

BPEL is largely related to service orchestration, and is a coarse activity modeler, where activities are used as elements to derive larger constructs, which may be called tasks. BPEL does not address the fine-grained process constructs, which may be viewed as a severe limitation of the technology.

DAML-S and its derivatives are high-level modelers, which utilizes Ontology's. The power of DAML-S was derived from ontology's, which is the combined effort of several industries & universities, and will probably remain unmatched for a long time. The inventor believes that DAML-S has laid too much emphasis in set theoretic relations, and although these are essential (like vitamins to humans), they are not the complete set of concepts, upon which actions depend upon.

The inventor believes that First Order Logic (popularly known as FOL) upon which Ontology's (including DAML-S) depend does not put any restrictions on qualities of objects. Technically speaking, there is not a straw of guidance to the developer or end user, on how the technology may be utilized. This leads to the well-known syndrome of reinventing the wheel, whenever and wherever it is required. Computing unlike other branches like mechanical, electrical engineering is plagued by re-inventions of concepts and mechanisms.

The inventor believes that the absence of proper lingua-franca is a severe limitation of DAML-S, and other ontology's, which could affect the efforts to standardize concepts and mechanisms. In lay man's terms, the battle is in the realm of representation, rather than in the realm of reasoning, which is fairly rigid.

Aristotle may be first person to describe categories (ref-3), and to ascribe Categories to objects. Aristotle was criticized for this astounding work, as the "Categories" are regarded as incomplete to address all needs. The inventor believes that Ontology's, which is extensively researched today, is a continuation of the work of Aristotle Categories.

It may be noted that Categorization, simplifies reasoning many folds. For example, we need not discover by applying logic, "whether a dog flies", since we know that dog is a mammal and cannot fly. In other words, once we have a set of generic Objects, and establish their categories and properties, we could easily discover the capabilities of other objects, by mapping the object to one of the categories already established.

The current invention is referred to as "Knowledge Base Modeler or KBM", and relies upon my previous invention called KB (ref-1). KBM provides an extraordinary number of generic concepts, specifically derived from linguistics and process engineering, to depict complex process models. The following example, which arose from many years of my research in this area (ref-2), provides a greater insight into the above comments.

Let us consider that a molecule A, is bound to another molecule P, by some action. Let us further assume that molecule A has undergone a change in form (structure change), characteristics (acidic to basic), a model change (structure of internal components, like appearance/disappearance of receptors, or their reactivity), a functional change indicating its latest capabilities like hydrophobic, or hydrophilic, a disposition like what the molecule were to become in later stages of the activity, a transformation like how the molecule transformed till now, during successive actions of the activity. Further, we may select the molecule A, in a later stage of the activity, if it had undergone particular transformations, and/or had particular functional capabilities, like being hydrophilic.

It may be argued that KBM and DAML-S are complementary efforts, as KBM is absorbed in concept representation and transformation, whereas DAML-S (to the best of inventors opinion) is absorbed in reasoning about concepts.

Modeling is a complex process, as it needs to address simultaneously, the low-level concepts detailed above, and high-level notions, which are related to machinery vs material interactions.

Modeling may be broadly segmented into Operational Modeling (low level modeling), Conceptual Modeling (high level modeling), and Abstract Modeling (highest level). Recent research efforts in computing are attempting to address the disconnectedness that exists between operation models and conceptual models. Model driven architecture MDA (ref-7), may be viewed as such an exercise.

Computational Linguistics approached the same subject, from a different viewpoint, and was more successful in providing rigorous models than pure computing. The work of Panini (ref-8) stands out, both as an exemplary art, and as an easily adaptable technique. The inventor believes that Panini's thematic roles are more suitable, for depicting interactions and actions generically, than MDA.

My previous invention KB (ref-1), provides novel mechanisms, for representation and processing rules, and works in conjunction with a varied number of host languages like java (ref-14), and C++ (ref-13).

KB (ref-1) defines a set of color types, and specific instances of these colors may be applied to entities. The important color types of KB are described below.

a) verb color for depicting operations, or roles.

b) noun color for depicting form.

c) auxiliary color for depicting the navigation path (or path of containment).

d) special color for executing methods of predefined objects.

KB Rules are defined in terms of entity types, which are adorned with KB colors. KB Translator translates these KB rules into equivalent host language statements.

KB (ref-1) belongs to a class of programming languages called "Descriptive Languages", as opposed to popular languages like java and C++ which are procedural in nature. In spite of the impedance mismatch, KB Rules are embedded in host language methods.

The power or advantage of KB may be described as:

a) ability to conceptualize basic lingua franca b) ability to execute rules, which are based on these basic concepts.

The drawbacks or limitations of KB, may be described as:

a) Conceptual notions used by KB like verb color, noun color, auxiliary color are very basic, where as typical application processing demands complex notions.

b) KB did not concentrate on "Integration", which is a key element for architecting and building complex information models. Although KB provides a mechanism to execute methods using the special color, it is too naïve, and lacks robustness to execute complex rules, and to integrate the results, back into the current rule.

Thus, in spite of the domain knowledge of various systems, producing a transformable activity model, which depicts or knits the multiple layers of the activity model, into a coherent system, is still elusive, and unknown in prior art. The term transformable activity model here means a mechanism and/or a tool, by which an activity model may be converted into executable code.

SUMMARY

The present invention aims at—

1) Providing a "Representation Mechanism" or lingua franca, called reference colors, complex colors, process colors, and conceptual colors, which could be employed to depict the existence and transformation of entities.

2) Providing a "Representation Mechanism" to depict rules called KBM Rules based on the rule processing mechanisms of KB (ref-1), and by utilizing the new classes of colors described above, which are, reference colors, complex colors, process colors, and conceptual colors.

3) Providing mechanisms for composing KBM Rules (actions) into KBM Rule Graphs, KBM Gears and KBM Activities, and finally into complex work flows. It may be noted that the composition of Rules into complex processes is done at several levels. The lowest level of composition is called "Rule Integration".

4) Providing mechanisms for conceptualization of an activity, and generating a plan i.e workflow from a given initial and goal state.

5) Generating code from the descriptions of KBM Rules, KBM Rule Graphs, KBM Gears, and KBM Activities, and providing runtime support for executing workflows, thereby automating the lengthy and most haphazard traditional software models, into easy to understand, and well-controlled software models.

OBJECTIVES AND ADVANTAGES

Several objectives and advantages of the present invention are:

1) Ability to describe activity models using high-level notions, derived from process knowledge and linguistics, whereby real world process scenarios may be captured more easily and efficiently.

2) Ability to generate code from the activity models, reducing development time and effort.

3) Ability to easily integrate and/or work concurrently with existing object oriented systems, without any major transitioning.

DRAWING FIGURES

In the drawings, closely related figures have the same number but different alphabetic suffix.

Figure 2:
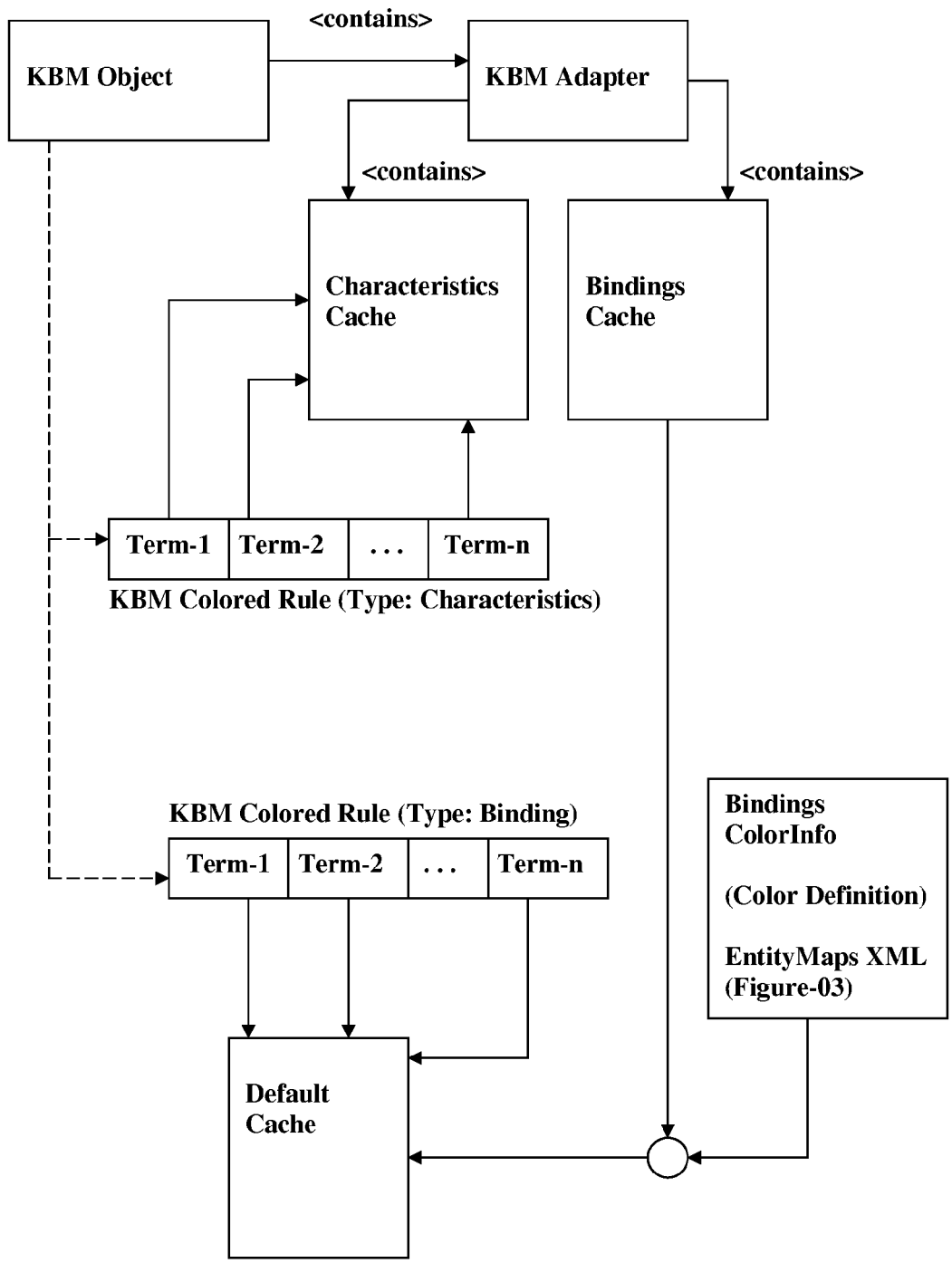
Figure 13:
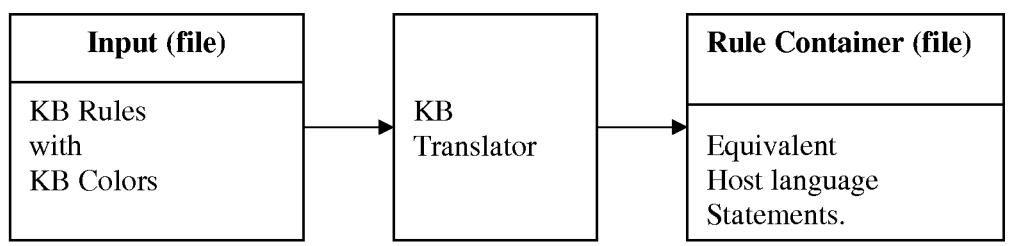
Figure 18:
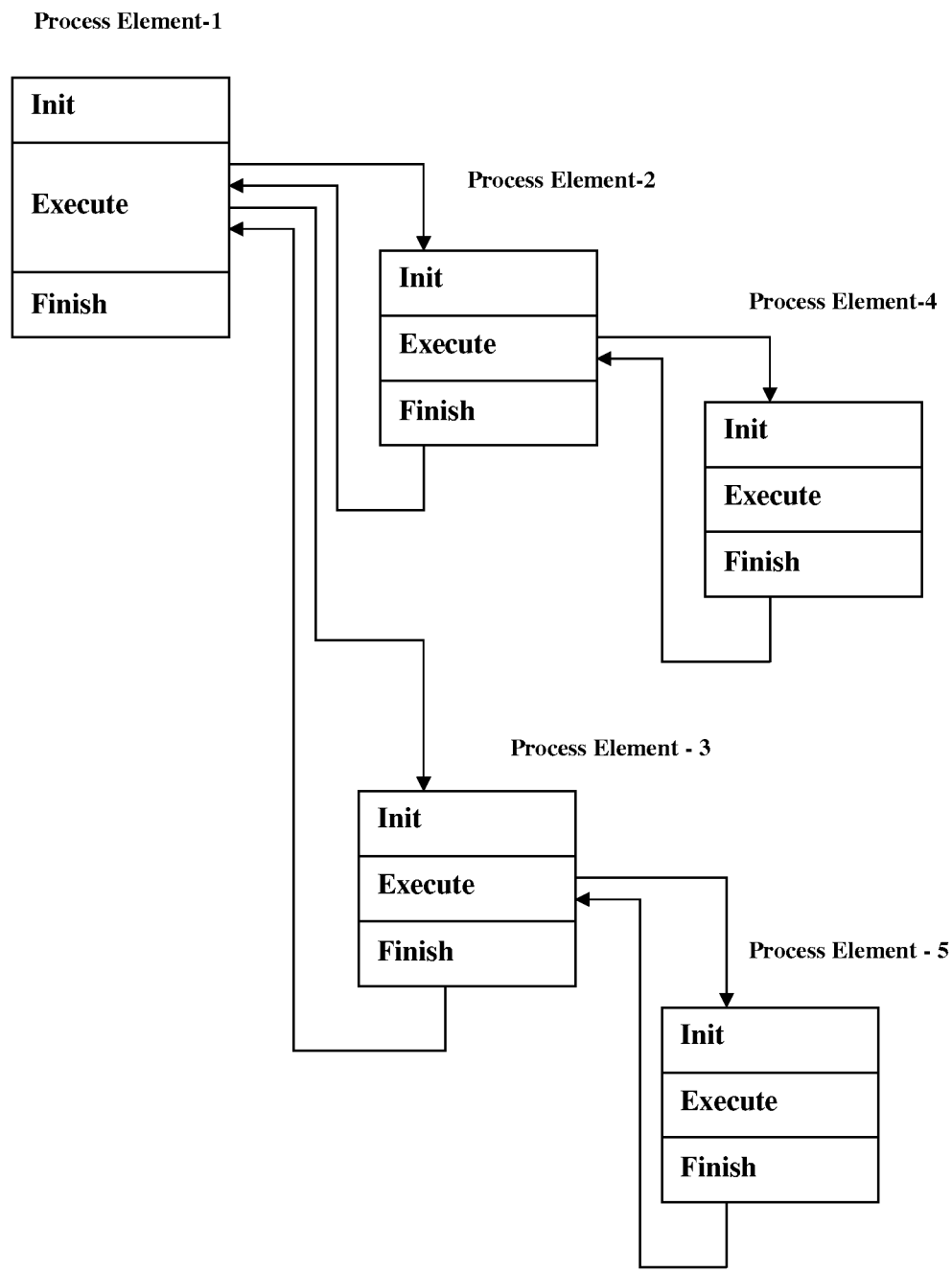

FIG. 01: KBM Object & KBM Adapter
FIG. 02: Schemata of KBM Colors
FIG. 03: Entity Maps XML Document
FIG. 04A: Interaction Maps XML Document
FIG. 04B: Process Semantics XML Document
FIG. 05: DSC Framework
FIG. 06A: Conceptual Object
FIG. 06B: Conceptual Entities
FIG. 07: KBM Rule Graph XML Document
FIG. 08: KBM Gear
FIG. 09A: KBM Activity Operational Model
FIG. 09B: KBM Activity Conceptual Model
FIG. 09C: KBM Activity Deployment
FIG. 10: KBM WorkFlow XML
FIG. 11: KBM Rule Table
FIG. 12: KBM Structural Rules Table
FIG. 13: Translation of KB Rule
FIG. 14: KBM CObject Structure
FIG. 15: Functional Color Table
FIG. 16A: Interaction between KB & KBM Translators
FIG. 16B: Translation and Execution of KBM Rules
FIG. 16C: KB & KBM—Recursive Invocation
FIG. 17: Macro Entity
FIG. 18: Execution of KBM Process Structures
FIG. 19: Work Flow Execution Status Table
FIG. 20: KBM WorkFlow Execution
FIG. 21: KBM System Overview
FIG. 22: Activity Switching Table
FIG. 23: Planning State
FIG. 24: Planning Node
FIG. 25: Process Structure Table

DESCRIPTION

FIGS. 01 thru 15

Preferred Embodiment

A preferred embodiment of the present invention is illustrated below with the help of FIGS. 01 thru 15.

The current invention called KBM, describes a mechanism and system for representing and processing activity models, and attempts to overcome the limitations cited above in prior art.

As stated before, KBM relies upon KB (ref-1), and the modifications and/or enhancements required for the implementation of KB, to work in conjunction with KBM are described in Appendix-1.

KBM address all the aspects of Modeling, which are stated before as:

| a) Abstract Modeling | b) Conceptual Modeling | c) Operational Modeling |
|---|---|---|

The description of this invention, is broadly divided into the following sections:
1) KBM Colors
2) KBM Operators, Rules and Objects
3) Formal Semantics of KBM Colors & Rules
4) KBM Color and Rule Management
5) Operational Modeling
6) Conceptual Modeling
7) KBM System
1) KBM Colors: This section describes a novel set of colors called KBM colors, for depicting complex notions, which arise frequently in application processing.
   The inventor realized that Aristotle Categories (ref-3), cover many fundamental aspects of process modeling notions, and considers Aristotle's work as an exemplary art, despite limitations. It may be noted that Aristotle's work is in the domain of philosophy and naturally is not directed towards realizing any specific aim or purpose.
   From a purely academic perspective, the inventor realized that this work (invention) would have extended Aristotle Categories, in many ways, to produce an implementable model, in the domain of computation.
   KBM colors, is a mechanism, which allows or distills complex notions of process modeling and linguistic notions to practice, i.e. reduces them to code of a pre-defined host language.
   The KBM colors are broadly categorized as—

| a) Reference Colors | b) Complex Colors |
|---|---|
| c) Process Colors | d) Conceptual Colors |

1.1) Reference Colors: The reference colors of KBM were designed to locate entity references with minimum specification and effort.
   1.1.1) Instance Id Color: An instance of an entity may be assigned a unique identification called "instance id"; and may be retrieved later via a color called instance color, which specifies the "instance id".
      The instance color is depicted by the prefix "%id-".
      For example, given a term such as:
      Entity-1.%v-abc.%id-uvw.%other-kbm-colors;
      The entity instance which has the instance id "uvw" is selected from a plurality of instances.
      Typically, the "Instance id" color is resolved prior to other KBM colors, as it is very easy to implement, and could reduce the list of entity references that may be processed by the other kbm colors in the specification.
   1.1.2) Data Set Color: An entity may be assigned a color called dataset color, to depict a logical place or set, to which it belongs.
      It may be noted that in KB an entity+verb-color+auxiliary-color, resolves into a vector of entity types (please refer to Appendix-1). In most typical cases, it resolves into a single entity type. Each of these entity types corresponds to an index value of the O-context.
      In KB (ref-1), each index value of the O-Context holds a single entity reference.
      In KBM, each index value of the O-Context holds a plurality of entity references. These entity references may be organized as logical groups called data sets. KBM provides an object called CObject (or collaboration object), depicted in FIG. 14 to hold the entity references, in data sets.
      The data set color is depicted by the prefix "% ds-".
   1.1.3) Local reference Color: An entity may be assigned a color called local reference color, which indicates that the entity exists in a special data structure (called local cache) of its parent entity, rather than the usual class structure, where the attributes of the parent are defined.
      The local reference color is depicted by the prefix "%lref-".
      As an example, consider the following.
      Entity-Type-01.%v-abc.%other-kbm-colors.Entity-Type-02.%v-uvw.%lref-xyz.%other-kbm-colors;
      The presence of the "%lref-" color on Entity-Type-02 indicates that it exists in a special data structure called "local cache" of Entity-Type-01. The parent entity Entity-Type-01 may hold several such caches, and the "%lref-" color id, identifies the cache name.
      From the viewpoint of semantics, the term given above resolves into an instance of Entity-Type-02. The "lref" color can alternatively be viewed as an override of the usual "dot notation" for accessing the attributes or fields of an object.
      Another important point to note is that when a term such as the above is specified in a colored rule, then it could be specified as:
      Entity-Type-01.%v-abc.Entity-Type-02.%v-uvw.%lref-xyz.%other-kbm-colors;
      The "Entity-Type-01.%v-abc" refers to the reference resolved by the "Entity-Type-01.%v-abc.%other-kbm-colors" specification specified in the main rule (or a previous colored rule).
      (Note: This topic may be a bit difficult to grasp at this stage, but the concepts would become more clear, after color resolution is descried in later sections).
      Finally, a special cache called "default" is reserved for KBM internal use. KBM could create this cache, based on need, and the rules could access this cache with the specification "%lref-default". This topic is visited again in the section on binding color described below.
1.2) Complex Colors: A set of color types, which play a vital role in activity modeling were identified, and are described below, as complex colors.
   1.2.1) Category Color: An entity may be categorized (classified), under various norms. In KBM, categories can take many forms, such as:
      a) Feature based categories, which are relational expressions based on fields or output of methods of an object, and constants.
      b) Relation-based categories, which are relational expressions between the fields or "outputs of methods" of several objects.
      c) Concept based categories, which may be described as relation to a concept like distance and/or ranking with respect to a particular norm.
      d) Token-based categories, which are a special form of categories and are assigned by actions/activities to an entity. The exact rule or nature of the process is not spelled out in case of token-based categories.

It may be noted that categories may be specified to objects or attributes of objects.

The category color is depicted by the prefix "%ctg-".

Aristotle's dilemma of attempting to categorize the entire universe is resolved in KBM, by creating a scheme, which is generic and open-ended.

1.2.2) Form Color: An entity may have several forms. In many simple cases, form and state may coincide, but in complex entities, they may differ significantly.

For example, an entity like "Water" could have several forms like, "liquid", and "vapour". Similarly, bio-chemicals like proteins may have several forms.

The form color is depicted with the prefix "% form-".

1.2.3) Model Color: An entity may have several sub entities. Often these sub-entities may form a structure. The model color depicts the structure of the sub entities of the entity, and may be applied to objects as well as process structures.

For example, the interior of a Car, Bus, Airplane, or building may be arranged or modeled in several ways. Model color identifies, how the sub-entities are arranged, within the main entity.

The model color is depicted by the prefix "% mod-".

1.2.4) Capability Color: The capabilities of an entity may vary dynamically, which may be depicted by a color called capability color.

The capability color is depicted by the prefix "% cap-".

1.2.5) Characteristic Color: An entity may acquire several characteristics, via actions; all these external phenomena are regarded as characteristics color.

It may be noted that in many cases, these external phenomena appear to be descriptions of adverbs. For example, the entity STEAM may acquire a characteristic called "flow". The "flow" object may have properties like "rate of flow". Similarly, an object in space like satellite or space station may have a characteristic called "axis". The "axis" may be depicted by an object, and may have properties like orientation with respect to several fixed objects on earth.

The characteristic color may also describe physical events like increase in rate of flow, decrease in rate of flow, and also adverbs like rapid increase in rate of flow, rapid decrease in rate of flow.

Characteristics may be atomic like integers, floats, etc; or objects. Atomic characteristics may be depicted by conceptual sub classes of KB (ref-1) or conceptual objects (described later) of type wrapper of KBM.

The characteristics are stored in a cache, which has the following format: <name, parameters, reference-of-the-object> where, name is a characteristic name, parameters are received from user, and the reference of the object refers to an instance of the characteristic object.

The full details of storage of "characteristics cache" are described in a later section.

The characteristic color is depicted by the prefix "%ch-".

The characteristics color is typically implemented as a KBM Rule, which is employed to evaluate the characteristics of the entity. A high level description of the process is provided in FIG. 02.

1.2.6) Binding Color: An entity may exist in free form, or may be bound to other entities. Binding implies two entities, which are typically referred to as "source" and "target".

KBM provides an operator called "bind" to facilitate binding. Please refer to section 2 (operators), for details about the bind operator.

The bindings created by the "bind" operator are stored in an internal cache of the Entity. The binding color validates if the entity has predefined bindings with a predefined target entity. A high level description of the process is provided in FIG. 02.

The binding color is depicted by the prefix "%bind-".

1.3) Process Colors: The process colors of KBM were invented to facilitate conceptualization of actions and activities.

Process colors are typically employed by coarse process structures like Rule Graphs, KBM Gears, and KBM Activities. The "procedure color", is an exception and is used at entity level.

1.3.1) Procedure Color: The procedure color is an extremely important process color, and was devised to depict sources, from which the entity type may obtain instances.

An application may depend upon several data sources like data files, SQL tables, or any other source. These sources are implemented by an object called procedure object.

The procedure object implements a set of predefined methods called init, reset, getNext, getCur, setInvalidateFlag, and chkInvalidateFlag, which are specified by an interface called the IKBMProcObject interface.

The procedure object may be invalidated (by setting the invalidate flag) by the method "setInvalidateFlag", which implies that the procedure object is no longer valid and needs to be re-established. The chkInvalidateFlag, method checks if the procedure object is invalidated. The rest of the methods of the procedure object are employed for initializing, resetting, and for obtaining the next/previous object references.

The procedure color is depicted by the prefix "%proc-".

1.3.2) Process Execution Color: A method or a rule or a larger process structure like KBM Rule Graph or even an activity may have several conditional forks, in its structure. The path taken during execution, in a process structure, is regarded as process execution color.

The process execution color is depicted by the prefix "%pe-".

KBM provides a novel mechanism called "structure based computation", wherein the process execution color may be employed to determine a new set of colors, for an entity instance, as depicted below.

Entity[+old colors]*Process.% pe-color=>Entity[+ new colors];

1.3.3) Functional Color: An entity may undergo an unspecified transformation, when it is processed by a process structure like an action. For example, the state, or form or any of the colors described previously, may change, in a non-deterministic manner. The functional color was devised to depict such non-deterministic transformations.

The functional color is depicted by the prefix "%fct-".

The post processing of a process structure may determine the new functional color from the current functional color. More formally, we may express this concept, as given below:

Entity.%fct-Old-Functional-color+other-kbm-colors*Process.%pe-color=>Entity.%fct-New-Functional-Color;

It may be noted that the presence of functional color on the LHS is optional, and may be omitted.

1.3.4) Transformation Color: An entity may have transformed from a set of predefined colors to another set of colors.

The transformation of the colors of the entity may be regarded as a new type of color called transformation color.

Instead of relying on all the colors of the entities, to determine the transformation, we could rely on the process execution color and/or functional color, without sacrificing the semantics of the transformation. It may be noted that the process execution color determines the path; hence successive transformations of the entities are implied. The advantage of this approach is that our reliance on entity colors is limited to just functional colors.

Thus, successive "functional colors" acquired by entities, may be viewed as a compound transformations, which may be depicted by the transformation color.

It may be noted that the KBM color Adapter stores the old functional colors in deep cache, and the current functional color in color cache. The storage details of the colors are covered in Section 4.

The transformation color is depicted by the prefix "%tran-".

1.3.5) Disposition Color: An entity may be predisposed (due to its nature i.e. features or characteristics), to pass through a predefined set of states, during processing. This notion may be represented by a color called disposition color. Alternatively, the disposition color may be viewed as the plasticity of the entities, with respect to a process.

Disposition color therefore is applied to a process, even though it is derived from the properties of the entities.

The disposition color is depicted by the prefix "%disp-".

1.3.6) Mode of Processing Color: Mode of processing is an important characteristic of a process, and may be implemented by coarse-grained of fine-grained process structures.

Mode of processing determines the process controls for coarse-grained process structures like gears, and/or activities (which are described in later sections).

Mode of processing is regarded as a process color, and is depicted by the prefix "%mp-".

In case of fine-grained process structures like methods, the mode of processing may be determined from the colors of the parameters of the method. A typical usage scenario is described below:

A predefined method of an object called abstract controller determines the disposition & mode of processing colors of entities, based on parameters received by the method. Later, the abstract controller selects a concrete controller, based on disposition & mode of processing colors determined above, and invokes a method of the concrete controller. The method of the concrete controller, is exposed via a predefined interface, and is common amongst all the concrete controller implementations.

1.4) Conceptual Colors: Conceptual colors of KBM detailed below, were devised to aid the conceptual modeling framework of KBM.

1.4.1) Taxonomy Color: An object may optionally hold, a token called taxonomy id, which identifies a sub classification of the entity in some standard classification scheme. An entity may be identified on the basis of taxonomy id, by specifying it as a color called taxonomy color. The taxonomy color is depicted by the prefix "%tax-".

1.4.2) Auxiliary Color: An entity may be assigned a thematic role by a special KBM color called auxiliary color. The auxiliary color is depicted by the prefix "%aux-".

The auxiliary color may be depicted as:

Entity-1. % aux-inst:distributor;

Instances of the entity given by the type Entity-1, are said to possess a thematic role "instrument", and a subtype (sub role) "distributor", which are collectively depicted by the auxiliary color as: %aux-inst: distributor.

2) KBM Operators, Objects & Rules: The KBM operators and rule semantics are described below.

2.1) Operators: The following operators are provided as part of KBM.

2.1.1) exists and not exists operators: These are unary operators, which are used to depict existence, and non-existence.

2.1.2) newCPTObj Operator: KBM provides an operator called, "newCPTObj" operator, which may be used to create Conceptual Objects (described in later sections).

2.1.3) newKObj Operator: KBM provides an operator called "newKObj" operator, to create new kbm objects.

The syntax is: newKObj Entity-type-of-kbm-object (kbm-rule); where, kbm-rule identifies an interaction of kbm entity types, whose references are loaded into an instance of "Entity-type-of-kbm-object", via a method of the newly created object called "load".

2.1.4) charec operators: This is a binary operator, which is employed to create characteristics of entities, and is depicted as:

entity-1+colors charec(parm-list)entity-2+colors;

It may be noted that the above constitutes a single KBM term.

For example, consider the following scenario.

A black cat has a collar issued by the state or county.

KBM Term=Cat.%v-black charec ("null")

Collar.%v-county;

It is possible that the Collar object may not exist, and in which case it may be created by the newKObj operator.

Cat.%v-black charec ("null")
newKObj Collar.%v-county (kbm-rule);

As a result of this operator, an entry is created in the "Characteristics Cache" of Entity-1 (i.e. Cat) as shown below.

(Collar.%v-county, "null", reference-of-the-Collar-Object);

The "delcharec" operator, works similarly, but removes a previously existing entry, from the characteristics cache.

The "chgcharec" operator modifies the parameter list and/or the target entity reference. For a more detailed explanation, please refer to the bind, rebind, and unbind operators detailed below.

2.1.5) bind operator: This is a binary operator, which is employed to create bindings between two entities, and is depicted as:

entity-1+colors bind(link-parm,other-parm-list)entity-2+colors;

The bind operator takes a link-parm as the first parameter, which is typically, but not necessarily an action oriented concept.

It may be noted that the above constitutes a single KBM term.

For example, consider the following scenario.
A black cat is sitting on a wooden table.
KBM Term=Cat.%v-black bind("sitting", "on") Table.%v-wooden;

A binding is created as:
(Target-Entity-Type, "link-parm+other-parm-list", reference of Target-Entity-Type)
which for the above example would be:
(Table.%v-wooden, "sitting"+"on", reference of Table.%v-wooden)

The binding is copied to a cache called "bindings" in the KBMAdapter of the object reference of entity-1 (which for the above example would be "Cat").

2.1.6) rebind Operator: This is a binary operator which is employed to change bindings between two entities, and is depicted as:

entity-1+colors rebind(link-parm,new-parm-list)entity-2+colors;

It may be noted that the above constitutes a single KBM term.

For example, consider the following scenario.
A black cat is sitting near a wooden table.
KBM rule=Cat.%v-black rebind("sitting", "near") Table.%v-wooden;

A previous binding cache entry is modified with new-parm-list, and target entity reference. The first parameter called link-parm must match what is already in store, along with the target entity type.

2.1.7) unbind operator: This is a binary operator which is employed to remove existing bindings between entities, and is depicted as:

entity-1+colors unbind(link-parm)entity-2+colors;

It may be noted that the above constitutes a single KBM term.

For example, consider the following scenario.
The black cat is no longer sitting near the wooden table.

In this case, we need to unbind a previous binding. The unbinding may be given as:
KBM rule=Cat.%v-black unbind("sitting") Table.%v-wooden;

The entry in the "binding cache", corresponding to the target entity type, and link-parm ("sitting"), is deleted.

2.1.8) Set operator: This operator may be employed to assign colors to entities. It may be noted that color specification in KB/KBM implies, that an entity must hold the color for selection. To assign or reassign colors we could use typecasting as explained in KB (ref-1). The set operator provides a short hand as shown below.

Entity-1.%v-abc.%id-<AAA>;

In the above, the entity instance "Entity % v-abc", is assigned the instance id color with a value of "AAA".

In contrast, KB typecast operator may be used for the same purpose, but has the following long form:
<Entity-1.%id-AAA> Entity-1.%v-abc;

The same mechanism may be employed to remove a color, by prefixing the color value with an asterisk character.

Entity-1.%v-abc.%id-<*AAA>;

For example, in the above specification, the instance id color, with a value of "AAA", would be removed from the entity instance "Entity % v-abc".

2.2) KBM Conceptual Object: A KBM conceptual object represents a conceptualization of a physical or logical object, or a process. Unlike real objects of computing, conceptual objects may not possess a true body i.e. attributes. The methods of the conceptual object largely serve to maintain the contained elements (which are dynamic vectors). Please refer to the IKBMCPTObject interface described in Appendix-6.

The term conceptual is somewhat overloaded; specifically, conceptual classes and sub classes of KB (ref-1) are different notions, and may not be confused with conceptual objects of this section. There is no relation between conceptual objects and conceptual classes, like in object oriented programming objects and classes. Conceptual sub classes may be employed to depict characteristics of conceptual entities.

KBM Conceptual objects allow dynamic manipulation, i.e. all contained elements including characteristics may be dynamically added, morphed, and deleted.

FIG. 6A depicts the layout of the conceptual object in memory.

The name of the conceptual object is stored in 0601.
The type of the conceptual object (0602) identifies the usage as:

| a) Entity | b) Process | c) Wrapper |

A conceptual object of type "entity" may have several subtypes, which may be given as:

| a) Component | b) Port | c) Fluent |
| d) Signal | e) Channel | f) Connector |
| g) Event | h) Concept | i) Place |

The abstract-id (0603) depicts the abstract object with which the conceptual object is associated. It may be noted that abstract objects are notions whereas conceptual objects have partial representation and may be used in computation.

A conceptual object may possess colors like a real object, and these colors and characteristics may be stored in a reference of the KBMAdapter object (0604), held by the conceptual object, as IKBMColorPalette Interface reference.

A conceptual object may be associated with a real object, and the reference of the real object may be stored in the reference part (0605) of the conceptual object.

A conceptual object may have components, and a vector (0606) is employed to store these components.

A conceptual object may also have a set of ports, and a vector (0607) is employed to store these ports in the conceptual object.

A conceptual object may have several fluents; a vector (0608) is employed to store these fluents.

A conceptual object may possess functions, which are stored in a vector 0609. Each entry of the function vector is in turn a conceptual object (Please refer to Appendix-14A).

2.3) Conceptual Entities: The following entities were invented to implement KBM Conceptual modeling.

| a) Components | b) Ports | c) Fluents |
| d) Signals | e) Channels | f) Connectors |
| g) Event | h) Concept | i) Place |

It may be noted that these entities correspond to the type of the conceptual object.

A component is a conceptual entity, which could contain one or more other components, or conceptual entities.

A port may receive or transfer a set of entities called fluents, or signals; a port may be bound to other ports via entities called connectors or channels.

Each of these entities may individually possess functions, characteristics, and process controls.

Components may be bound to other components either logically or by ports.

Port binding could imply physical binding via connectors (like in mechanical systems) or channel binding (like in chemical systems).

Signals received may be bound to functions. Functions may be bound to procedures.

Figure 6B:
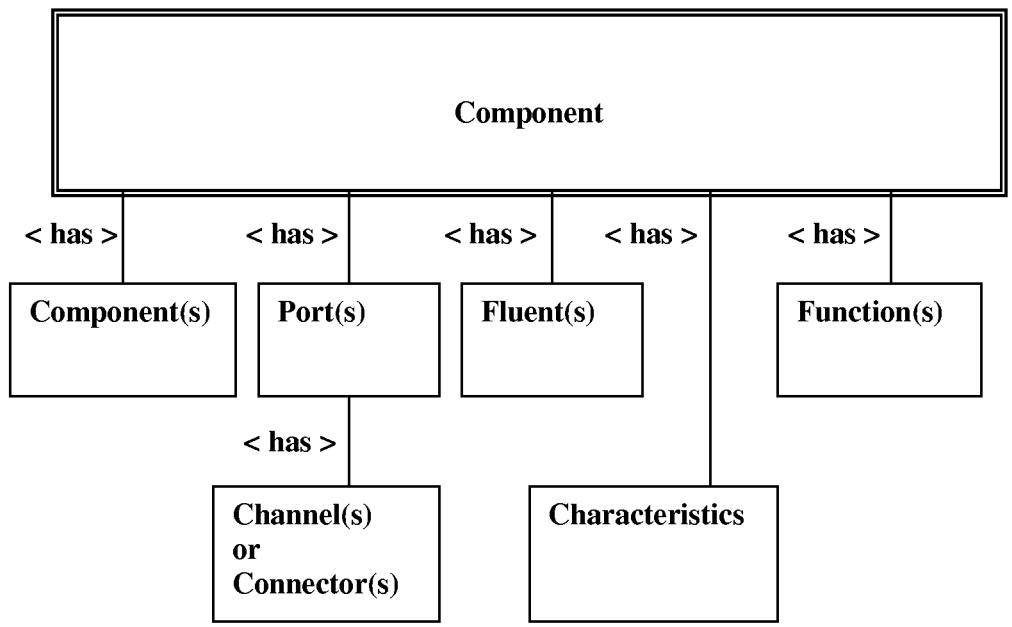

FIG. 6B depicts the organization of the component.

2.4) Conceptual Entities—Usage: Components are designed to depict—
a) Processing Centers (Information Systems)
b) Reaction Chambers (Chemical Systems)
c) Machinery (Mechanical Systems)

It may be noted that KBM Conceptual objects may be viewed as physical containers for conceptual entities of KBM Conceptual Modeling. The Create, Retrieve, Update, Delete (CRUD) operations on KBM Conceptual objects are fairly simple, as they can be mapped to vector operations, which are common data structures of computing.

Conceptual objects and contained elements may be individually named as:
$kbm.prefix.tag.tag . . . . tag;
where, prefix may be given as:
cptobj: for conceptual objects
comp: for components
port: for ports
flnt: for fluents
sig: for signals
chan: for Channels
conx: for connectors
concept: for concepts
event: for events
place: for places
fnct: for functions
ch: for characteristics
abs: for abstract entities Thus, we could refer to a component as: $kbm.comp.my.component;

We could depict a port as: $kbm.port.port1;

We could depict a port of an entity as:
$kbm.comp.my.component.$port.port1;

It may be noted that the syntax is very similar to conceptual sub classes of KB (ref-1).

The following properties of components and fluents are noteworthy.

a) A natural order (or rank) may exist for the characteristics of components or fluents. For example, a knob of a machine (fan or air-conditioner) may be set in states such as: slow, med, high.

The color notions of KB (ref-1) or KBM may be used to represent these notions.

b) Characteristics (of components & fluents) may be added to produce a new variant of the characteristic. The Type-9 rules of KBM (described later) may be applied to characteristics.

As an example, consider a component, which is simultaneously sending fluent's out, as well as receiving fluent's in, at its ports.

The net influx or out-flux can be determined by the colors and characteristics of fluents at the ports.

As another example, consider a "Sales Order", which has two line items; More specifically, assume we have ordered two copies of a book, and two copies of a software CD, giving raise to two line items in the sales order. The above scenario may be depicted as described below.

Sales Order (comp) has 2 Line Items (comp's);

Line Item-1 (comp) may acquire a characteristic $Part.%v-ordered;

where, $Part is a conceptual sub class.

Similarly, Line Item-2 (comp), may acquire the characteristic $Part.%v-ordered;

As part of order processing, the store or processing center, would have allocated stock, based on line item. Assume that the store has only one copy of the book, and the store had sent the book, and the two cd's.

The above scenario may be depicted by creating the following Characteristics, for Line Item-1 and Line Item-2.

Line Item-1 (comp): $Part.%v-supplied; $Part.%v-pending;

Line Item-2 (comp): $Part.%v-supplied;

While a component or fluent acquires characteristics, its functional color may undergo changes, i.e. the component or fluent may acquire new functional colors or existing functional color may morph or may be deleted. Since changes in functional colors are depicted by transformational color, the above implies that the component or fluent acquired new transformational colors, as shown below.

"LineItem-1.%tran-p ending"

"LineItem-2.%tran-processed"

Now, we can apply a Type-9 rule to determine the next course of action.

In addition, components may be generically accessed by the abstract type. For example, in the above example, Line Item-1 and Line Item-2 may be generically accessed as "Line Item". Situation rules could specify logical operators such as: "for all" and "there exists", and their negations.

In the above example, the two Line Items may be categorized as: "LineItem.%tran-pending", and Line Item-2 may be categorized as: "LineItem.%tran-processed"

Situations, which can be depicted as Type-9 Rules, may employ operators like "forall", or "Exists" on Abstract types as— forall ($kbm.comp.SalesOrder.$abs.LineItem.%tran-processed); or

Exists (($kbm.comp.SalesOrder.$abs.LineItem.%tran-processed);

2.5) KBM Rule Framework: The KBM Rule framework comprises of several enhancements to the KB Rule framework (ref-1), which are described below.

2.5.1) KBM Rules: A new type of rule called Type-7 rule was devised to depict actions. The Type-7 rule has three subtypes, which are given as:
  a) Type-7A: This type is used to depict actions.
  b) Type-7C: This type is used to depict Rules associated with colors, which are often referred to as colored rules.
  c) Type-7E: This type is used to depict effect rules.
  2.5.1.1) Type-7A Rule: The terms of type-7A rule are made up of:
    a) Entities (real or conceptual objects) with Colors (KB/KBM) and fields/methods and/or
    b) Type-1 thru Type-8 KB/KBM rules
    Type-7A Rules have their own A-context like Type-6 Rules (please refer to Ref-1).
  2.5.1.2) Type-7C Rule: The Type-7C KBM rules are employed to map colors to KBM rules.
    Type-7C rules are similar to Type-7A rules, except that these rules cannot make any modifications to the state of persistable objects. In other words, Type-7C Rules can be executed any number of times, without affecting the state of the application.
    In addition, these rules return a "Boolean Value", when executed.
  2.5.1.3) Type-7E Rule: The Type-7E KBM rules are employed to process the effects, of an action. Typically, these rules receive the process execution color of the rule or process structure, for which they are configured.
  2.5.1.4) Type-8 Rule: The Type-8 KBM rule may be employed to depict case blocks. A Type-8 KBM rule has two terms, which are Type-7A Rules.
    The first Type-7A rule is composed of Type-4 or Type-5 rules (i.e. conditions), and the second Type-7A rule is composed of an equal number of Type-7A Rules (i.e. actions).
  2.5.1.5) Type-9 Rule: The Type-9 KBM rule may be employed to depict the rules based on abduction. Typically, these rules have a group rule id, and are invoked by a group rule id, and one of a plurality of the rules implied by the group rule, is selected as the applicable rule, if the RHS terms of the rule are satisfied by the entities. The corresponding LHS is returned as the result of the group rule.
  2.5.1.6) KBM Rules—Organization: KBM Rules are stored in a table called "KBM Rules" table.
    FIG. 11, depicts the KBM Rules table, which is essentially the KB Rules Table (FIG. 11 of Ref-1), wherein, the following new columns are added to cater to the requirements of KBM.
    Unique Rule Id (1101): This column contains a unique rule id, which could serve as primary key for the table.
    Group Rule Id (1102): A KBM Rule may be assigned a group rule id. It may be noted that Type-9 Rules are executed by specifying the Group rule Id.
    Type of Output (1103): The type of output produced by the KBM rule is held in this column.
    Type & Name of color (1104): The type and name of color are stored in this column for Type-7C rules. It may be noted that KBM colors may be mapped to KBM rules.
    Effect Rule (1105): The lhs of a KBM Rule, called "Effect Rule", which will be executed, after the completion of the current rule, may be specified in this column. The process execution color of the "current rule", i.e. the rule, which specified the effect rule, is made available to the effect rule.
    Function Handler Class Name (1106): The terms of a KBM Rule may be further processed by a method. The name of a oops class, and method, which can process the terms of the rule further, is stored in this column.
    A class representing a function handler must provide the following predefined methods—
    a) A method called "init" which takes the entity references of the terms of the KBM rule as parameters, and stores them in the internal storage of the class object as fields.
    b) A method called "execute" with no arguments, which would process the parameters stored in the class object, and returns a value, which is regarded as the output of the KBM Rule.
    The function handler may be seen as a alternate mechanism for implementing operators.
2.5.2) KBM Structural Rules: KB (ref-1) described structural rules, which allow a developer to depict control structures, based on term ids.
  For example, in a simple rule with three terms T1, T2, and T3, we could define a structural rule, such that T2 and T3 are conditionally executed (if-then-else control structure) based on the result of execution of T1.
  KB also allows the nested-for control structure, whereby we could execute a set of 5 terms as: ((T1(T2(T3))) (T4(T5))).
  It may be noted that in the above example the terms T1, T2 and T3 are enclosed in a nested-for block, and the terms T4 and T5 are enclosed in another nested-for block.
  Nested-for control structure is quite important, and is typically employed to establish entity references, which are read from a source, such as a database or a queue.
  The KB Structural rules are highly generic and are suited for multiple purposes.

In KBM structural rules assume greater significance, and hence are tailored to meet very specific requirements.

KBM Structural rules are of two types.

a) Horizontal      b) Vertical

In comparison KB (ref-1) has only the horizontal structural rules.

2.5.2.1) Horizontal Structural Rules: KBM broadly divides horizontal structural rules into two groups:
a) Nested-for (with restrictions cited below)
b) Other control structures The nested-for control structure has an additional restriction in KBM. Specifically, the "nested for control structure may not have more than one block".

The reason for this restriction stems from the fact that KBM automatically tries to establish the entity references, and when there are several blocks, KBM may not know which block to roll (iterate over), to establish the entity references. In computing terms, this is often referred to as "non-deterministic" behavior. This point would become clear when Vertical structuring rules are explained.

It may be noted that horizontal structural rule in KBM implies two structural rules, where the first one is a nested-for structural rule (with restriction cited above), and the second structural rule could specify other control structures (i.e. other than "nested-for" control structure).

2.5.2.2) Vertical Structural Rules: A term of a kbm rule may have several kbm colors. Each of these kbm colors may be optionally mapped to kbm rules; as stated before, these rules, which are derived from colors are called colored rules. The colored rules may optionally initiate a source such as a database table, and perform some processing like filtering a database record or row.

A term of a colored rule may depend upon another term of the same rule, or may depend upon a term of another (previous) colored rule. The former type of dependency is called horizontal dependency and the later is called vertical dependency. Thus, we could now apply a structural rule upon these colored rules, and such a structural rule is called a vertical structural rule.

In view of the above issues (or forces), the specification of the vertical structural rule, utilizes a data structure called "Vertical Dependency".

The "Vertical Dependency" data structure has four fields, which are:

<source-rule, source-term, target-rule, target-term>

The source-rule, and target-rule are colored rules of a term of a KBM Rule.

By utilizing the "Vertical dependency" data structure, a colored rule may specify the exact target rule and target term, upon which it is dependent. The specification of vertical structure rule therefore consists of a set of dependency structures, wherein each dependency is laid out in the form of the "Vertical Dependency" data structure, and are separated by ';' character.

Finally, it may be noted that vertical structural rules, are constrained in the same manner as horizontal structural rules i.e. the vertical structural rule may not have more than one "set of dependency structures".

2.5.2.3) KBM Structural Rules—Organization: KB and KBM differ in several ways in the implementation of structural rules. Specifically, KB has space for only one structural rule in the rules table (FIG. 11 of Ref-1), under the label column. To cater to the possibility of several structural rules, KBM provides a separate table (FIG. 12) to store structural rules, and the keys (row ids) of this table are stored in the structural rule portion (label column) of the rule (FIG. 11 of Ref-1).

Thus, for a KBM rule with "n" terms, given as:

$T1.\%kb\text{-}colors.\%kbm\text{-}colors * T2.\%kb\text{-}colors.\%kbm\text{-}colors * \ldots * Tn.\%kb\text{-}colors.\%kbm\text{-}colors;$ we could specify "n+2" structural rules, given as:
VS-1; VS-2; ... VS-N; HS-1 HS-2

The structural rule id's of VS-1 thru VS-N, HS-1 and HS-2 are stored in the label portion of the rule, separated by semicolon (";") characters. The actual structural rules are stored in a separate table called KBM Structural table.

FIG. 12, depicts the KBM Structural table, which comprises of a column for storing the structural rule id 1201, and a column for storing the structural rule 1202.

In the above specification, the vertical structural rules VS-1 thru VS-n are applied to the colored rules associated with the colors of the terms T1 thru Tn. The horizontal structural rule HS-1, is a nested-for structural rule and is applied to the main rule. The horizontal structural rule HS-2 is a non nested-for structural rule and is applied to the main rule.

It may be noted that the vertical structural rules, VS-1 thru VS-n, and HS-1 are processed by KBM Translator (described in a later section), whereas the horizontal structural rule "HS-2" is processed by the KB Translator (ref-1).

2.5.3) Effects & Outputs: A KBM rule or in general a KBM process structure may execute special rules called Effect rules, after successful or abnormal completion of the rule, or process structure.

Effect rules could be Type-1 thru Type-9 Rules, and could spin off new Effect rules in a recursive manner. Effect rules receive the process execution color of the KBM rule or the process structure, which invoked the effect rule.

In addition to effects, a KBM rule or process structure may also produce outputs, which are returned as return value, by the method implementing the KBM rule.

Thus, the general form of a KBM rule may be given as:

| | |
|---|---|
| KBM rule => KBM Effect Rules | // Effects |
| → output; | // Output |

3) Semantics of KBM Colors & Rules: The semantics of KBM colors and rules are described in this section.
  3.1) Semantics of KBM Colors: The semantics of KBM colors are detailed below.
    3.1.1) KBM Complex Colors as Rules: KBM Complex Colors may be mapped to KBM rules, which are called colored rules.
      A colored rule is required to return a Boolean true or false as output. When a colored rule returns a Boolean true, the entity is said to possess the color, and the type and value of the color is stored in an internal cache of the entity, called color cache.
      KB (ref-1), described a scheme for mapping colors to a method. The scheme is naïve, and as explained in ref-1, it is useful merely for transforming data from one format to another. KBM on the other hand, maps a color to a rule, and provides robust framework for rule integration.
      The mapping of colors to Rules may appear like a minor enhancement to the KB scheme of mapping colors to methods. However, it may be noted that the purpose of mapping colors to rules in KBM, is to solve the "Rule Integration Problem", which is many many folds more complex than the aims of KB.
      Finally, it may be noted that the ills of procedural languages are transferred to KB (ref-1), as it is devoid of the "Rule Integration" mechanisms.
    3.1.2) KBM Colors as Tokens: KBM colors may be regarded as tokens, and may be stored as is i.e. as tokens in the internal color cache of the entity.
    3.1.3) KBM Colors for Storage Access: KBM colors (like procedure and data set colors) may be specified to access entity instances from a data source like files or SQL Tables, or from the previously fetched instances, which are held in O-context, as data sets.
    3.1.4) KBM Process Colors: The KBM process colors are implemented by coarse process structures, like rule graphs, gears and activities. Typically, these colors are processed by the post processing section of the process structure.
      FIG. 15 describes the Functional color table, which holds the mappings of entities (1501) along with old functional colors (1502), the process structure type (1503), the process structure name combined with the process execution color (1504), which resulted due to the action of the process structure, and the resulting new functional colors (1505) for the entities, and new transformational colors (1506).
      It may be noted that the above table (FIG. 15), may be configured in several ways, as described below.
      a) The table can be used to map the effect of a process structure (1503 & 1504), on entity with optional verb color (1501), which could result in new functional colors (1505).
      b) The table can be used to map old functional colors (1502), of an entity with optional verb color (1501) to new functional colors (1505), due to the action of a process structure (1503 & 1504).
      c) The table can be used to map several old functional colors (1502) of an entity (1501) with optional verb color to a transformational color (1506).
    3.1.5) KBM Colors for Local Cache Access: The local reference color may be employed to use the local cache (of parent) as source for the entity, which specified the local reference color.
      For example, Entity-Type-01 may specify a characteristic color, in a main rule given as: Entity-Type-01.%v-abc.%ch-ABC;
      The characteristic color "ABC" may be associated with a colored rule, whose terms may be given as:
      Entity-Type-01.%v-abc.SPIN.%v-uvw.%lref-charecteristics
      The reference of Entity-Type-01 in the main rule is established, and the colored rule is executed. Since the term of the colored rule, specified a "local reference color", the adapter of the entity (Entity-Type-01 instance) is treated as the applicable context.
      A search is performed in the "Target name" column of the characteristics cache (identified by the "lref color token") of Entity-Type-01 instance for the class name and verb color of Entity-Type-02, the reference of the target (if exists), is inferred as the instance of the Entity-Type-02.
    3.1.6) Procedure and Data Set Colors: The semantics of procedure & data set colors are described below.
      A KBM term may either specify procedure color (referred to as proc color) or data set colors, but not both at the same time.
      If proc color is specified, it is employed to read the entity references. A temp data set is created to hold the entity reference read.
      In the absence of the proc color, the KB Context Searching algorithm is executed, to establish the applicable entities.
        Note that if auxiliary color of KB (ref-1) is specified, it could select more than one entity of O-context as applicable entity. Applicable entity means O-Context index, not the actual entity references.
        When data set colors are specified along with an auxiliary color, the data set color applies to the root type, implied by the auxiliary color. Please refer to KB (ref-1) for a description of auxiliary colors.
      If data set colors are specified, then
        The entity references of the A-Context, and the applicable entities of the O-context are searched for the specified data set colors. The entity references in these data sets constitute source.
        A temp data set is created to hold the entity references being read.
      In the absence of both proc color and data set colors, then
        The last temp data set of the applicable entity is treated as source.
      In the absence of kbm colors, the term is treated as a KB term.
    The semantics of the life cycle of the temp data set are detailed below.
      A Temp data set is created for every entity type, during the processing of the kbm colors of the entity type.
      The temp data set gives opportunity to colored rules to use the entity references previously established, by procedure or data set colors.
      When entity references are read by a procedure, or from existing data sets, they are copied to "temp" data set.
      The temp data set is copied to save data set after the entity instances are established, i.e. after all colored rules are processed, so that they can be handed over to KB.

The save data set is always created as the last data set. KB uses the save data set to extract the entity references.

The save data set is deleted after the end of the processing of the rule.

More than one temp data set may be created, when the colored rules of a term are processed. These temp data sets are not deleted immediately after processing of the colored rule.

Typically, the first colored rule of a Term of a rule could establish the temp data set via the proc color, or by specifying a set of data sets. These would act as pivots for the entity references of the term, and could indulge in cross relations with other terms. Alternatively, the proc color or the data set colors may be specified by the terms of the main rule.

3.2) Semantics of KBM Rules: KB (Ref-1) provides 6 types of rules, a set of colors called KB colors, and a mechanism called structural rule, which provides control structure mechanisms like if-then-else, nested-for, etc.

As described in the previous sections, KBM provides the following additional features.
a) New rule types—7A/7C/8/9.
b) New colors called KBM colors.
c) Enhanced structural rules.

Any of the 9 types of rules (KB plus KBM combined) could specify KBM colors in their terms. Hence, the distinction between KB and KBM rules ceases to exist, with regard to translation of these rules to host language equivalents. In other words, KBM rule does not just mean the Type-7/8/9 Rules, but any type of Rule (types 1 thru 9), which employs KBM colors.

In general a KBM Rule may be given as:

$$T1.\%kb\text{-colors}.\%kbm\text{-colors}.method/field*T2.\%kb\text{-colors}.\%kbm\text{-colors}.method/field* \ldots * \\ Tn.\%kb\text{-colors}.\%kbm\text{-colors}.method/field; \quad (1)$$

where "*" is any valid operator of KB or KBM.

The procedure for translation of KBM rules employs a simple trick, wherein the KBM colors are evaluated first, and the entity references are established. Once the entity references are obtained, the KBM rule of equation (1) transforms into a KB Rule, which may be given as:

$$T1.\%\text{-}kb\text{-colors}*T2.\%kb\text{-colors}* \ldots *Tn.\%kb\text{-colors}; \quad (2)$$

In cases where the operator "*" is limited to KB operators, Equation (2) is like any other KB Rule, and KB Translator (ref-1), could now translate the Rule depicted by equation (2), to their host language equivalents.

In cases, where the operator "*" is not limited to KB operators, KB evaluates the terms, and passes the entity references of the terms and the operators to KBM module(s) for further processing.

3.3) Semantics of Structural Rules: The semantics of KBM structural rules are described below.

3.3.1) Horizontal Structured Rules: Assume the following KBM Rule.

$$T1*T2;$$

The instances of T2 are retrieved until the proc or dataset has no more instances. When that situation ("no-find") arises, then the following steps are performed.
  The proc or dataset-index is reset
  The previous term (T1), is Invalidated.
  Control is transferred to previous Term (T1), which reads the next instance of the entity.
  When the first term is at "no-find" situation, then EntityRefs failed condition is generated.

3.3.2) Vertical Structure Rules: Assume the following KBM Rule.

$$T1.\%c1.\%c2$$

where colors %c1 and %c2 are mapped to colored rule CR1 and CR2.
Let us further assume that CR2 is dependent upon CR1.
When EntityRefs of CR2 fails (due to no-find situation), then the following steps are performed.
  Some term of CR1 (say i-th term) could be invalidated, which is defined by the vertical structure rules.
  If the i-th term of CR1 is invalidated, then proc's or datasets of all subsequent terms, i.e. i+1 to n are Reset.
  A driver/controller mechanism governing the rule ensures that CR1 is run again, followed by CR2.

4) KBM Color & Rule Management: The KBM color and rule management schemes are described in the following sub sections.

4.1) Introduction: In KBM, colors are broadly classified as static or dynamic colors. Static colors remain fixed throughout the lifetime of the entity, whereas dynamic colors can vary, during the lifetime of an object.

In view of the above definition, the verb and auxiliary verb color of KB (ref-1) are static colors. The majority of remaining colors are considered as dynamic colors.

Dynamic colors may need space within the entity representation, whereas static colors can be managed by the KB/KBM translators. It may be noted that noun color of KB is a dynamic color but no space is allocated, because noun color is used to depict state, for which space is already allocated in the object.

An entity in KBM may have over a dozen colors, and each of these colors, when they are dynamic, may need space in entity representation. A typical entity is designed for supporting a user application, and the storage requirements for KB/KBM colors could be overwhelming. KBM therefore attempts to streamline color management, and the details are described in the following sub sections.

4.2) KBM Color Palette: Color management in KBM comprises of the following objects & interfaces, which are depicted in FIG. 01.
  a) A user entity (0102), which implements the predefined IKBMObject Interface (0101), supplied as a part of the KBM system.
  b) A predefined object called KBMAdapter (0106), which implements the predefined Interfaces IKBM-ColorPalette (0103), IKBMCache (0104), IKBM-Color (0105).

This entity is pre-built and is supplied as a part of KBM runtime. Appendix-6 describes the KBM interfaces. Objects like KBMAdapter are often described as adapter objects in design patterns (ref-12).
  c) The user entity creates an instance of KBMAdapter Object and caches the IKBMColorPalette Interface (0103), during initialization. Thus in the new scheme, the user entity merely has to provide space for storing a reference of the IKBMColorPalette Interface. The KBMAdapter object is also referred to as Color Palette.

d) KBM translator assumes the presence of IKBMColorPalette interface reference in the user entity, and generates code accordingly, for storing and retrieving information about colors.
e) The KBMAdapter object may also serve as a centralized cache mechanism for storing the characteristics, and bindings of the object.

4.3) KBM Color Storage: The KBM color type and name are stored in the color table of the KBMAdapter, when the KBM rule associated with the color (colored rule) or method returns a "true" value.

If the color type and name already exist in the color table, the execution of the KBM rule is bypassed, unless the color is configured for re-evaluation, on every invocation (please refer to REEVALRULE tag of FIG. 03).

4.4) KBM Cache Storage: The KBM Cache Storage (not to be confused with KBM Entity Cache described later) is employed to hold:
a) characteristics of Entities
b) bindings of Entity (current) to other Entities
c) descriptions, which may reveal more information about the entity or its colors.

The KBMAdapter provides methods to add/change/delete characteristics and bindings, for a given entity (Please refer to IKBMCache Interface of Appendix-6). The references of these characteristics and bindings are stored in cache tables of the KBMAdapter, and may be retrieved by KBM color rules using the local reference color. It may be noted that the KBMAdapter is an extended part of the entity under consideration, and is equipped to handle several caches.

4.5) KBM Color Configuration: A KBM Object may be associated with a special object called Entity Map. FIG. 03 depicts the XML layout of the Entity Map object.

The KBM Entity Map object holds many important mappings like—

| a) Color map | b) Interface map | c) Event map |

4.5.1) Color Map: Color map (FIG. 03) depicts how a color is mapped to a rule/method. As shown in the figure, a COLORMAPENTRY describes, the color prefix, color name, whether, the color is rule based or token based, and whether the rule has to be re-evaluated even if it already found in the color table, and the lhs field of the kbm rule.

For procedure colors, the COLORINFOENTRY tag is used multiple times, to specify the procedure name, the method name used for initialising the procedure, and the method color. It may be noted that KB (ref-1), uses method color to identify the colors of the parameters of the methods.

Finally, COLORPARMS tag describes applicable characteristics and bindings as target name, and parameters.

4.5.2) Interface Map: KB (ref-1), described that oops interfaces would acquire the verb and noun colors of the object (entity). In KBM, interfaces could take colors independently, and dynamically.

The implementation employs one conceptual object per interface, and these conceptual objects are called Interface boxes. Each Interface box being a conceptual object could take KBM colors dynamically.

An interface of an object may now be selected based on colors of the interface box. Interface boxes, therefore appear to be like receptors, and several instances of objects, may possess several different colors for their interface boxes.

An entity may optionally declare what interfaces are to be regarded as interface boxes, in the entity maps. For each such oops interface, KBM automatically creates an interface box (conceptual object) with the same name.

The interface box reference (conceptual object) may be accessed as:

$KBM.IBox.interface-name+KB/KBM colors;

Interface Boxes may be treated as types, just like interfaces, and may be received or sent as formal parameters of methods. Interface boxes may be represented as arrays, and an unspecified number of these references may be received at run time, just like any other data type.

As an example, let us assume that an entity E1, has I1 and I2 as oops interfaces. Similarly, assume entity E2 has I1 and I3 as oops interfaces. The KBM statement: $KBM.IBox.I1+KB/KBM colors; would return an interface reference of type I1, if the interface box has the colors specified in the statement above, else a null is returned.

KBM Translator does the following during translation.

KBM checks all objects with in its scope, to see if they implement the interface I1, and gets the reference of the interface box from the adapter of the color palette. It may be noted that KBM objects may be generically accessed by the IKBMObject Interface.

At runtime, the following steps are performed.
a) The colors specified for the Interface box, are checked in the colors portion of the resolved conceptual object.
b) The object reference stored in the conceptual object is casted to the type of the oops interface, depicted by the interface box.

Following the above example, the code generated could be given as—

I1 intfref=(I1)cptobj.ref;

4.5.3) Event Map: The events handled by a KBM Object are depicted in the event map. This mapping table helps the KBM Translator to build a generic handler called "Action Controller" for a Rule.

4.6) KBM Entities for Abstract Rule Configurations: KBM employs the following entities for configuring abstract rules.

4.6.1) Abstract Object: A KBM object (class object) may be associated with a special object called abstract object. The abstract object defines a super type, and the KBM Object may claim this super type simply by this association, without the typical inheritance structure, which is necessary in case oops objects (ref-14).

4.6.2) Interaction Map: The interaction map depicts how an abstract interaction (specified in terms of abstract objects, taxonomy and auxiliary colors) is mapped to semantic roles and methods. FIG. 04A depicts the XML layout of interaction map.

4.6.3) Process Semantics Object: An entity may be associated with a special object called Process Semantics Object. The process semantics object holds the mapping of Semantic Roles and methods to Entity Interfaces and methods.

FIG. 04B depicts the XML layout of the Process Semantics Object.

5) KBM Operational Modeling: The KBM Operational Modeling deals with the creation and execution of complex process structures from relatively simpler KBM actions (or KBM Rules).

5.1) The KBM-DSC Framework: The KBM-DSC Framework was designed as a generic framework, to link several process structures (fine-grained) into a larger process structure (coarse-grained). The new complex process structures thus produced, may then be used to produce the next higher level of process structures. This built in recursive mechanism allows the DSC framework to produce robust process models.

The major advantages of the DSC Framework are:

| a) Uniformity | b) Reusability |
|---|---|

Figure 5:
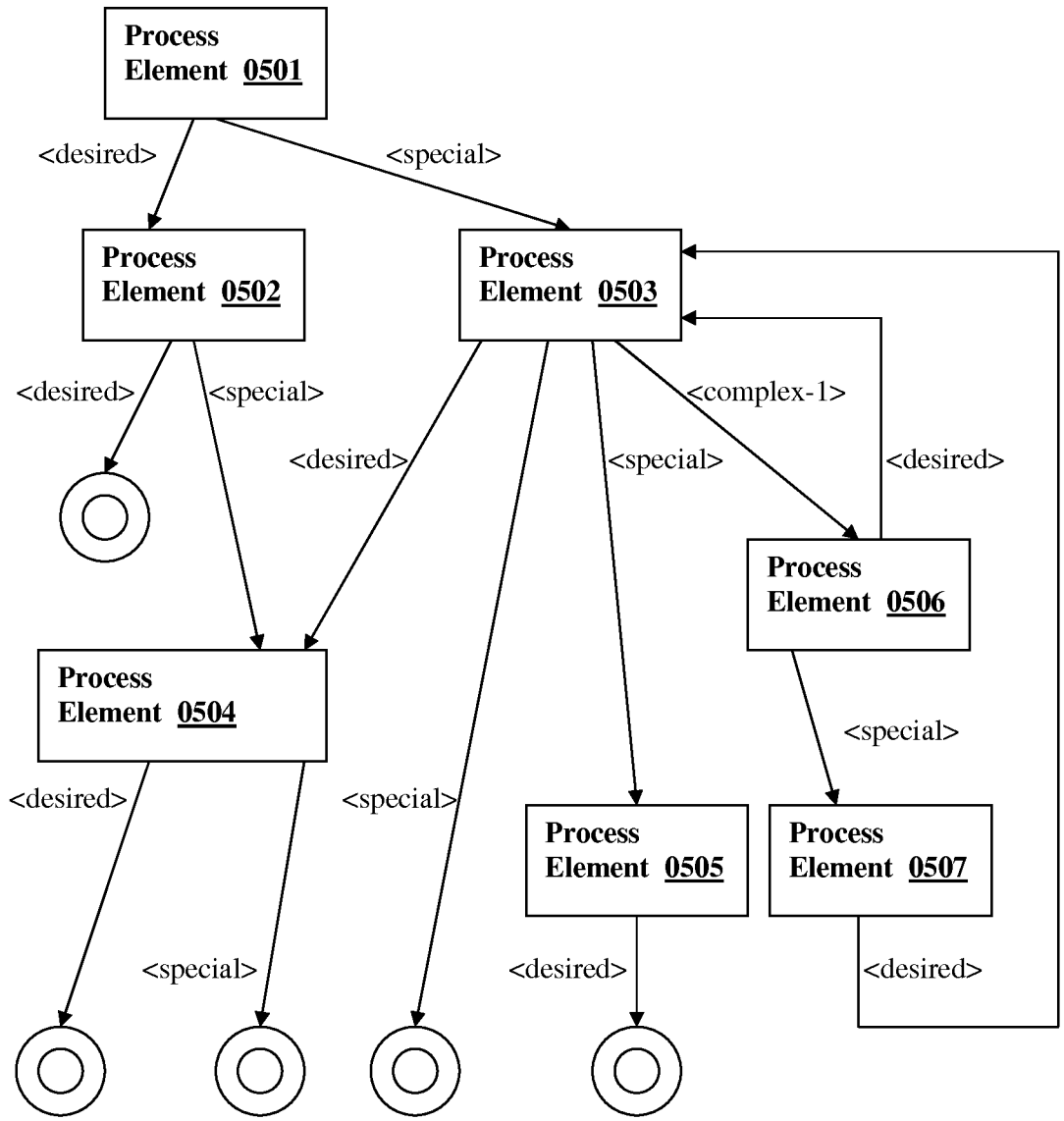

The generic DSC Framework is described below, with the help of FIG. 05.

5.1.1) A process structure (or process element) upon execution, can produce or reach three types of states/situations, which may be given as:

| a) Desired | b) Special | c) Complex |
|---|---|---|

5.1.2) The desired states/situations can optionally link to new process structures. The desired states may appear unattached at any process structure, at any level in the resulting graph. Informally, desired state implies that the process has reached a predefined objective.

5.1.3) The special states/situations link to new process structures in most cases. The special states may appear unattached only at the leaf level of the process structures. This additional restriction on special states is not strictly enforced, as a container at higher layer may take responsibility for the un-handled states at the lower level. Informally, the special state implies that a process has not reached its objective, and needs further processing by another process to reach the objective.

5.1.4) The complex states/situations always link to new process structures, such that either the desired or special states/situations of the new process structures loop back to the original process element, which produced the complex state/situation. The figure (FIG. 05) describes complex-1 state/situation, where the "desired" state of a child process structure, loops back to the original process element.

5.2) KBM Process Structures: KBM employs the DSC Framework, to build a variety of process models, as part of its activity modeling. The process structures (elements) of KBM are described below.

5.2.1) KBM Rule: This is the basic singular process structure, and manifests no states/situations.

5.2.2) KBM Rule-graph: A graph built from the KBM Rules, where the nodes and arcs of the Rule Graph are KBM Rules, is called a KBM Rule-graph or concrete Rule Graph (CRG). Abstract Rule Graphs (ARG) are a special variation, and employ abstract rules.

FIG. 07 depicts the KBM Rule Graph, and comprises of a name, type (abstract or normal), a set of nodes and a set of paths.

Each node of a rule graph has a node id, and a kbm-rule, which depicts an action implied by the node. The node has a set of arcs, wherein each arc can depict a kbm-rule independently. An arc of a node leads to a next node; and the arc will be traversed, only if the kbm-rule specified for the arc produces a true value, when evaluated. It is possible that a node could specify a singular rule called "ARCRULE", which yields either integer or string values, and the arcs could specify the possible values, the "ARCRULE" could produce, instead of an independent kbm-rule.

A path of the rule graph is a set of nodes and arcs specified as: node.arc.node . . . node;

A path could specify a set of situations, wherein each situation is specified as a kbm-rule, which yields a Boolean value.

The situation, which produces the Boolean true value, when executed, is regarded as the state of the rule graph. The state or situation of a rule graph may be configured as desired, or special or complex states.

Each state/situation reached is associated with a set of effects, which could be effect rules or Mu-Functions or Mu-Function procs (described in later sections). Typically, both operational and conceptual effects are specified.

Finally, it may be noted that during execution, the rule graph maintains a cache, which stores the references of entities of the terms of the rules of the nodes contained in the graph. These entity references, are assigned a special "instance id", which may be given as: node-id of rule in rule graph+term-id;

5.2.3) KBM Gear: A graph built from KBM Rule graphs, as nodes, is called a KBM Gear.

FIG. 08 depicts the KBM Gear, and comprises of a name, a set of nodes and a set of paths.

Each node of a gear has a node id, and a kbm rule graph, which depicts a compound action implied by the node. The node has a set of arcs, wherein each arc can depict a state reached by the rule graph. An arc of a node leads to a next node, and the arc will be traversed, if the kbm rule graph, when executed, reaches the state specified by the arc.

A path of the gear is a set of nodes and arcs specified as: node.arc.node . . . node;

A path depicts a state of the gear. The state of a gear may be configured as desired, or special or complex states.

When a Gear reaches a special state, it could create an object called "Gear Failure Object or record", and pass it to the activity in which it resides.

Each state reached is associated with a set of effects, which could be effect rules or Mu-Functions (or Mu-Function procs).

It may be noted that a KBM Gear is considered as a unit of transaction, and all commits and rollbacks are performed at this stage.

5.2.4) KBM Activity: A graph built from KBM Gears as nodes is called a KBM Activity. The description of the KBM activity is sub divided into operational, conceptual and deployment sub sections.

Operational Model: FIG. 09A depicts the Operational Model of KBM Activity, and comprises of a name, a set of nodes, a set of paths, and a map called mode of processing color map.

Each node of an activity has a node id, and a kbm gear, which depicts a compound action implied by the node. The node has a set of arcs, wherein each arc can depict a state reached by the gear. An arc of a node leads to a next node, and the arc will be traversed, if the kbm gear, when executed, reaches the state specified by the arc.

A path of the activity is a set of nodes and arcs specified as: node.arc.node . . . node;

A path depicts a state of the activity. The state of the activity may be configured as desired, or special states.

Each special state reached may be associated with a workflow queue name, and an activity failure object (or record).

In addition, a set of mode of processing colors, and the associated process control objects, are defined by the operational model of the activity.

Conceptual Model: FIG. 09B depicts the Conceptual Model of KBM Activity, which comprises of an activity name, a planning gear, and a set of macro entity names.

The planning gear information block comprises of a planning gear name, its package (directory name), and a map called disposition color map. The disposition color map (DISPCOLORMAP) provides a mapping entry, for each state reached by the panning gear, to a color called disposition color of the activity.

The macro entities section of the Conceptual Model of KBM Activity, comprises of entities, which are regarded as Macro Entities by the Activity.

Deployment Model: FIG. 09C depicts the Deployment Model of KBM Activity, which comprises of the activity name, O-Context table, default mode of processing color, and input requirements for executing the activity.

The O-Context, comprises of collaboration descriptor id, and a set of entries, wherein each entry comprises of an entity type, colors, an abstract id, taxonomy of the object, and the package (directory), where the entity definition resides. It may be noted that O-Context is inherited from KB (ref-1).

The default mode of processing identifies an entry of the mode of processing table of FIG. 09A, i.e. the default process controls object, which comprises of a set of predefined process controls.

The INPUTREQ portion of Deployment Model of KBM Activity, identifies the input field requirements for executing the activity. It may be noted that these requirements may be converted into a screen or form, for capturing inputs from the end user.

5.2.5) KBM Workflow: A KBM workflow is a set of KBM activities. The activities contained in the workflow are described by an XML document, called workflow document.

FIG. 10 depicts the workflow document, which comprises of a workflow name, and information blocks tagged as "SEQ" or "CONCUR". Activity names specified in the SEQ blocks are executed in sequential order, whereas activity names specified in CONCUR blocks are executed in concurrent mode. A mode of processing color may be assigned to each activity of SEQ or CONCUR blocks.

The execution of activities is controlled by a module called Workflow coordinator, which is supplied as part of the KBM runtime.

Typically, the input requirements of all the activities contained in the workflow is compiled, which forms the basis for the workflow request.

The work flow request is stored in a queue called "Work Flow" queue, which initiates the WorkFlow Coordinator for executing the work flow.

5.3) Interface between Gear & Activity States: A gear could have desired, special or complex states, which determine the post execution strategy employed by the gear. Upon completion, a gear may manifest the following behaviors, depending on the state of the gear reached.

When a gear reaches the desired state, it performs a commit operation.

When a gear reaches a special state, then it performs a commit operation, if the gear state reached is connected to another gear in the activity.

When a gear reaches a special state, then it performs a commit operation, if the gear state is not connected to another gear, and the gear is a leaf gear, in the activity graph.

When a gear reaches a special state, then it performs a rollback operation, if the gear state reached is unconnected to another gear in the activity, and the gear is not a leaf gear, in the activity graph.

In addition, a gear generates a record (or object) called "Gear Failure Record/Object", and passes it to the activity.

To create the Gear failure record, the Gear depends on the caches of entity references stored by every rule graph of the gear (Please refer to the last paragraph of the section on Rule Graphs-5.2.2).

To select the entity references and values out of this cache, KBM uses the cache as O-Context. Now, the newKObj operator may be employed to create a KBM Object based on requirements, which may be specified as a kbm-rule.

Finally, the "Gear Failure Record" is converted to XML document for platform neutrality.

The activity creates a record (or Object) called "Activity Failure Record/Object", with the following information.

a) Workflow Execution ID
b) Workflow name
c) Activity name
d) Gear name
e) Gear state reached
f) Gear Failure Record (as XML)

As stated in algorithm-12, the activity failure record is written to a user-configured queue (please refer to FIG. 09A), which initiates a user module, which would allow the user to correct the situation or state. The activity is re-executed by the workflow coordinator, after the correction.

6) Conceptual Modeling: Conceptual modeling attempts to provide an abstraction for the underlying entities and actions of an activity. Conceptual modeling of KBM is based on Panini auxiliaries (ref-8), and Panini linguistic modeling.

6.1) Conceptual Modeling—Panini: The Panini karaka theory (ref-8) is briefly described below.

6.1.1) Panini Auxiliaries: The Panini auxiliaries, which are also known as thematic roles in linguistics, are give as—

| a) Agent | b) Instrument | c) Source |
|---|---|---|
| d) Recipient | e) Object | f) Location |

In the Panini scheme, Instrument could be machinery or procedure. It may be noted that Proto-German also has "Path" as an auxiliary, which is missing in the Panini scheme.

Finally, it may be noted that thematic roles are studied extensively in linguistics (ref-9).

6.1.2) Lambda Functions: It is customary in linguistics to depict an action as a nameless function or lambda function as shown below.

λ (domain, activity, action, agent, instrument, source, recipient, object, location);

where, domain may be interpreted as "System+Subsystem", and the rest of the terms are already explained, in the description given above.

The granularity of the lambda functions may vary, i.e. they could be fine or atomic or, they could be coarse, and could be described by a recursive composition of other lambda functions, which are typically depicted as "and-or" graphs.

6.2) Problems with Panini's Model: Panini's model described above is not suitable for controlling machines. It may be noted that the auxiliary "location" exists only once; but in reality location, which could mean both time & position, is needed many times, to provide precision and unambiguous description of an action. For example, in a typical action, we may need the position of the source, position of the instrument, and position of the object.

Further, a great amount of description is implicit in the Panini model, and it is left to the intelligence of the humans to fill the gaps.

6.3) KBM Conceptual Model: The extensions of KBM to the Panini's linguistic model are called KBM conceptual model, and these extensions are described below.

6.3.1) Sub Types for Auxiliaries: During my research, I felt that assigning sub-types, to the thematic roles might bring rich improvements in depicting the interactions, as a computing machine is not endowed with the same intelligence as human beings, in grasping concepts.

Subtypes may be chosen based on need, and it may not be easily possible to enumerate all possible subtypes. A very useful but non-exhaustive list of the sub types were provided below.

| 1) Facilitator | 2) Producer | 3) Consumer |
|---|---|---|
| 4) Agonist | 5) Antagonist | 6) Observer |
| 7) Distributor | 8) Consolidator | 9) Analyzer |
| 10) Valuator | 11) Record Keeper | 12) Reporter |
| 13) Dispatcher | 14) Retriever | 15) Sender |
| 16) Receiver | 17) Transformer | 18) Invoker |
| 19) Donor | 20) Acceptor | 21) Terminator |
| 22) Creator | 23) Coordinator | 24) Controller |
| 25) Router | | |

Machinery may have to collaborate in a particular manner before (and during the process) they act upon the material. The sub types for auxiliaries enhance the capabilities for specification of thematic roles. Thus, lambda functions may be described more precisely and accurately, with the aid of auxiliary sub types described above.

6.3.2) Abstract Rule Graphs: A rule graph, whose nodes and arcs are defined abstractly, in terms of abstract objects with auxiliary colors, is called an abstract rule graph. A node or arc in an abstract rule graph, may be defined as:

a) AbstractEntity.%tax-taxonomy_id.%aux-auxiliary_color.token;

—or— b) AbstractEntity.%tax-taxonomy_id.%aux-auxiliary_color* . . . * AbstractEntity.%tax-taxonomy_id.%aux-auxiliary_color An abstract rule graph (ARG) may be translated into a concrete rule graph (CRG), by a process described in the operation section.

The aim of an Abstract rule graph (ARG) is to define a rule graph in an abstract manner, so that different entities (supplied by different vendors), with different abilities, could produce a logically equivalent concrete rule graph (CRG).

6.3.3) Interpretation of Linguistic Notions: A novel mechanism invented for the interpretation of linguistic notions, converts a lambda function into a set of functions called μ-functions.

Machinery as well as Material may undergo several transformations during an activity. As machines are not endowed with the same level of cognitive abilities as humans, they need highly precise descriptions to perform actions.

Linguistic notions depicted using Panini's auxiliaries therefore are not suitable as is, to describe complex actions and their effects, and need to be converted into a form more suitable for machines. This may be viewed as the basis for μ-functions.

6.3.4) μ-Functions: The μ-functions (or Mu-functions) were devised to depict operations related to the following concepts. In the following table, the left hand side denotes the concept, and the right hand side denotes the operation.

1) Factory: create, morph, delete;

2) Linkage: bind, unbind;

3) Movement: move;

4) Storage: add/insert, remove;

5) Fluent/Signal: send, receive;

6) Characteristic: increase, decrease, set, reset;

7) Computation: compute, perform;

8) Scheduler: start, stop, pause;

9) Event: publish, subscribe;

μ-functions may be grouped to form a pt-function procedure, and stored in a library.

It may be noted that μ-functions, may not be employed to write application logic; KB/KBM rules are more suitable for developing application logic. μ-functions are most suitable for modeling systems, and may be viewed as belonging to the class of control or scripting languages.

The μ-function has the following form:

μ (operation, type, situation, event-1, event-2, operand-list);

where,
- operation depicts the set of predefined operations listed above;
- type depicts the manner (or quality) of the operation, and the extent (or range or intensity) of the operation.
- situation depicts a Type-7C/9 kbm-rule, which is executed like any other kbm rule but works with conceptual objects, and produces a special conceptual object (of type Wrapper), which holds a Boolean value;
- Event-1 depicts the condition or situation, when the μ-function would be executed.
- Event-2 depicts the condition or situation, which may be produced as a result of execution of the μ-function.
- The format of the operands is depicted in Appendix-14A Incidentally, the entities upon which the μ-function acts may be recognized as conceptual objects (please refer to section 2.2). Each of the entities, like component, port, fluent, channel, which together comprise an operand, may take kbm colors in tokenized form.

Parsing a μ-function is fairly easy, as the first five fields contain the operation, type of operation, situation, the source event which triggers this μ-function, and the event produced by this μ-function. There could be a variable number of operands, after the first five fixed operands.

It may be noted a μ-function draws objects from either sources or places (which are typically implemented as O-Context); performs some actions on them, and finally deposits the finished products to same/other places, or sources. The KBM conceptual modeling scheme may have faint similarities to "Coordination Frameworks" like Linda tuple spaces (ref-10).

The following depicts a simple μ-function.

μ ("create", null, null, null, null,
  $kbm.comp.my.component.%v-abc);

This μ-function creates a component—

$kbm.comp.my.component.%v-abc;

and stores a reference of it in the O-Context. In conceptual modeling, O-Context is accessed in the same way as it is done in the operational modeling, except that O-Context entries may be dynamically created or destroyed. In contrast, in operational modeling, the entries of O-context are static, and cannot be added or deleted at runtime.

It may be noted that creation of a component is nothing but creation of a conceptual object, of type "component", which can be easily accomplished by the newCPTObj operator discussed before.

We can easily add ports to it as shown below.

μ ("bind", null, null, null, null,
  $kbm.comp.my.component.%v-abc,
  new $kbm.port.mainport.%v-uvw);

The reference of the conceptual object created for the conceptual entity "mainport" will be added as port to the conceptual entity "my.component".

We can connect a channel to the port as shown below.

μ ("bind", null, null, null, null,
  $kbm.comp.my.component.%v-abc.
  $kbm.port.mainport.%v-uvw,
  new $kbm.chan.first.channel.%v-xyz);

The formal semantics of the μ-functions are covered in greater detail in Appendix-14A.

Finally, it may be noted that hand creating the entire structure of a component could be quite a burden. The schema of a component may be depicted as a XML document, which describes the contained components, ports, fluents, signals, connector and/or channels.

Similarly, the execution structure of a set of components, called configuration, which comprises of the current sub components, and the linkages of the component with other components, may be persisted to a persistable storage medium, as an XML document. This document may be later used to re-load the structure.

6.3.5) KBM Macro Entities: A subset of components (conceptual entities), which take part in the conceptual processing of an activity, may be regarded as "Macro Entities". Please refer to FIG. 09B for the configuration details of Macro Entities in an activity.

FIG. 17, depicts the Macro entity configuration, which comprises of a name, and a set of aspects. A set of kbm rules, are configured for each aspect. Each of the kbm rules of an aspect, receive a unique id, called the state id of the aspect. The state id associated with the kbm rule, which yields a true value, when executed, is assigned to the aspect, as its state.

The current states of a set of aspects of a macro entity, may be viewed as a vector of integers, and is called an Aspect Vector. Thus, when a set of macro entities is taken into consideration, we may arrive at a set of Aspect Vectors.

A goal is defined as states of a set of aspects of several macro entities. Alternatively, a goal may be depicted as a set of Aspect Vectors of the macro entities. A goal may also prescribe several constraints on how the final set of Aspect Vectors may be reached starting from a given initial configuration for the Aspect Vectors.

6.3.6) KBM Macro Entity States & Configurations: A set of conceptual objects constitutes a configuration. An activity transforms one configuration, into another configuration.

States of a set of aspects of macro entities may be regarded as a planning state. Typically, the kbm rules specified for the aspects of the macro entities, of an activity (FIG. 09B), are executed to determine the planning state reached by the activity.

However, it may or may not be possible to re-establish the configuration by the same set of rules, which were employed to abstract the configuration. Typically, the exact configuration reached is persisted in a persistable storage (please refer to the last paragraph of section 6.3.4).

6.3.7) KBM Planner: KBM provides a tool called KBM Planner, which provides the following facilities—
a) Determine the switching behavior of activities, by a process called model checking.
b) Discover a set of activities, called workflow, which leads towards a goal state from a given initial state.

6.3.8) Model Checking: The KBM Model checking Framework was designed to provide greater insights into the operations of an activity.

A KBM rule-graph, which resolves into a path or a set of KBM rules when executed, can be further resolved into a set of µ-functions, via conceptual effects (FIG. 7).

Thus µ-functions of an activity may be compiled, and the execution creates/morphs/deletes conceptual objects. It may be noted that the µ-functions, of all the KBM Rule Graphs of the KBM gears of an activity, when executed, yields a configuration.

An activity may have several internal paths, which could lead to a particular desired or special state of the activity.

Conceptually, the disposition and mode of processing colors of an activity, determines the process execution colors and model colors of all sub process structures, contained within the activity. This may be described as:

Activity+disposition color+mode of processing color=>Activity+process execution color+model color;

The process execution color of the Activity determines the kbm gears, and the model color of the activity determines the process execution color and model color of the gears. Thus, we now have, Activity+process execution color+model color=>Gear-01+process execution color+model color* ... * Gear-*nn*+process execution color+model color;

The scheme is repeated to the next level as:

Gear-*ii*+process execution color+model color=>Rule-Graph-01+process execution color+model color* ... * Rule-Graph-*mm*+process execution color+model color;

FIG. 25, depicts the Process Structure table, which holds the above mappings, in a generic manner.

In FIG. 25, 2501 depicts the type of the process structure, 2502 depicts the Process Structure+process execution color+model color, and 2503 depicts the List of Target Process Structures+ process execution color+model color The Process Structure table (FIG. 25), is also employed to store the mapping—

Activity+disposition color+mode of processing color=>Activity+process execution color+model color;

It may be noted that the LHS portion of the mapping does not confirm to the table column (2502). A special type (2501) is created for activities to store these mappings.

Thus, given the disposition and mode of processing colors of an activity, we can determine the underlying gears, and the rule graphs within the gears. The paths of these rule graphs, give raise to a set of µ-functions, which when executed, could lead to a configuration. It may be noted that µ-functions are specified for a full or portion of a path of the KBM rule graph.

The kbm rules corresponding to the aspects of the macro entities (FIG. 17), may be executed, over this configuration, to arrive at the target planning state.

Thus, given an initial configuration (which is typically stored in a persistable storage medium), an initial planning state, and an Activity, plus its disposition and mode of processing colors, we can arrive at a target planning state. This information constitutes an entry of the Activity Switching Table (FIG. 22).

6.3.9) KBM Planning: Planning is an elaborate topic, which is studied at great length in "Artificial Intelligence" (ref-11).

KBM provides a mechanism for planning, which comprises of discovering a path, which leads towards a goal state from a given initial state. The initial and goal states may be recognized as states of a set of aspects of Macro Entities, or alternatively as planning states.

An activity as stated above, may be viewed as a switching function, which switches the states of aspects of macro entities to new states. However, an activity may switch the macro entity states in several ways, based on disposition or plasticity of a set of entities called pivot entities, and the mode of processing, i.e. the process controls employed for executing the activity.

An activity may provide a special gear called "planning gear", specifically to determine the disposition. FIG. 09B depicts the configuration required for the conceptual modeling of an activity, wherein the "planning gear" states are mapped to disposition colors. It may be noted that a gear reaches a state called "gear state" upon execution. FIG. 09B also depicts the macro entities of the activity.

A table called Activity Switching table is provided to hold the switching information of states of aspects of macro entities.

An entry of the Activity switching table as depicted in FIG. 22, which comprises of:

Activity name (2201), disposition of the activity (2202), mode of processing (2203), Start Macro Entity Aspect Vector (2204), which is states of a set of aspects of Macro entities, Target Macro Entity Aspect Vector (2205), which is also states of a set of aspects of Macro entities, and a Control Macro Entity Aspect Vector (2206), which is also states of a set of aspects of Macro entities.

KBM planning attempts to discover a path comprising of a set of activities, from given initial states of a set of aspects of macro entities, to final states of a set of aspects of macro entities.

After determining the activities, a workflow document may be generated from the activities, as an XML document.

FIG. 10 describes the layout of a workflow XML document, which is used by the Operational modeling layer as input for executing the workflow.

7) KBM System: The KBM system comprises of two important sub systems, which are referred to as—

| a) KBM Planner | b) KBM Translator |

Figure 21:
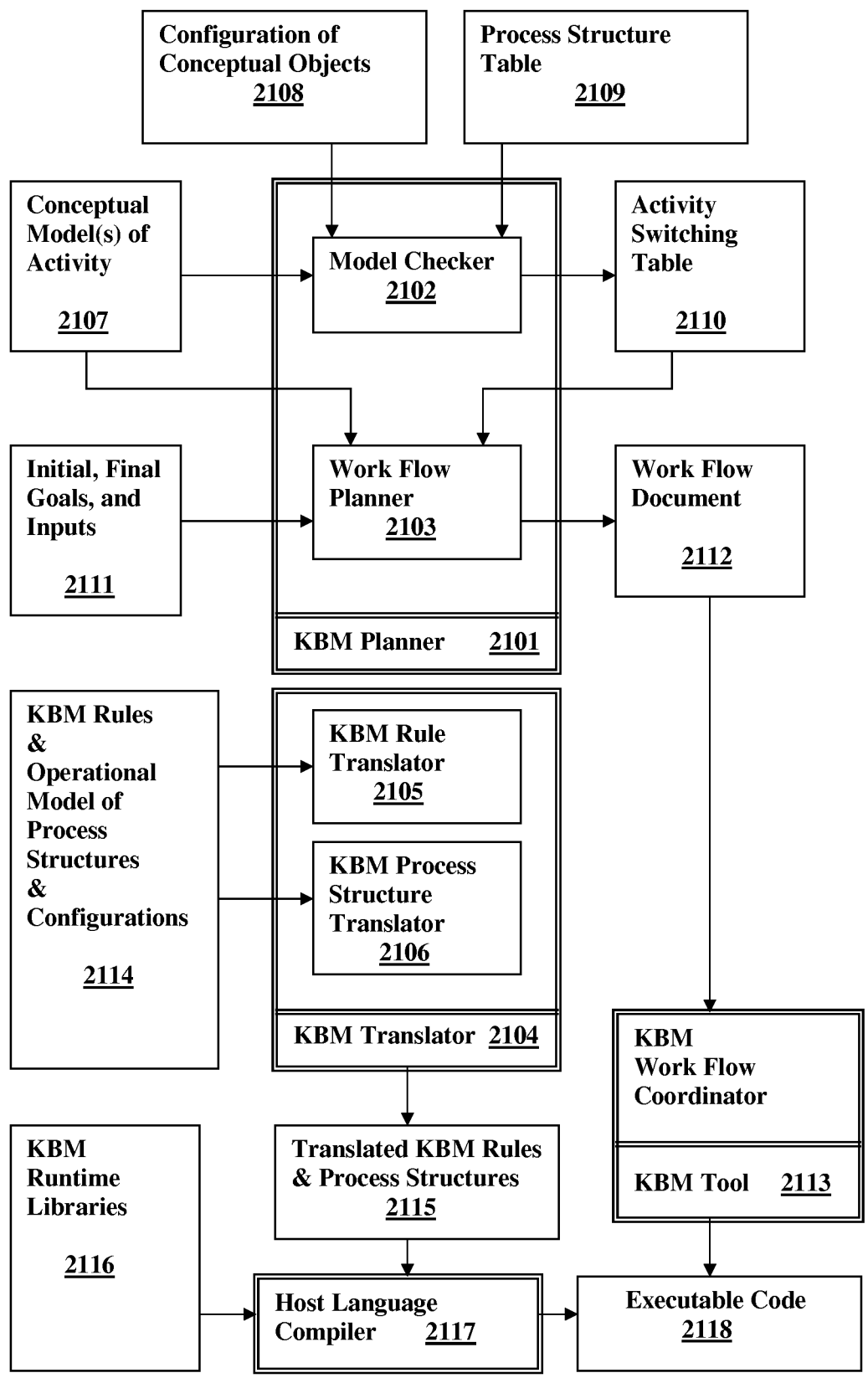

A high level overview of the KBM system is provided in the FIG. 21, wherein,

The KBM Planner sub system 2101, comprises of modules called KBM Model Checker 2102 and KBM Work flow Planner 2103.

The KBM Model Checker 2102, takes conceptual models of activities 2107, configuration of conceptual objects 2108, and the Process structure table 2109 (FIG. 25) as inputs, and creates entries in Activity Switching Table 2110 (FIG. 22).

The KBM Work flow Planner 2103, takes the conceptual model of activity 2107, initial/final goals, along with user inputs 2111, Activity Switching Table 2110 (FIG. 22), as inputs, and produces the KBM Workflow document 2112.

The KBM Translator sub system 2104, comprises of modules called KBM Rule Translator 2105, and the KBM Process Structure Translator 2106.

The KBM Rule Translator 2105, and KBM Process Structure Translator 2106, translate KBM Rules and operational models of process structures 2114, to host language equivalents 2115, which are further translated to executable code 2118, with the help of the host language compiler 2117, and KBM run time libraries 2116.

The KBM Work Flow Coordinator, 2113, which is a tool supplied as part of the KBM system, invokes the executable code 2118, based on the workflow document 2112.

The sub systems of the KBM system are described below.

7.1) KBM Planner: The KBM Planner sub system was designed to create the entries of the Activity Switching table, and to use it to discover workflows, for a given initial and final planning states. The details are covered in the operation section.

7.2) KBM Translator: KBM Translator was designed to translate KBM Colors, KBM Rules, and process structures. KBM translator is a predefined module of KBM, and is supplied as a part of the KBM System. KBM Translator was designed to work with KB Translator (ref-1). A brief description of KB Translator is provided in FIG. 13.

7.2.1) KBM Rule Processor: The KBM translator may be employed to translate "KBM rules or KB rules with KBM colors", to "KB rules, or directly to host language equivalents".

The KBM Translator provides the following two important modules, for KBM Rule Translation.

| a) The KBMColorProcessor | b) The KBMEqtHandler |
| --- | --- |

The notion of helper file of KB (ref-1) is generalized in KBM, and KBM Translator calls helper files as code containers or simply containers.

It may be noted that the KBM Translator consists of several ancillary code modules to assist in the KBM Rule translation process. It is assumed that a person well versed in the art, could easily produce the tiny helper functions, like parsing strings, parsing XML documents, which are usually required to make the processing complete.

7.2.1.1) KBM Rules—Structure: In KB (ref-1), a rule has a simple tree structure. A kb rule, can include other kb rules called sub rules, and so on. When these rules are expanded, we arrive at a tree structure. Each rule (or sub rule) constitutes a node, and is assigned a number called dft-seq-number (Depth-first-traversal sequence number). It may be noted that the top most node is assigned the node number 0.

The node number or dft-seq-number of the rule is very important to locate the rule and or its components.

The above scheme works well for KB Rules, but fails for KBM Rules. It may be noted that a term of a KBM Rule can now specify KBM colors, which may be mapped to KB/KBM Rules. In other words, KBM Rules are two dimensional in nature, where as KB rules are single dimensional.

To alleviate this problem, a different type of dft-seq-number called color dft-seq-number of cdft-seq-number was invented. The main rule is assigned a cdft-seq-number of 0. The colored rules of the terms of the main rule receive subsequent cdft-seq-numbers and so on in recursive mode, in depth first traversal (dft order).

For example, consider a simple KBM Rule given as shown below.

$$T1.\%kb\text{-}colors.\%kbm\text{-}color\text{-}11.\%kbm\text{-}color\text{-}12 * T2.\%kb\text{-}colors.\%kbm\text{-}color\text{-}21.\%kbm\text{-}color\text{-}22 * Tn.\%kb\text{-}colors.\%kbm\text{-}color\text{-}n1.\%kbm\text{-}color\text{-}n2; \quad (3)$$

This rule being a main rule would receive 0 as cdft-seq-number. The kbm rule has three terms T1, T2, and Tn (the entity types are irrelevant to this discussion). Each term has two kbm colors. Assuming that the kbm colors of all terms are mapped to kbm rules, then these rules would receive colored dft-seq-numbers or cdft-seq-numbers as:

Rule of kbm-color-11=1; Rule of kbm-color-12=2;
Rule of kbm-color-21=3; Rule of kbm-color-22=4;
and so on.

In the above assignment it is tacitly assumed that the kbm colored rules in turn have no terms with kbm colors. If for example, the rule of kbm-color-11 has terms with kbm colors, then these colors and associated colored rules will be assigned cdft-seq-numbers ahead of the rule of kbm-color-12.

Finally, it may be noted that the cdft-seq-number identifies the main rule or a particular colored rule, where as the dft-seq-number identifies a sub rule within a rule (colored rule or main rule).

7.2.1.2) Code Files—Structure: The structure of the code files generated by the KBM rule generation modules is described below.

The KBMColorProcessor generates a class file, for determining the entity references of the terms of the kbm rule, based on the horizontal structural rule for sources. This class file is henceforth referred to as "EntityRefs" class.

The name of this class file is determined as shown below.   class-name_method-name_collaboration-desc-id.
kb-statement-id_cdft-seq-num_dft-seq-num_EntityRefs For example, if the kbm rule described above in equation (3) is specified in a class file called "CarSpec", in a method called "print", and if the collaboration descriptor has a value of "XYZ", and the kb statement has an id of "stmt0", then the EntityRefs class name may be given as:
CarSpec_print_XYZ_stmt0_0_0_EntityRefs The KBMEqtHandler generates a class file for each term, "T1 thru Tn" of the KBM Rule. These classes would process the colored rules associated with the colors of the terms.

The class files are stored in a folder (package), whose name is determined as: class-name.method-name.collaboration-desc-id It may be noted that the class generated for each term Ti contains—
i) A method for each KBM color of the Term Ti, which is mapped to a KBM Rule or a procedure.
ii) A method called "driver" to invoke the methods of the KBM colors.
iii) A method called "controller", which controls the execution of the methods.

7.2.2) KBM Process Structure Translator: The KBM process structure Translator was designed to translate process structures like KBM Rule Graphs, KBM Gears, and KBM Activities to host language equivalents. The translation details are covered in the operation section of this document.

Operation—FIGS. 16 thru 24

Preferred Embodiment

The operation of the present invention (KBM) is illustrated below with the help of FIGS. 16 thru 24.
The operation of the KBM system is divided into several sections, based on the underlying modules of the system.
1) Abstract Modeling: The KBM abstract modeling module performs the following tasks.
   1.1) Translation of ARG to CRG: The translation of Abstract Rule graph to Concrete rule graph is accomplished by the procedure described in Appendix-8.
2) Conceptual Modeling: The KBM conceptual modeling module performs the following tasks.
   2.1) Translation of Conceptual Objects: The conceptual objects are translated to a predefined object called KBMCPTObject supplied by the KBM runtime. The layout of the KBMCPTObject is depicted in FIG. 06A.
   2.2) KBM Planning: KBM Planner, is a pre-built software module, supplied as a part of KBM System, to perform the following tasks.
      2.2.1) Model Checking: Model checking aims to determine the switching behavior of activities, from an initial set of conceptual objects (called configuration), as described below.
         2.2.1.1) The applicable rule graphs (for an activity) are determined for a mode of processing, and disposition color of the activity, from the Process Structure table (FIG. 25).
         2.2.1.2) The Mu-functions, are compiled from the rule graphs, determined above.
         2.2.1.3) The initial configuration of the conceptual objects, which is typically persisted as an XML document, is loaded into memory.
         2.2.1.4) The Model checking algorithm described in Appendix-14B, is executed, to determine the new configuration of the conceptual objects.
         2.2.1.5) The Macro entities of the activity, are determined from the configuration files (FIG. 09B), of the activity.
         2.2.1.6) The states of the aspects of the Macro entities are determined from the configuration of the Macro Entities (FIG. 17).
         2.2.1.7) The above switching is recorded in the Activity Switching Table (FIG. 22), as a new entry.

2.2.2) Generate Work Flow: A high level description of the KBM Planning process is furnished below. A detailed algorithm is described in Appendix-20.
         2.2.2.1) The Activity Switching Table is employed to retrieve the possible activities, which could transform, a given initial set of states of aspects of macro entities, to a final set of states of aspects of macro entities. This activities constitute a graph.
         2.2.2.2) For each of these activities, the disposition color may be determined from the inputs of the activity, by executing the planning gear associated with the activity.
         2.2.2.3) An activity may employ a set of process controls to process the entities. The features and characteristics of these process controls may be depicted by a color called the "mode of processing" color as described in the previous sections.
         2.2.2.4) The disposition and mode of processing together determine how an activity might switch the states of aspects of macro entities.
         2.2.2.5) Thus, the refinement to the Activity switching table entries obtained in step 2.2.2.1, are obtained. A possible path, from the initial state to the final goal, after taking the refinement into consideration, is called the workflow.
3) Operational Modeling: The KBM operational modeling module provides the following services:
   a) translation of Application modules written according to KBM specifications to equivalent KB statements or host language equivalents.
   b) runtime execution support for the translated code.
   The KBM translator, is a pre-built software module supplied as a part of KBM System, to translate KBM colors, rules, and process structures like rule-graphs, gears, activities, and work flows to equivalent host language statements.
   Appendix-1 depicts the important changes employed by KBM, with respect to KB (ref-1).
   3.1) Translation of KBM Colors: A high level description of the procedure employed by the KBM Translator to translate KBM colors is depicted below. The actual translation forms a part of the procedures described in Appendixes-2, and 3.
      The verb and auxiliary colors of KB, are treated as main colors of an entity type, and are used for locating the entity, in the KB/KBM contexts.
      If a term of the KB/KBM rule has specified a "procedure" or "dataset" color, then these are translated, before any other KBM colors.
      The "id" reference color may be specified along with "ds" color, if such a specification is found; it is translated immediately after the translation of the "ds" color.
      The "id" reference color may not be specified along with "proc" color, and would be ignored if specified, because a newly created entity reference may not have an "id".
      Any pre processing required for the kbm colors is performed at this stage.
      The complex colors like "category", "form", "model", "capability", "binding", "characteristic" colors are translated, at this stage.
      The "local reference" color is translated.
      Once the KBM colors are translated the KB/KBM Rule is in a form, which could be translated by the KB Translator.

The KB/KBM Rule is further translated by the KB Translator.

If a Function handler (Please refer to FIG. 11) is defined for the rule, it is executed at this stage.

Code is generated to evaluate the "process execution", "functional" and "transformation" KBM colors, based on the specification found in FIG. 15 for the rule (or process structure) and entities. This code will be executed, during the post-processing phase of the KBM Rule execution.

Finally, Effect rules defined for the KBM rule are invoked.

3.2) Pre-Processing for KBM Colors: The translation of characteristics and binding KBM colors may require pre processing, which is described below. Please refer to FIG. 02 for a high level description of the technique.

Pre-Processing for Characteristics Color: The pre-processing required for translating the KBM characteristics color is described below.

The translation of: Entity-Type-01.%v-abc.%ch-XYZ, is as follows:

a) The reference of the Entity-Type-01 is obtained, by processing the procedure color or the data set colors, or from the default data set.

b) The characteristics color is typically associated with a KBM rule, and the terms of this rule may be given as:

Entity-Type-01.%v-abc.Entity-Type-02.%v-uvw.%lref-charecteristics

It may be noted that Entity-Type-01 reference is already established, and the reference of Entity-Type-02 may now be retrieved from the characteristics cache, due to the lref-characteristics specification.

KBM generates code to look up the "characteristics cache" of Entity-Type-01, for the Entity-Type-02.%v-uvw, and retrieves the associated target reference.

It may be noted that the characteristics cache has the format:

<name, parameters, reference-of-the-target-object> where, name is the type of the target entity and may be given as: Target-Entity-Type+verb-color.

The entity references of the term are now fully resolved, and the term can now be executed.

Pre-Processing for Binding Color: The pre-processing required for translating the KBM binding color is described below.

The translation of: Entity-Type-01.%bind-XYZ, is as follows:

a) The Entity Maps (FIG. 03) is consulted, and the COLORPARMS are retrieved.

It may be noted that, the COLORPARMS may be given as:

KBMColor→{Target-Name, Target-Parameters} list, where, Target-Name may be given as Target-Entity-Type+verb-color.

This information is stored in a temporary vector (temporary variable).

b) Code is generated, which when executed at runtime, would search the "bindings" cache of Entity-Type-1, for the Target-Entity-Type+verb-color, and Parameters stored in the temporary vector.

It may be noted that the binding cache has the format: <name, parameters, reference-of-the-target-object> where, name is the type of the target entity and may be given as:

Target-Entity-Type+verb-color.

The above search yields the references of the target, which are copied from the bindings cache of Entity-Type-1 to a "default" cache.

c) The binding color is also associated with a KBM rule, and the terms of this rule may access the source (Entity-Type-01) or target entity (Entity-Type-02) as:

Entity-Type-01.%v-abc→to gain access to the source of the binding;

Entity-Type-01.%v-abc.Entity-Type-02.%v-uvw.%lref-default→to gain access to the target;

the target reference is also added to A-context, with the name $kbm.$tgtref.classname.colorprefix-colorname Thus, the KBM rule associated with the binding color, could now gain access the Entity-Type-01 (the source of binding), and Entity-Type-02 (the target of binding).

3.3) Translation of KBM Rules: The KBM translator is built to work in tandem, with the KB translator to translate KBM Rules and colors. The KB Translator processes all rules, but when KBM colors or operators are detected, the KB Translator invokes the KBM Translator.

Figure 16A:
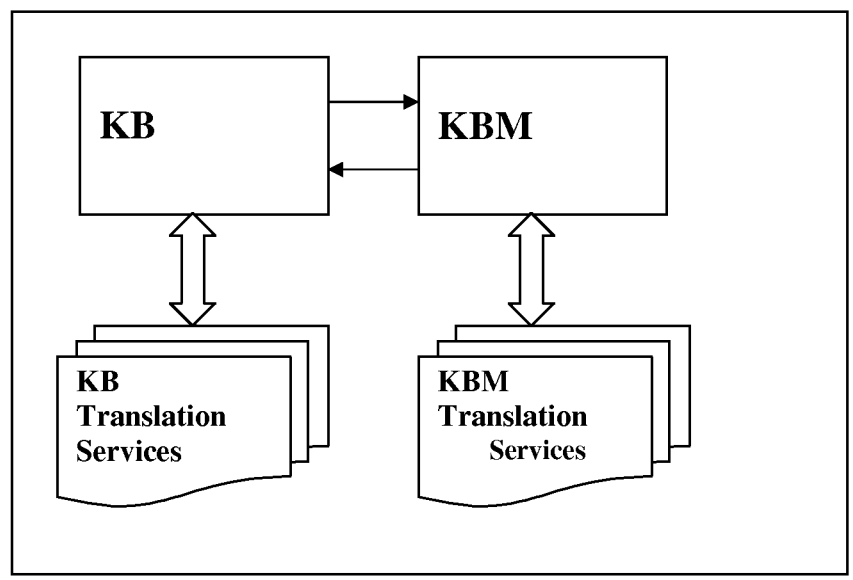
Figure 16B:
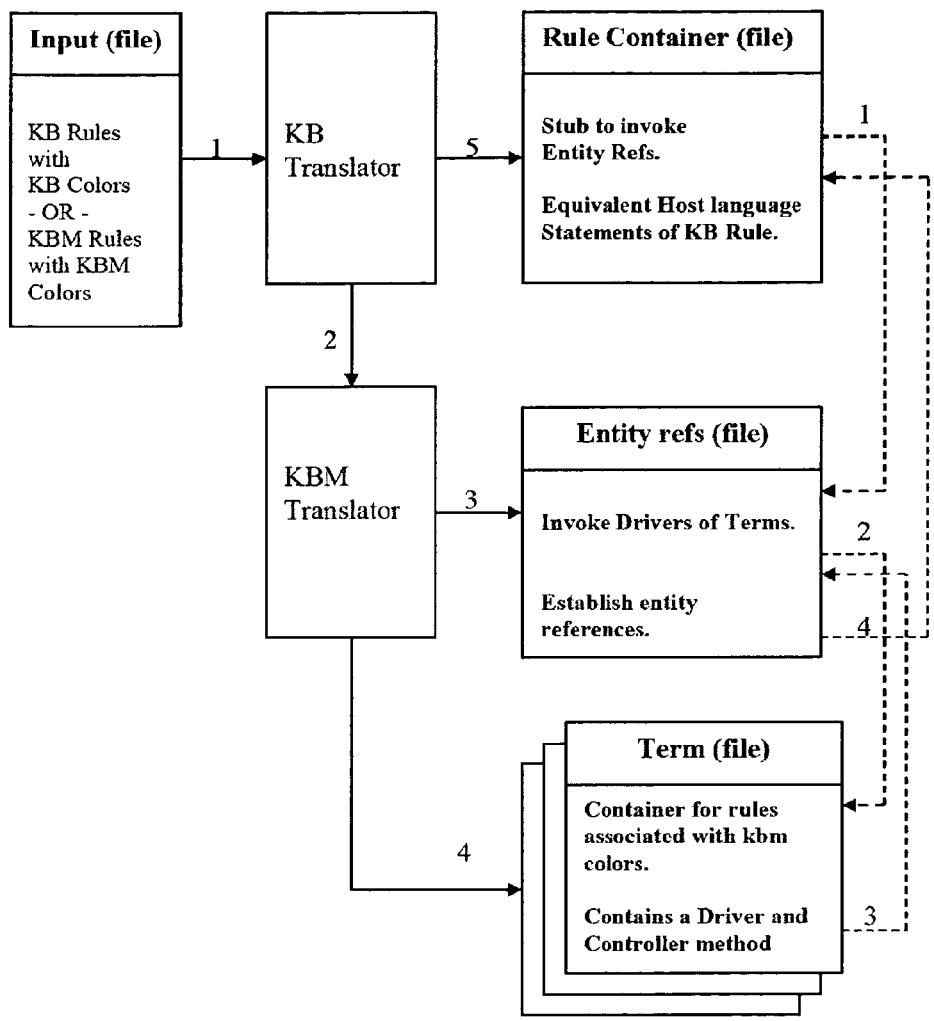
Figure 16C:
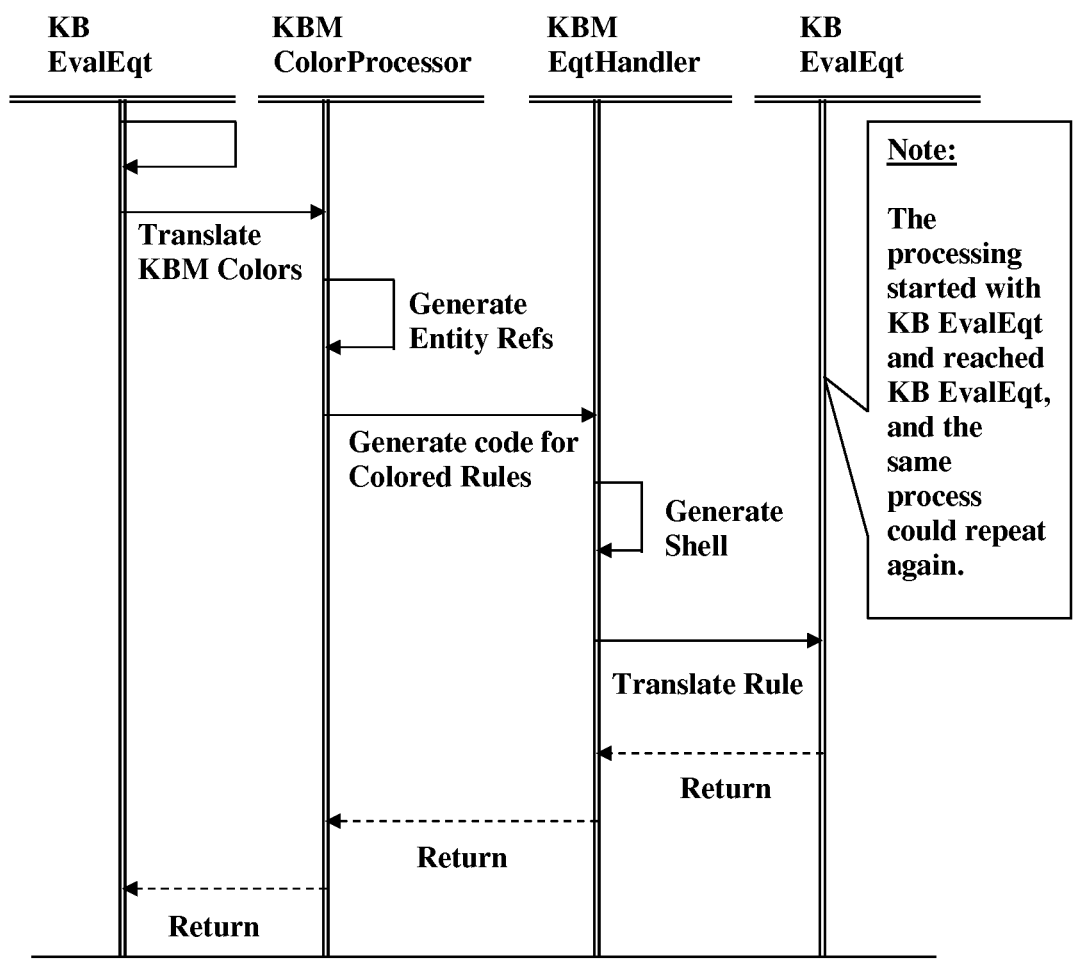

FIG. 16A depicts the interaction between KB and KBM, wherein KB (ref-1) parses the rules, and transfers the KBM colors of terms of the rule to KBM translator. The KBM translator completes the translation of KBM colors, and identifies the Entity references implied by the KBM colors. Finally, KB translator translates the rule as if it were a KB rule. The same process is applied for the colored rules being translated. Since the terms of a KBM colored rule may specify colors for its terms, we arrive at a recursive process, which is depicted in FIG. 16C.

As stated before in the description section, the translation of KBM rules is largely dependent upon the KBMColorProcessor and KBMEqtHandler modules, which are described in detail in Appendixes-2 and 3 respectively.

The operation of the code generated by the KBMColorProcessor and KBMEqtHandler modules, of the KBM Translator is described in Appendixes-15 thru 19.

The processing of Type-9 Rules is described in Appendix-13.

A sample problem and the solution using KBM rules is described in Appendix-7 and the code listings cited in Appendix-22.

3.4) Translation of KBM Operators: The translation of KBM operators is described below.

3.4.1) The Exists and NotExists operators may be specified before the term, and their translation resolves into checking for the existence or non-existence of an entity reference.

3.4.2) The implementation (pseudo code) of the newCPTObj operator is described below for creating a new conceptual object.

```
// create the conceptual object
KBMCPTObject xyz = new KBMCPTObject( );
IKBMCPTObject kbmobj = (IKBMCPTObject) xyz;
```

```
// KBM Conceptual object holds a reference of the KBM Adapter
IKBMColorPalette ikbmcp = kbmobj.getKBMColorPalette( );
// The KBM color palette interface may be typecasted to the color
// interfaces of the KBMAdapter, and the colors may be added to the
// color palette.
// - - - - - This part is omitted
// add conceptual object created above to context
kbm.rt.ContextHelper.add(kbmobj);
```

3.4.3) The implementation (pseudo code) of the newKObj operator is described below for creating a new kbm object. As a result of this command, the following steps are performed.
- the kbm-rule is executed, and the references/values of the terms are obtained.
- an instance of the kbm object is created, using the default no argument constructor.
- the entity references/values obtained by executing the kbm-rule are packaged as a vector, and this vector is passed to a method called "load".
- the "load" method, copies the references/values of the objects into the respective fields of the kbm object.
- It may be noted that pass-by-value/pass-by-reference semantics of host language, must be taken into account during this translation.

3.4.4) The translation of the "charec" operator is as described below.
- The left hand side and right hand side entity references are obtained from the contexts.
- The KBMAdapter reference i.e. the IKBMColorPalette interface reference is obtained using the IKBMObject Interface.
- The characteristics cache table of the left hand side entity reference is retrieved, and the target name, is set to the entity type+verb color of the target, the parameters received are set as parms, and the reference of the right hand side entity is stored as target reference.

3.4.5) The translation of the "Bind", "Rebind", and "Unbind" operators, is as described below.
- The left hand side and right hand side entity references are obtained from the contexts.
- The KBMAdapter reference i.e. the IKBMColorPalette interface reference is obtained using the IKBMObject Interface.
- The binding link name, parms, and target reference are stored in the binding cache table of the left hand side entity reference.

3.4.6) The translation of the set operator is as described below.
- The entity reference is obtained from the contexts.
- The KBMAdapter reference i.e. the IKBMColorPalette interface reference is obtained using the IKBMObject Interface.
- The KBM color specified via the set operator is modified, using the IKBMColor interface. It may be noted that IKBMColor interface, has methods for accessing and updating the colors.

3.5) Translation of KBM Process Structures: The translation of the KBM process structures is described by the algorithms given in appendix-9 and 10.

3.6) Execution of KBM Process Structures: The execution of KBM process structures is described below.

3.6.1) KBM Activity execution: The execution of the KBM Activity is accomplished by using the algorithm described in appendix-11. It may be noted that these algorithms are generic and can be applied generically to all types of KBM process structures. Hence, the same algorithm is recursively applied to underlying process structures of the activity like gears and rule-graphs.

3.6.2) KBM Work Flow Execution: KBM provides a pre built software module called "KBM Work Flow Coordinator", which schedules activities, and receives status updates, upon their completion. The completion status of the activity is used to trigger new activities. Appendix-12 depicts the algorithm employed by KBM for executing the Workflows.

CONCLUSION, RAMIFICATIONS & SCOPE

A path of a rule graph of KBM may be alternatively viewed as a set of entities+colors, along with the transformations of the colors. Thus, a rule graph describes how a set of entities may morph, under a set of constraints defined by another set of entities+colors. Thus operational and conceptual activity models of KBM, may be viewed as machinery vs. material interaction, and provide ample scope for reasoning.

The conceptual activity models of KBM provide deeper insights into the processing scenarios, and how these finer processes are ordered, and executed. For example, the shifts in states of an aspect of a macro entity may be represented as a graph called the abstract process graph or APG. The activities of a workflow may be constrained to cause shifts in the states of aspects of the macro entities, as defined by the APG's associated with the macro entities. This may be viewed as a natural extension to the KBM Planning, and may be regarded as constrained KBM Planning.

The KBM horizontal structural rules described in this invention, determine the first set of entity references, and then execute the body of the rule. In general, we could repeat this behavior, to determine all sets of entity references, by making use of the second KBM horizontal structural rule (which incidentally is the only structural rule available to KB).

The KBM structural rule logic determines the first set of entities, which satisfy the requirements laid out by the vertical structural rules. Sometimes, we may be interested in the first "failure" rather than success. Thus, the vertical structural rule may be expanded to cover situations such as "if not exists", and "for all".

The invalidation techniques described in Appendixes-18 & 19 may be viewed as advanced invalidation techniques, and may be implemented optionally. Alternatively, the choice of the invalidation technique may be sought from the user via the COLORINFOENTRY tag, in the Entity Maps configuration (FIG. 3).

The procedure object is currently required to default to getNext( ) method, when a getCur( ) method is received, and when the procedure object is in a "reset" state. This behavior is required, because invalidate flags for objects are used, only when the rules are in dormant state in the KBM Entity Cache. The invalidate flags for objects of the currently executing rule are not saved. An implementation could choose a variant of this technique, whereby the invalidate flag of the object is reset, after its effects are performed; and by saving the invalidation flags, if they are set during execution. Typically, the invalidation flag of the first term of the KBM rule, which does not have previous terms, needs to be saved, when the first term is at end-of-source.

Finally, the names of the interfaces, classes, modules, table names, documents and many other specificities, described in this document are merely illustrations, and may not be construed as limitations, and an implementer may modify such entities, according to the constraints imposed by the environment, where the invention (KBM) or any part of it, may be used. Many of the configuration documents are described as XML documents, which is a popular format for describing configurations. However, these configuration documents may be stored in many alternate formats. The description and the operation of the invention were also constrained, by the vast number of permutations and combinations of the underlying mechanisms of the invention. Hence, this application may be viewed in terms of the underlying mechanisms of the invention, and not merely upon the specificities of the permutations and combinations of the underlying mechanisms, chosen for presenting the invention.

REFERENCES

The following references are incorporated by references, into the present application.
1) Mechanism and system for representing and processing rules: US patent
    Pilla Gurumurty Patrudu: www.uspto.gov
    U.S. Pat. No. 7,890,928; date: 15 Feb. 2011.
2) Mechanism and system for representing and processing Activity Models:
    USPTO Provisional patent application. Pilla Gurumurty Patrudu: www.uspto.gov patent No. 61/686,349; date: 4 Apr. 2012.
3) Aristotle, Categories: http://plato.stanford.edu/entries/categories
4) The Unified Modeling Language (UML) User guide: Tenth Indian Reprint, 2003 Grady Booch/James Rumbaugh/Ivar Jacobson: Addison Wesley
    ISBN 81-7808-169-5.
5) Web Services Business Process Execution Language Version 2.0: Specification OASIS Standard: http://docs.oasis-open.org/wsbpel/2.0/wsbpel-v2.0.pdf
    11 Apr. 2007.
6) DAML-S: Semantic Markup for Web Services: White Paper
    DAML Services Coalition: http://www.daml.org/services/daml-s/0.9/daml-s.pdf
7) OMG Model Driven Architecture: Specification
    OMG: http://www.omg.org/mda/specs.htm
8) Knowledge Representation in Sanskrit and Artificial Intelligence: Paper Rick Briggs: http://www.vedicsciences.net/articles/sanskrit-nasa.html [Original Paper: AI Magazine, Vol. 6, No. 1 of spring 1985]
9) Thematic Roles and Semantics: Paper
    David R. Dowty: Proceedings of the Twelfth Annual Meeting of the Berkeley Linguistics Society (1986), pp. 340-354.
10) How to Write Parallel Programs—A Guide to the Perplexed: Paper
    Nicholas Carriero and David Gelernter: ACM Computing Surveys, Vol. 21, No. 3, September 1989.
11) Artificial Intelligence: A Modern Approach: Second edition.
    Stuart Russell and Peter Norvig: Pearson Education Inc. ISBN 978-81-7758-367-0.
12) Design Patterns: Fifteenth Indian Reprint, 2005
    Erich Gamma, et al.: Pearson Education Inc. ISBN 81-7808-135-0.
13) C++: The Complete Reference: Second edition
    Herbert Schildt: Osborne McGraw-Hill. ISBN 0-07-882123-1.
14) The Java Programming Language: Third Edition
    Ken Arnold/James Gosling/David Holmes: Addison Wesley
    ISBN 81-7808-148-2.
15) IBM™ MQSeries—Application Programming Guide. SC33-0807-12. http://publib.boulder.ibm.com/iseries/v5r2/ic2924/books/csqzal05.pdf

APPENDIX-1

Enhancements to the KB System
The KB system is enhanced to work in conjunction with KBM, both at translation and runtime. The most important enhancements are described below.
1) O-Context: KB (ref-1) utilizes a data structure called collaboration descriptor to hold the references of the collaborating objects. The collaboration descriptor holds lot more information, than the collaborating objects vector (which is also regarded as O-Context).
    In KB, the verb color and auxiliary verb color are regarded as static colors, and an EntityType+verb-color+Auxiliary-verb-color, resolves into an entity reference.
    In KBM, an EntityType+verb-color+Auxiliary-verb-color, resolves into a vector of entity instances.
    KBM provides a data structure called CObject (FIG. 14), which depicts the new layout for the collaboration object. It may be noted that the CObject data structure provides a feature called "data sets", by which the vector of entity references, may be further divided into sub sets. Thus instead of just a single set of instances, we arrive at a set of data sets, where each data set is a set of entity references.
2) Access to data sets: KBM could access the data sets of O-Context as described below.
    An entity type+verb color+auxiliary color after translation, leads us to CObjects, as shown below.
    CObject [ ] cobjViewKBM={clbparm.cDesc.cobj_ref.get (1)}; //generated by KB Translator
    Vector cobjView=(Vector)(cobjViewKBM[cobjViewKBM.length–1]) .cobjinst.lastElement( );
3) Integration of KB & KBM Translators: The Algorithm-2 of KB (ref-1) specifically deals with KB Rule translation. The algorithm is upgraded to use a special data structure called EqtInfo. This special data structure (which is considered as part of KB, reference-1) helps in integrating the KB and KBM translators. Please refer to Appendix-21, for more details.
    The Step-9 of the Algorithm-2 of KB (ref-1), is modified as described below.
    3.1) Before executing the Step-9 of Algorithm-2, the KB Translator checks for the existence of KBM colors.
    3.2) If KBM colors are found, then it invokes the process method of a component of KBM Translator called KBMColorProcessor, with the KBM colors. The KBMColorProcessor generates a code container with a suffix "_EntityRefs".
    3.3) After returning from the KBMColorProcessor, a stub code is generated to invoke the code generated ("_EntityRefs") by the KBM Translator.

APPENDIX-2

KBM Color Processor
The operation of KBMColorProcessor (class) module of the KBM Translator is described below. A high level description of the processing described here, is provided in FIG. 16B. This class provides two methods called init and process, and several ancillary methods for housekeeping. As described in Appendix-1, the evalEqt method of Appendix-2 of KB (ref-1), is modified to invoke these methods.

It may be noted that equivalent pseudo code is shown where necessary, instead of the actual code, as the actual working code has too many decorations, and may be slightly difficult to understand.

1) The KBMColorProcessor receives the collaboration parameter (clbparm) and equation info (eqtinfo) as parameters, during the constructor phase, which are stored in the internal storage of the class. It may be noted that the eqtinfo parameter holds the kbm rule being translated.
2) The init method of the KBMColorProcessor class performs the following steps.
    2.1) The init method, checks for the existence of KBM Terms, i.e. terms with kbm colors.
    2.2) If KBM Terms are not found, the method returns a boolean false to the caller.
    2.3) If KBM terms are found, then the init method creates a file with a name obtained by the concatenation of:

```
clbparm.classname         + "_" + clbparm.methodname        + "_" +
clbparm.collaboration-desc-id + "_" + clbparm.kbstmt            + "_" +
eqtInfo.getCDftSeqNum( )  + "_" + eqtInfo.getDftSeqNum( ) + "_" +
"EntityRefs";
```

2.4) The reference of the file is stored in the storage of the KBMColorProcessor class.
3) The process method of the KBMColorProcessor class performs the following steps. It may be noted that this method generates a code file called "EntityRefs".
    3.1) A variable called pkgname is created and its value is set to the classname.method-name.colloaboration-desc-id
        Code is generated (written into) in the code file "Entity-refs" created in the init method (please refer to step 2) of this class.
        The headers of the EntityRefs code file like package name, and import statements, along with class declaration are generated.
        It may be noted that the class name is same as the code file name created by the init method described in step 2.
        The default constructor, and the signature for a method called "process" are generated. The following describes how the process method of the EntityRefs class file would be generated.
    3.2) Code is generated to retrieve the Entity Cache (Please refer to Appendix-21) from the C-context of the collaboration parameter. The equivalent pseudo code of the generated code may be depicted as:

```
KBMCContext kbmcctx = clbparm.kbmccontext;
KBMEntityCache kbmec = kbmcctx.getEntityCache(clbparm.kbstmt,
                               eqtInfo.getCDftSeqNum( ),
                               eqtInfo.getDftSeqNum( ));
```

It may be noted that KBMEntityCache class module is supplied as part of KBM runtime.
    3.3) The KBM Terms of the rule being translated are obtained.
    3.4) For each kbm term of the current rule, the following steps are performed.
        The current term is represented by the variable "i".
        The intent of this step is to initialize the procedure objects, if a proc color is specified for the terms.
        3.4.1) The proc object name, which is defined in the meta data configuration files of the entity type (FIG. 03) of the term, is retrieved from COLORINFOENTRY tags. This step requires paring of the meta data XML File "Entity Maps" (FIG. 03) of the entity type depicted by the term.
        3.4.2) Code is generated to define the following variables, with the current term index as suffix.
            a variable called "Tproc+i" with type as the proc object name. If the proc object name is null, then the term has no proc color. In this case, code is generated to define the "Tproc+i" variable as type "Object".
            a variable with name as "obj+i" and type as "Object.
            a variable with name "KBMDSColors+i" and type as "String[ ]".
            a variable with name "KBMDSRefIdx+i" and type as int.
            a variable with name "firsttime+i" and type as Boolean.
        3.4.3) If a proc color is specified for the term and the proc object name is not null, then the following code is generated.
            3.4.3.1) If the entity cache (step 3.2) is null, then a new instance of the proc object is created and the reference is stored in the "Tproc+i" variable.
                It may be noted that a class file with name given below clbparm.kbstmt+"_"+
eqtInfo.getCDftSeqNum( )+"_"+
eqtInfo.getDftSeqNum( )+"_T"+i;
                holds a method called "proc_"+proccolor of current term.
                This class is generated by KBMEqtHandler, which is explained in the appendix-3.
                An instance of the proc object can be obtained by calling the above method.
            3.4.3.2) If the entity cache is not null, then the previously cached reference of the proc object is retrieved from the entity cache, by using the term id as index.
        3.4.4) If the proc object name is null, then the following code is generated.
            3.4.4.1) If the entity cache (step 3.2) is null, then the data set colors specified for the term are extracted and copied to KBMDSColors string array.
            3.4.4.2) If the entity cache is not null, then the previously cached reference of the entity, and the reference index are retrieved from the entity cache, by using the term id as index.
    3.5) The horizontal structural rule (sources or nested-for) of the kbm rule is retrieved from the KBMStructuralRule table (FIG. 12).
        It may be noted that the last component of the structural rule specified in the kbm rule applies to the entire rule. The last component in turn has two sub components, and the first sub component has the key to the sources or nested-for structural rule.
    3.6) For each term of step 3.4, if the term is in the sources structural rule, the following steps are performed.
        The current term is held in a variable called "term".
        3.6.1) The O-context index of the entity type of the term is obtained, by invoking Algorithm-6 (Determine Field Info) of KB (ref-1). It may be noted that this algorithm returns the collaboration object matched.

3.6.2) A label and the start of a do-while control structure is generated for the term as:

```
"term" + term + ":"   // label for term in host language
// generate code to get the object via proc or data sets
do {
```

3.6.3) The existence of the proc color is checked, by searching the colors of the current term.

3.6.4) The following steps are performed, if the proc color is found.

3.6.4.1) If the KBM entity cache is found, and if it is the first time executing this term, then the following steps are performed.

3.6.4.1.1) The invalid flag of the term is retrieved from the entity cache.

3.6.4.1.2) If the invalid flag is true, then the next object is retrieved by making use of the proc variable, which was already loaded with the reference of the proc object, in previous steps.

3.6.4.1.3) If the invalid flag is false, then the current object is retrieved by making use of the proc variable.

3.6.4.1.4) The First time flag of the term is set to false, to prevent re-entry into the first time code block.

3.6.4.2) If the KBM entity cache is not found or if the first time flag for the term is false, then the next object is retrieved by making use of the proc variable.

3.6.5) The following steps are performed, if the proc color is not found.

3.6.5.1) If the KBM entity cache is found, and if it is the first time executing this term, then the following steps are performed.

3.6.5.1.1) The invalid flag of the term is retrieved from the entity cache.

3.6.5.1.2) If the invalid flag is true, then the next object is retrieved from the data sets by making use of OContextHelper function, which is provided as part of KBM runtime (Appendix-5). The KBMDSRefIdx variable for the term is incremented.

3.6.5.1.3) The invalid flag is false, then the object reference, loaded in previous steps, is considered as applicable object reference.

3.6.5.1.4) The First time flag of the term is set to false, to prevent re-entry into the first time code block.

3.6.5.2) If the KBM entity cache is not found or if the first time flag for the term is false, then the next object is retrieved by making use of the OContextHelper class, which is provided as part of KBM runtime. The KBMDSRefIdx variable for the term is incremented.

3.6.6) If the data set color specified is not a temp data set, then the following steps are performed.

3.6.6.1) A temp data set name is created as shown below.

$"Temp" + "\_" + eqtInfo \cdot getCDftSeqNum() +$ $"\_" + eqtInfo \cdot getDftSeqNum() + "\_" + term;$ 3.6.6.2) A temp data set with the above name is created to store the entity reference depicted by the current term, by making use of the OContextHelper class, which is supplied as part of kbm runtime.

3.6.7) A check is performed to ensure if any kbm colors other than proc color are specified for the current term.

3.6.8) If kbm colors other than proc color are specified, then the following steps are performed. It may be noted that code for KBM colors are stored as methods in a class file. These methods may be invoked by a driver method of the class.

3.6.8.1) A class name (string) is created as shown below.

$clbparm \cdot kbstmt + "\_" + eqtInfo \cdot getCDftSeqNum() +$ $"\_" + eqtInfo \cdot getDftSeqNum() + "\_T" + term;$ 3.6.8.2) Code is generated to create an instance of the above class, and to invoke the driver method of the class, if the object reference of the current term is not null. The return value obtained from the driver method is stored in a Boolean variable called "ret".

3.6.8.3) Code is generated to set the "ret" variable to false, if the object reference of the current term is null.

3.6.9) If only proc color is specified for the current term, then code is generated to set the "ret" variable to true, if the object reference of the current term is not null; and to set the "ret" variable to false, if the object reference of the current term is null.

3.6.10) Code is generated for the while portion of the "do-while" control structure (step 3.6.2), as shown below.

} while ("obj+term" !=null && ret==false);

The intent is to loop over, if we are not at end of source (i.e. an object reference is found), but the kbm colors of the term failed, so that the process may be re-executed for another instance of the object.

3.7) The previous term in the structural rule is retrieved. If non exists, the previous term is set to −1.

3.8) Code is generated to check if an object reference for the term was established, by checking for "ret" variable being false. If an object instance could not be established, then the following steps are performed, by the generated code.

3.8.1) If a proc color was specified for the term, then the proc reference of the term is reset. It may be noted that procedure objects implement the IKBMProcObject interface, which has the reset method. Please refer to Appendix-6.

3.8.2) The object reference of the term is set to null.

3.8.3) The KBMDSRefIdx variable of the term is set to zero.

3.8.4) If previous term exists, then the object reference of the previous term is invalidated, and control is transferred to the label of the previous term. (Please refer to appendix-18 and 19 for additional information on Invalidation Techniques).

3.8.5) If previous term does not exist, then the "entityrefsfailed" flag in clbparm is set to true; the current term value is stored in failedterm field of clbparm; the method returns back to the caller.

3.9) For each kbm term of the current rule the following steps are performed.
   3.9.1) A "save" dataset is created for the entity type of the term, by making use of the OContextHelper class.
   3.9.2) The last temp data set is copied to the "save" data set for the entity type of the term, by making use of the OContextHelper class.
3.10) The kbm terms of the current rule are saved in the eqtInfo parm, so that KB Translator could identify KBM Terms.
3.11) All terms are processed normally, when this step is reached.
   Code is generated to perform the following operations.
   3.11.1) If KBMEntityCache was not found, then a new instance of KBMEntityCache is created. The kbm statement id, the colored dftseqnum, and the dftseqnum are stored in the entity cache. For each of the kbm terms, the kbm term ids, proc references, and entity references of the objects, and data set reference indexes are added to the entity cache.
   The invalid flags are set to false.
   3.11.2) If KBMEntityCache was found, then for each of the kbm terms, the proc references, the entity references, and the dataset reference indexes in the cache, are updated with the recent values. The invalid flags are set to false.
3.12) Code is generated to perform the following operations.
   3.12.1) If KBMEntityCache was not found, then the KBMEntityCache is added to the C-Context in the clbparm.
   3.12.2) If KBMEntityCache was found, then the KBMEntityCache in C-Context is updated with the reference in temporary store. Please refer to Step 3.11.2.
3.13) Code is generated to end the process method of the EntityRefs class file.
3.14) An instance of the KBMEqtHandler object is created, and the process method of the KBMEqtHandler is executed. Please refer to appendix-3.
3.15) The process method of the KBMColorProcesor terminates and returns to the caller.

APPENDIX-3

KBMEqtHandler
The operation of KBMEqtHandler class of the KBM Translator is described below. A high level description of the processing described here, is provided in FIG. 16B. This class provides a method called process, which is called by KBMColorProcessor described in Appendix-2.
1) The KBMEqtHandler class receives the collaboration parameter (clbparm), and equation info (eqtInfo), as parameters during the construction phase, which are stored in the internal storage of the class.
2) The process method of the KBMEqtHandler class performs the following steps.
   2.1) The current project info in the clbparm and the current cdftseqnum are backed up, for later use.
   2.2) The terms of the rule are retrieved from the eqtInfo.
   2.3) For each of the terms, the following steps are performed, at end step 2.4 is executed.
     2.3.1) The colors of the term are retrieved.
     2.3.2) A check is made to ensure whether kbm colors are specified.
     2.3.3) If KBM colors are not found in the colors of the term, then the current term is skipped. Control is transferred to Step 2.3.
     2.3.4) If kbm colors are found for the term, then a method called "init" is invoked, with the current term id, and the number of kbm colors.
     The "init" method generates a class file with class name given as:

$$clbparm \cdot kbstmt + " - " + eqtInfo \cdot getCDftSeqNum() + " - " + eqtInfo \cdot getDftSeqNum() + "\_T" + termidx;$$

in a package given as:
     clbparm.classname+"."+clbparm.methodid+"."+clbparm.cdescid;
     In addition, the code generated defines a field called results, which is a vector of Booleans.
     A constructor is generated, which initialises the elements of the results vector to Boolean false values.
     2.3.5) An instance of the class called KBMParseEntity, which is part of KBM Translator modules, is created.
     The "parse" method of the KBMParseEntity class is invoked, and the entity type of the current term is passed as parameter to this method. This method parses the meta data of the entity type (FIG. 03), and stores the result in an easily retrievable tabular form.
     The "getRules" method of the KBMParseEntity class is invoked, and the kbm colors of the current term are passed to the method. This method searches the meta data (which is now in tabular form), and retrieves the kbm rules associated with the kbm colors.
     These rules are referred to as colored rules.
     2.3.6) A new empty vector is created to store colored dft seq numbers of the colored rules obtained in step 2.3.5.
     2.3.7) For each of the colored rules, the following steps are performed, at end step 2.3.8 is executed.
     It may be noted that colored rules have a 1-1 association with kbm colors specified for the term.
       2.3.7.1) If colored rule is "NA", it is skipped, and control is transferred to step 2.3.7.
       2.3.7.2) The last colored dft seq num which is held in clbparm is incremented. The new value is referred to as targetcdftseqnum. The targetcdftseqnum is added to the vector of colored cdft seqnums created in step 2.3.6.
       2.3.7.3) Code is generated to create a method signature based on the color prefix and color name, in the code file created by the init method (please refer to step 2.3.4).
       2.3.7.4) The COLORINFOENTRY tags defined for the current kbm color are retrieved from the KBMParseEntity (please refer to step 2.3.5).
       2.3.7.5) If the current color is a "proc" color then the following steps are performed.
         2.3.7.5.1) The "proc" color identifies a procedure class name, a method name within the class, and a method color for invoking the method. These values are retrieved from the COLORINFOENTRY tags described in the above step 2.3.7.4.
         2.3.7.5.2) Code is generated to create an instance of the procedure class retrieved in step 2.3.7.5.1.

2.3.7.5.3) The instance of the procedure class created in the immediate above step, should be made available to the KB/KBM Rule Execution Modules, which uses KB contexts.

The solution within KB framework for this problem is to store the value in A-context.

The procedure class is defined without verb color, but KB requires verb color to identify objects. Hence, a temporary verb color called proc class color, is created using the kb statement name, the color dft seq num and dft seq num.

2.3.7.5.4) A KB field is created in string form, with the proc class, and the temporary verb color (proc class color) created in the immediate above step, and the kb command "@eval_Avar".

2.3.7.5.5) An instance of the create Temp Var class (Algorithm-12) of KB (ref-1), is created with the KB field created from the proc class in the immediate above step, and the reference of the proc class which is created in 2.3.7.5.2.

The process method of this class is executed to generate code, which creates the temporary variable, in the A-context.

It may be noted that this algorithm, takes symbolic value, to facilitate linking; As we are currently generating code, the actual symbol resolution would take place, when the generated code is complied, by the host language compiler.

2.3.7.5.6) A KB expression is generated by stringing the proc class, the temporary verb color (proc class color), the proc method, and the proc method color.

2.3.7.5.7) An instance of the evalEqt class (Algorithm-02) of KB (ref-1), is created. The process method is invoked, with the KB expression created in the immediate above step, the targetcdftseqnum, and curkbm color. The dft seq num is set to zero, and the rest of the parms take defaults.

2.3.7.6) If the current color is not a "proc" color, then
2.3.7.6.1) An instance of the evalEqt class (Algorith-02) of KB (ref-1), is created. The process method is invoked, with the current kbm colored rule, the targetcdftseqnum, and curkbm color. The dft seq num is set to zero, and the rest of the parameters take defaults.

2.3.7.7) Code is generated to close the current method being generated. Please refer to Step 2.3.7.3, which created a method signature based on the color prefix and name, in the code file created by the init method.

2.3.8) A method called "finish" of the KBMEqtHandler class is executed, to generate a driver method for the current term. The current term index, the current rule cdftseqnum (saved in step 2.1), the index values of kbm colors of the current term, the cdftseqnums vector created in step 2.3.6 are passed as parameters to this method.

This method performs the following steps.

2.3.8.1) Code is generated to create the signature of the driver method.

2.3.8.2) The vertical structural rule of the current term is retrieved from the KBMStructuralRule table, by making use of the vertical structural rule id specified for the term in the structural rule component of the kbm rule.

2.3.8.3) Code is generated to process the vertical structural rule by creating an instance of a class called KBMVStrucRule, which is provided as part of KBM runtime (Appendix-4).

2.3.8.4) Code is generated to invoke the process method of the KBMVStrucRule. This method converts the vertical structural rule in string format to tabular form i.e. vector form.

2.3.8.5) Code is generated to create a new empty vector called dynamic rules. This vector contains the colored rules to be executed. Each entry of the dynamic rules vector consists of:

<Source-rule, Source-term, Target-rule, Target-term>

The dynamic rules vector, provides the ability to inject colored rules, based on vertical dependencies.

2.3.8.6) For each kbm color index received as input by the finish method, an entry is added to the dynamic rules vector. The entry consists of: <−1, −1, kbm-color-idx, −1>

2.3.8.7) A for-block is generated as:
for (;;) {

2.3.8.8) Code is generated to invoke a method called controller of the KBMEqtHandler class. The clbparm, the term id of the kbm rule being translated, the cur rule cdftseqnum, dynamic rules, and the kbmvstrucrule are passed as parameters to this method. (please refer to step 2.3.8.15, which describes the signature of the controller method).

2.3.8.9) Code is generated to break out of the enclosing for loop, if the size (number of elements) of the dynamic rules vector is zero.

2.3.8.10) Code is generated to sort the dynamic rule vector, on the target rule id.

2.3.8.11) Code is generated to close the for-block created in step 2.3.8.7.

2.3.8.12) Code is generated to iterate over the results vector. The generated code returns a Boolean false if any of the entries have a Boolean false, and returns a Boolean true, only when all entries hold a Boolean true.

2.3.8.13) Code is generated to end the driver method (please refer to step 2.3.8.1).

2.3.8.14) After generating the driver method, the finish method, generates the controller method, as described below.

2.3.8.15) The signature of the controller method is generated. This method receives clbparm, the term id of the kbm rule being translated, the cdftseqnum of the kbm rule, the dynamic rules vector, and the kbmvstrucrule class object reference, which holds the vertical dependencies in tabular or vector form.

2.3.8.16) A while control structure is generated, which loops through the dynamic rules vector and reads the entries, until a control-break occurs on the "target-rule" field, or when the end of the vector is reached.

Please refer to step 2.3.8.5 for the structure of the elements stored in the dynamic rules vector.

2.3.8.17) Code is generated to delete the elements read from the dynamic rules vector.

2.3.8.18) A switch statement is generated, which uses the target rule read in the above step 2.3.8.16.

2.3.8.19) For each kbm color of the current term of the kbm rule, the following steps are performed, at end control is transferred to step 2.3.8.20.
2.3.8.19.1) A case statement is generated, with the KBM color id as the case value.

2.3.8.19.2) Code is generated to invoke a method obtained by concatenating the color prefix and name, within the case block generated in the immediate above step.
It may be noted that this method may fail, when it could not establish entity references. In this case, the clbparm.entityRefsFailed field is set to "true"; and the clbparm.failedTerm is set to the current color id.
2.3.8.19.3) Code is generated to convert the return value obtained by invoking the colored rule, in the immediate above step, to Boolean by typecasting. It may be noted that colored rules return Boolean, hence we can cast the output to Boolean.
2.3.8.19.4) Code is generated to store the Boolean return value of the immediate above step, in the results vector. Please refer to step 2.3.4.
2.3.8.19.5) Code is generated to invoke a method called "chkEntityRefsFailed" in the KBMVStrucRule class.
This method is described in Appendix-4.
2.3.8.19.6) A "break" statement is generated to prevent entry into the subsequent case blocks.
2.3.8.20) Code is generated to close the switch statement, generated in step 2.3.8.18.
2.3.8.21) Code is generated to close the controller method. Please refer to 2.3.8.15.
2.3.8.22) Code is generated to mark the end of the class file of the current term being created.
2.3.8.23) The class file of the current term being written is closed.
2.4) The project info backed up in step 2.1 is restored.
2.5) The method terminates and returns to the caller.
Note: The driver and controller methods described above, would receive the current object reference, for which the colors are being evaluated, as an additional parameter.

APPENDIX-4

KBMVStrucRule
The KBMVStrucRule is an important class in the kbm runtime. This class accepts the vertical structural rule as parameter during its construction. It provides three important methods, which are described in this appendix.
1) The process method of the KBMVStrucRule performs the following operations.
   1.1) The vertical structural rule is split into segments (or blocks), based on ";" character as separator; and each segment is further split into 4 individual integers, based on spaces as separator.
   1.2) The four integers of the segment correspond to the source rule, source term, target rule, and target term. A structure called KBMVDep is created to store these integers.
   1.3) The KBMVDep structure obtained above is added to an internal vector called kbmvdeps.
2) The getAffectedDependencies method performs the following operations.
   2.1) This method receives the input rule and input term id as input parameters.
   2.2) The vertical dependencies, which are stored in vector format as kbmvdeps, is traversed, and an element of the vector whose source rule and term id matches the input rule and term id is captured.
   2.3) If no element matches the input rule and term id, a null is returned to the caller.
   2.4) The index where the input rule and input term id were found is saved.
   2.5) The target rule and term id are retrieved from the element, which matched the input rule and input term id.
   2.6) The kbmvdeps vector is traversed from top (index=0), until the index value of step 2.4 is reached.
   2.7) The elements are searched for the target rule and term id with values obtained in step 2.5.
   2.8) The matching elements are referred to as affected dependencies. These are stored in a vector, and the vector is returned to the caller.
3) The chkEntityRefsFailed method performs the following operations.
   3.1) If the clbparm.entityRefsFailed field is set to true, then the failed colored rule is retrieved from clbparm.failedTerm, else the method terminates.
   3.2) The affected dependencies are obtained by making use of the term id, and the failed color rule id.
   The AffectedDependencies logic is explained in step 2.
   It may be noted that the KBMVstrucRule processed the vertical dependencies in its process method; Please refer to Step 1.
   3.3) If there are no affected dependencies, then the following steps are performed.
      3.3.1) All the elements of the dynamic rules vector are removed, since the rule cannot go further. The rules in the dynamic vector need not be executed, since a single failure of any colored rule implies that the entire set has failed.
      3.3.2) The clbparm.entityRefsFailed is set to false; and the clbparm.failedTerm is set to −1.
      3.3.3) The method returns to the caller.
   3.4) There could be more than one dependency. The Object reference of first dependency (in the Entity cache) is invalidated. Please refer to Algorithm-18 and 19 for a comprehensive description of the Invalidation procedures.
   3.5) This would force the first dependency (which is higher in the vertical order), to procure the next object.
   3.6) The current colored rule is added to affected dependencies vector, since the colored rule has failed to execute.
   3.7) The affected dependencies vector is added to the dynamic rules vector.
   3.8) The clbparm.entityRefsFailed is set to false; and the clbparm.failedTerm is set to −1.
   3.9) The method terminates and returns to the caller.

APPENDIX-5

O-Context Helper
O-Context helper is a helper class and provides the following methods to access the O-Context entries.
getNextObjRef: This method receives the clbparm, kbm dscolors of the term, the temporary data set name, the reference index of the object, and entityindex, which is the index of the entity in the O-Context.
1) The O-context is retrieved from the clbparm.
2) The CObject of the entity is retrieved using the entityindex received as input parm.
3) If kbmdscolors of the term are omitted, then the following steps are performed.
   3.1) The temporary data set name received as input parm, is searched in the dsnames of the CObject.
   3.2) If the index is greater than or equal to 1, then the index value prior to that (minus 1), is used as the index of applicable data set.
   3.3) If the above condition fails, then the last data set is considered as the applicable data set.

4) If kbmdscolors are specified, then these are used for locating the data sets.
5) If the index of the dataset is −1, then the method returns a null, and terminates.
6) The object instances vector is retrieved using the data set index, obtained above.
7) If the reference index of the object received as input parm is greater than the size of the object instances vector, then a null is returned to the caller, else the object at the corresponding index is returned to the caller.

saveObjRef: This method receives the clbparm, entityindex (which is the index of the entity in the O-Context), the temporary data set name, the reference of the object.
1) The o-context is retrieved from the clbparm.
2) The Cobject of the entity is retrieved using the entityindex received as input parameter.
3) The temporary data set name received as input parm, is searched in the dsnames of the CObject.
4) If the temporary data set name is not found, then the temporary data set name and an object instances vector are added to the Cobject. The object reference received as input parameter is added to the object instances vector.
5) If the temporary data set name is already found, then all entries of the object instances vector are removed, the object reference, received as input is added to the object instances vector.
6) If the index entry due to executing step-3 is −1, i.e. if the temporary data set name received as input parm, is not found in the dsnames of the CObject, then the method returns to the caller.
7) The index, where the temporary data set name received as input parm, is found, is incremented, and starting from this index, a search is performed for data set names, which have "Temp" as starting prefix in their dsnames. All such data sets found, are deleted along with the corresponding object instances.
   This step ensures that there are no stale temp data sets. It may be noted that this step does not prevent us from having multiple temp data sets, but ensures that the temp data set that is recently added is the last temp data set.
   For example, consider the scenario, where the temp data sets are added as:
   Temp-0-0; Temp-1-0; Temp-2-0:
   If processing loops over and attempts to add "Temp-1-0" again, then the already existing Temp-2-0 would pose a problem; i.e. it will prevent the recent addition, from being the last temp data set. Hence, Temp-2-0 is regarded as stale temp data set and is deleted.
8) The method returns to the caller.

APPENDIX-6

KBM Object Interface

```
public interface IKBMObject {
    public IKBMColorPalette getKBMColorPalette( );
    Public void setKBMColorPalette(IKBMColorPalette Ikbmcp);
}
```

KBM Procedure Interface

```
public interface IKBMProcObject {
    public void init( );
    public void reset( );
    public Object getNext( );
```

-continued

```
    // Note: getCur( ) defaults to getNext( ), if proc is in reset state
    public Object getCur( );
    public Boolean setInvalidateFlag( );
    public Boolean chkInvalidateFlag( );
}
```

KBM Conceptual Object Interface

```
public interface IKBMCPTObject {
    // get methods
    public String            getName( );
    public String            getType( );
    public String            getAbstractId( );
    public IKBMColorPalette  getKBMColorPalette( );
    public Object            getRef( );
    public Vector <KBMCPTObject>   getComponents( );
    public Vector <KBMCPTObject>   getPorts( );
    public Vector <KBMCPTObject>   getFluents( );
    public Vector <FunctionEntry>  getFunctions( );
    // set methods
    public void    setName(String name);
    public void    setType(String type);
    public void    setAbstractId(String abstractid);
    public void    setKBMColorPalette(IKBMColorPalette ikbmcpt);
    public void    setRef(Object obj);
    public void    setComponents(Vector <KBMCPTObject>);
    public void    setPorts(Vector <KBMCPTObject>);
    public void    setFluents(Vector <KBMCPTObject>);
    public void    getFunctions(Vector <FunctionEntry>);
}
```

Note:
KBMCPTObject implements the IKBMObject and IKBMCPTObject interfaces.

KBM Adapter Interfaces

The KBM adapter Interfaces are described below.

```
public interface IKBMColorPalette {
    // methods for managing Color Table
    public Vector   getColorTable(String type);     // type =
                                                    normal or
                                                    secondary
    public void     setColorTable(String type, Vector
                                  colortable);
    // methods for managing Cache; get/add/chg sets Cache used as
    current
    public Vector   getCache(String name);
    public void     addCache(String name);
    public void     delCache(String name);
    public void     chgCache(String name, Vector cache);
}
public interface IKBMCache {
    // methods for managing cache entries
    public KBMCacheEntry getCacheEntry(String name, String[ ]
    parms);
    public void addCacheEntry(KBMCacheEntry);
    public void chgCacheEntry(KBMCacheEntry);
    public void delCacheEntry(String name, String[ ] parms);
}
public interface IKBMColor {
    // methods for managing color entries
    // name = color prefix + color name
    public KBMColorEntry getColorEntry(String name);
    public void addColorEntry(KBMColorEntry);
    public void chgColorEntry(KBMColorEntry);
    public void delColorEntry(String name);
}
```

Note:
IKBMMisc interface has methods for accessing miscellaneous items.

KBM Adapter Class

```
class KBMAdapter implements       IKBMColorPalette,
                                  IKBMCache, IKBMColor,
                                  IKBMMisc {
    // storage for color table; access via IKBMColor
    Vector colorTable;            // each entry has
                                  <color-prefix+color-name, colordata>
    // storage for secondary color table (deep color cache)
    Vector seccolorTable;         // each entry has
                                  <color-prefix+color-name, colordata>
    // storage for entity caches: bindings cache, characteristics cache, etc
    // Associated vectors: each entry of cacheNames is associated with
    caches
    // access via IKBMCache
    Vector cacheNames;            // holds cache names; associated with
                                  caches vector
    Vector caches;                // each entry has <name, parms,
                                  value/target>
    Vector currentCache;          // currently selected Cache
    // storage for interface boxes - access via IKBMMisc
    Vector InterfaceBoxes;
    // storage for special dynamic structures - access via IKBMMisc
    Vector strucNames;            // holds struc names
    Vector strucRefs;             // holds struc refs
    // Implementation of IKBMColorPalette Interface methods
          -     -     -     -     -
    // Implementation of IKBMCache, IKBMColor Interface methods.
          -     -     -     -     -
    // Implementation of IKBMMisc Interface methods.
          -     -     -     -     -
}
```

APPENDIX-7

KBM Rule Example

Problem: A Car dealer has to determine the models, which can be included in their inventory.

A CAR Worksheet has available Cars, and Problems with Cars.

SPEC sheet: make, body type, model, year, price range, and performance.

PROB sheet: make, body type, model, year, and
problem ratings with engine, trans, body, fuel systems.

The car dealer provides the requirements as a sheet—

REQ sheet: price-range, performance, and
problem ratings with engine, trans, body, fuel systems.

The price range, performance, and problem ratings with engine, trans, body, fuel systems, have integer values. Higher problem rating implies more desirable.

What is needed is a Car, with price range, performance, and problem ratings of engine, trans, body, fuel systems greater than requirement.

Solution: A simple solution is provided in Code Listings attached to this document. The details of the Code Listings are provided in Appendix-22.

APPENDIX-8

Translation of Abstract Rule Graphs

An Abstract rule graph (ARG) is a graph, where nodes, and arcs of the graph represent abstract rules. Structurally, the ARG is very similar to Concrete Rule Graph (CRG), except that an ARG is an abstract representation of a process graph.

In a nutshell, this translation maps an abstract action to a concrete action (KBM Rule), based on the taxonomy of the entity.

It may be noted that the Equation number of this appendix are local to itself.

The Translation of an ARG, into a concrete rule graph (CRG), is as described below.

1) The nodes and arcs of the ARG are represented as—

$$\text{AbstractEntity.\%aux-auxiliary\_Color.token;} \quad (1A)$$

or as—

$$\text{AbstractEntity.\%aux-auxiliary\_Color* ... *} \\ \text{AbstractEntity.\%aux-auxiliary\_Color} \quad (1B)$$

2) An Abstract rule graph (ARG) may be associated with an entity interaction given by:

$$\text{Entity-1+KBM colors* ... *Entity-}n\text{+KBM colors;} \quad (2)$$

It may be noted that the activity deployment XML document (FIG. 09C), depicts an O-Context, which implies a collaboration or interaction, wherein, the entities have abstract id's and taxonomy colors.

3) In view of the above, Equations (1A) and (1B) may be combined with (2), based on the abstract object, to produce equations of the form:

$$\text{AbstractEntity.\%tax-taxonomy\_id.\%aux-} \\ \text{auxiliary\_color.token;} \quad (3A)$$

—and—

$$\text{AbstractEntity.\%tax-taxonomy\_id.\%aux-} \\ \text{auxiliary\_color* ... * AbstractEntity.\%tax-} \\ \text{taxonomy\_id.\%aux-auxiliary\_color;} \quad (3B)$$

It may be noted that the above is obtained by matching the abstract object in the ARG Rule with the abstract object of the Entity.

4) The Interaction Maps object (FIG. 04A), holds equations of type (3A) or (3B), along with an ARG name as LHS and the following equations as RHS.

$$\text{AbstractEntity.SemanticRole.method+method\_colors;} \quad (4A)$$

—or—

$$\text{Abstract rule graph (ARG)} \quad (4B)$$

It may be noted that Equations (4B) implies recursive processing.

5) The process semantics object (FIG. 04B) is used to translate equation (4A) to entity form, which may be given as:

$$\text{AbstractEntity.SemanticRole.method+} \\ \text{method\_colors} \rightarrow \text{kbm-rule+verb color;} \quad (5)$$

APPENDIX-9

Algorithm for Validating the Process Structure Graphs

The algorithm for validating the process structure (element) graphs is presented below.

1) The root process structure (element) is selected, and the state/situations configured for it are retrieved.
2) If the state/situation is marked as "desired", it could link to another process element, or may not link to another process element.
3) If the state/situation is marked as "special", it has to link to another process element unless the process element is already a leaf element of the graph. It may be noted that the leaf status may be determined by checking if any of the state/situations are connected to a process element. If the answer is "yes" then the process element is not a leaf, else i.e. if the state/situations are not connected any other process element then the current process element is a leaf.

As an exception, it is possible to let special states behave just like desired states, when an outer container (or higher layer) can handle the floating or un-handled special states. Typically, the non-leaf KBM Gears can leave special states un-handled, which are handled by the activity (outer container). The validation procedure could receive this option as a parameter.

4) If the state/situation is marked as "Complex-1", it has to link to another process element. A reference of the current process element is copied to temporary store as original process element. The new process element to which the complex state/situation is linking is retrieved, and is made the current process element. The states/situations of the current process element are processed as explained below.

4.1) If the state/situation is marked as "desired", it should link to the original process element, if the link emerging out of the original process element is a "Complex-1" state/situation.

4.2) If the state/situation is marked as "special", it should link to the original process element, if the link emerging out of the original process element is a "Complex-2" state/situation.

4.3) If the state/situation is marked as "special", it should link to another process element, if the link emerging out of the original process element is a "Complex-1" state/situation.

4.4) If the state/situation is marked as "desired", it should link to another process element, if the link emerging out of the original process element is a "Complex-2" state/situation.

4.5) If the state/situation is marked as "complex", the process described above in step 4 is repeated recursively.

5) If the process structure graph, passes the validations described above, it is accepted as a valid KBM process structure (element) graph, for further translation.

APPENDIX-10

Algorithm for Translating the Process Structure

The translation of the process structure is described below.

1) The process structure XML document is parsed.
2) An enclosing class definition is created with the process structure name as the class name. This class is henceforth referred to as the process-structure-class.
3) A process structure is typically a graph, and all the contained elements (process structures) are translated recursively, if they are not translated previously.
4) The following data structures are created in the process structure class definition.

4.1) A special data structure called element table is created to store the nodes of the process structure. The entries of this table hold the following information. element-name, arc-values vector, and a next node vector.

The root element of the process structure is stored at the top of the table.

4.2) The effects defined in the process structure are stored in an internal table called "State/Situation Table" based on the path of the execution.

This table layout may be given as:
   {path-of-graph, situations[ ], states[ ], effect-rules[ ]}

4.3) In addition to the above, an array/vector is defined as an attribute (field) of the Process Structure class to store the execution path. The "get/set" methods for retrieving and storing the Process Structure execution path are generated.

5) The following methods are generated for executing the process structure.

5.1) A method called "init", is generated by the KBM Translator, to perform the following functions.

5.1.1) Initialize data structures of the process structure.
      5.1.2) The root element stored at the top of the element table is retrieved, and is made as the current element.

5.2) A method called "execute" is generated in the process structure class, which performs the following steps.

5.2.1) The current element is executed. It may be noted that this may create recursion, and a chain of process structures.

Code generated for the execution of a node comprises of:
      a) Executing the rule of the node
      b) Executing the ARCRULE, if specified.
      b) Executing the rules of the arcs, until one of the rules yield a Boolean true value.

5.2.2) The current element id (node id) is stored in the internal vector (of step 4.3), for later processing of the path traversed by the execution.

5.2.3) If the current node has no arcs, then the control is transferred to step 5.3.

5.2.4) If the current node has arcs, and if an ARCRULE is specified, then the arc value returned from executing the ARCRULE is used to select the next linking process element. The element table is searched with—
      element-name=current element-name and
      arc-value=value returned by executing the ARCRULE;
      and the corresponding next-node is obtained from next node vector (of step 4.1).

5.2.5) If the current node has arcs, and if the arcs specify individual arc rules as KBM Rules under the ARC tag, instead of the ARCRULE, then these rules are executed in order. The rule index which produced a Boolean true value, is used to retrieve the next node from the next node vector (of step 4.1)

5.2.6) The next-element-name (obtained in step 5.2.4 or 5.2.5) is set as current element, and control is transferred to step 5.2.1.

5.3) A method called "finish", is generated by the KBM Translator, to perform the following functions.

5.3.1) The house keeping code (generated) typically comprises of evaluating the path of the execution, based on the element nodes visited during the execution of the process structure graph.

5.3.2) The path of execution, may directly determine the state of the process structure (KBM Gears and Activities), or may lead to a set of situations (KBM Rule Graphs).

5.3.3) If situations are coded for the process element, then they are executed in order, until at least one of them evaluates to a "true" value.

If none of the situations produce a "true" value, an error is generated.

The situation/state table (please refer to step 4.2) is searched for the path of execution, and the situation, which produced the true value. The corresponding state and effects are retrieved from the table.

The state encoded for the situation, which produced a "true" value, is to be returned to the caller.

This value is saved in a temporary variable called "ret".

The corresponding "effect rule" is retrieved for later execution.

The control is transferred to step 6.

5.3.4) If no situations are coded for the process element, then the path of execution determines the state reached, which is stored in the "ret" variable.

The effect rules corresponding to the state are retrieved from the effect encoding's.

6) The following functions are performed as part of housekeeping.

6.1) The effect rules for the path of execution of the process structure are retrieved, and are executed in order.

6.2) If a functional color or transformation colors are defined for process structure, those are evaluated, as explained below.

6.2.1) The Process structure table (FIG. 25), is searched with the process structure type, name, and the path of execution, and the process execution color is obtained. It may be noted that the process structure table, has type, name+process execution color, node-list; we can search with type, name, and node-list and obtain the process execution color.

6.2.2) The Functional color table (FIG. 15), is pre searched with the process structure type and name, and a smaller set of entries for the process structure are obtained. Code is generated to store these entries in vector form in memory.

The evaluation of the functional color, now reduces to searching the table created above, for each of the entity types, with the old functional color, and the current process execution color and obtaining a new functional color, as explained in the description.

6.2.3) The Functional color table (FIG. 15), is pre searched with the entities of the process structure, and a smaller set of entries are obtained. Code is generated to store these entries in vector form in memory.

The evaluation of the transformational color, now reduces to searching the table created above, for each of the entity types, with the new functional color, and the old functional colors (from secondary color table, also referred to as deep cache), and obtaining the corresponding transformation color, as explained in the description.

7) The return value stored in the "ret" variable, is returned to the caller.

APPENDIX-11

Algorithm for Executing the Process Structure Graphs
The algorithm for executing the process structure graphs is presented below.

1) The process structure graph (XML file) is parsed. A process structure may contain several other types of process structures in a recursive manner. Process structures are also referred to as process elements.
2) The root element is selected and executed, according to the semantics of the DSC Framework described in the description section. Typically, the root element could be a graph, and the execution comprises of selecting the contained elements, and executing them in turn, in a recursive manner.

The execution is broadly divided into three phases:

2.1) Init: If the process element is atomic, then the "init" step is empty; else if the process element is a graph, then the pre-processing comprises of selecting the first contained process element for execution, as the current element.

2.2) Execute: The "execute" phase comprises of executing the process element.

For atomic elements, the body of the element (KBM Rule) is executed.

For containers, this comprises of initiating execution for the process element, selected by the pre-processing step. It may be noted that this is the original function of executing a process element, i.e. same function with which we started. Hence, execution of this step goes into a recursive mode, until the final atomic element is reached, and back tracks through the "execute" phase of the containers, in the chain of execution.

2.3) Finish: The "finish" phase comprises of evaluating the states/situations coded for the process element, and selecting the first state/situation, which produced a "true" value. This value is returned back to the caller. In view of the recursion, the value returned is received by the "execute" phase of the container (Please refer to FIG. 18).

If the process element is the root element, then the recursion terminates, and the value returned to the caller would be the state reached by the process structure.

The algorithm terminates after this step.

APPENDIX-12

Work Flow Execution
A workflow is initiated by a user, via an online or web interface. During this process, the user could provide the key information for executing the workflow, which typically comprises of primary keys of data files or sql tables, of the underlying data base. It may be noted that the input requirements are compiled from the input requirements of all the activities in the workflow.

Figure 20:
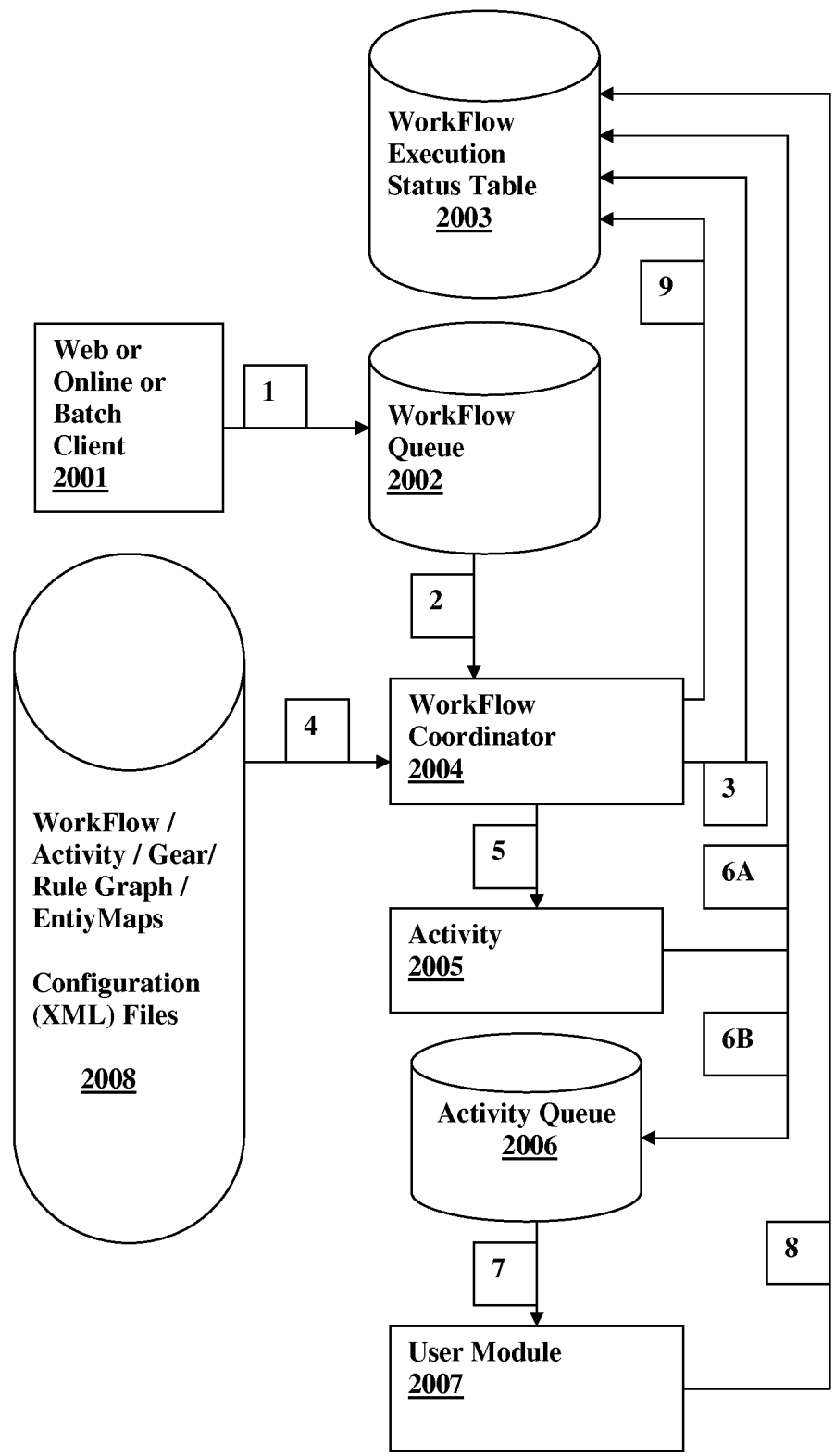

The following steps are performed during the Workflow execution (FIG. 20).

1) Upon initiation, the online or web Workflow interface (2001) would create a queue record in the Work Flow queue (2002).
2) The Workflow coordinator (2004) retrieves the next workflow queue record in the workflow queue (2002), and attempts to process the work flow. Conversely, the workflow queue could initiate an instance of the work flow coordinator process, depending on the configuration of the message queuing systems. Typical message processing systems are IBM™ MQSeries (ref-15), and the Apache ActiveMQ (open source).
3) If the workflow is being executed for the first time, then a record is written to the Workflow Execution status table (2003). FIG. 19 describes the Workflow Execution status table, which comprises of—

Workflow execution Id (1901), which is an identification number generated, when the workflow is started;
type (1902), which indicates whether the record identifies a workflow or activity; the workflow/activity name (1903);
the start timestamp (1904), when the workflow was started;
the end timestamp (1905), when the workflow ended;
the status of execution (1906) of the workflow or activity.

Conversely, if a record already exists in the workflow execution status table, then it implies that the workflow is already in execution. In this case, control is transferred to step 9.

4) The workflow xml document (2008) retrieved from the configuration files store, is parsed, and the activities are retrieved. Activities could be enclosed in sequential (SEQ) or concurrent (CONCUR) XML tags.
5) The next (first) activity listed in the xml document is selected for execution. If a CONCUR block is found, then all activities in the block are executed.

A record is written in the workflow execution status table (2003), for each activity started, indicating that the activities were scheduled for execution.

The mode of processing color specified for the activity is retrieved. The corresponding "process controls" object is retrieved from the activity XML documents. A new process control object is created for the activity.

The activity (2005) is scheduled for execution, with the process control object created above. In addition, the workflow execution id is passed to the activity.
6) A) If the activity (2005) reaches a desired state, then the activity record in the workflow execution status table (2003) is updated as complete.

B) If the activity (2005) reaches a special state, then the activity record in the workflow execution status table (2003), is updated as "pending for user action". Typically, the special states of an activity are associated with queues (2006). An Activity Failure Record is written to this queue (2006), prompting user attention.
7) This queue (2006) could invoke a user module (2007).
8) Upon successful completion of the user module (2007) i.e. upon resolving the pending issue, the user module could mark the activity in the workflow execution table (2003) as complete or "resched with mp-color".
9) The workflow coordinator (2004) would periodically check for the completion status of the activity in the workflow execution table (2003), and if the status is "pending for user action", the workflow is terminated, and is retried in the next cycle.

If the activity is processed as a singular element (SEQ tag), then the workflow coordinator waits, until the activity reaches the completion status.

If the activity is processed as a group (Concur tag), then the workflow coordinator waits, until all activities in the group reach the completion status.

The activity following the last completed activity is retrieved from the workflow XML document, and scheduled for execution. Control is transferred to Step 5.

If there are no more activities, then the workflow completion status record is written to the workflow execution table.

Note: Step numbers roughly correspond to arc numbers shown in FIG. 20.

APPENDIX-13

Execution of KBM Type-9 or Group Rules
The algorithm for executing KBM Type-9 or group rules is described below:
1) A KBM group rule has a group identifier (1102), and all KBM rules bearing the same group identifier are selected for execution, from the KBM Rules Table (FIG. 11), when a KBM rule is invoked using the group rule id.
2) An attempt is made to execute each KBM Rule of the group.
3) If any member rule of the group could be executed, i.e. if its RHS terms could be resolved, then that member rule is executed and the group rule is said to have completed the execution. The corresponding LHS is returned as the result of execution of the group rule.
4) If a member rule cannot be executed, i.e. if its terms could not be resolved, then the next member rule of the group rule is selected for execution, until there are no more member rules in the group.
5) At end, an error is returned, if none of the member rules of the group rule could be executed.

APPENDIX-14A

1) Formal Semantics of Conceptual Entities: The semantics of Conceptual Entity storage is described below.
   1.1) Conceptual entities are stored in a conceptual object (FIG. 06A).
       It may be noted that the KBMCPTObject layout is employed to hold conceptual entities, in O-Context. The KBMCPTObject holds KBMAdapter to store colors and characteristics.
   1.2) A component uses all fields in the normal sense.
   1.3) A port stores channels or connectors as components. It may optionally store signals, and events as fluents.
   1.4) A channel or connector stores the source and target components in components; and the source and target ports in ports.
   1.5) All conceptual entities store their colors, characteristics in KBMAdapter.
   1.6) The characteristics of components and fluents reside in KBMAdapter (characteristics cache) of a (first) KBMCPTObject, which depicts the component or fluent under consideration. In general, an entry of the characteristics cache holds the name, parameters and target reference. In the current case, the name of the characteristic, plus a verb color are stored in the name portion, the parameters are usually null, and the reference of the target is set to another (second) KBMCPTObject. The colors of a characteristic are stored in the color cache, and the value of a charecteristic if exists, is stored in the ref field (0605) of the second KBMCPTObject.
   1.7) FunctionEntry (which could be a KBMCPTObject) stores its name in the name field, state in the characteristics cache portion of KBMAdapter, trigger (signal) as fluent, and Mu-function as conceptual object of type process.
2) Formal Semantics of Mu-Functions: The formal semantics of the Mu-functions are detailed below.
   2.1) Create: The create Mu-Function, creates a conceptual entity, by making use of the KBMCPTObject, and the newCPTObj operator; the reference of the conceptual object created is stored in the O-Context.
       A conceptual entity may also be created by a "new Operator", but in this case, the reference is not stored in the O-Context.
   2.2) Morph: The morph Mu-Function, is mainly used to morph the colors and characteristics of conceptual entities.
   2.3) Delete: The delete Mu-Function is employed to remove a reference of the conceptual entity from the O-Context. It may also be employed to delete colors and characteristics.
   2.4) Bind: The bind Mu-function is employed to copy a reference of a conceptual entity called source to the target. The semantics dictate that the copy should be feasible and logical. For example, a port can be bound to a component, since a component "has" ports, but a component cannot be bound to a port. (Please refer to FIG. 6B for the logical aspects of the copy operation).
       The bind function is usually applied to entities, which do not react with entities already in store. For example, a kettle may be bound to a stove; It is unlikely, water (fluent) would be bound to kettle. In other words, water (fluent) is typically added to kettle, as this change the level (or state) of water or other fluids in the kettle. Please refer to the add/remove methods described later.

It may be noted that "functions", may be bound to signals; and characteristics may be bound to components and fluents.

The "bind" Mu-function has two types.
  a) The default ("attach" type) is based on attach/detach scheme. It is because of this default scheme we are able to add other components to the target.
  b) The other type is called "association", and is based on the same scheme as KBM Binding operator described previously in section 2.1.5. This scheme may use the "bindings" cache of the KBMAdapter, which is stored in the conceptual entity. Further the entity maps (FIG. 3) may depict Mu-functions instead of kbm rules. This may be viewed as an alternative scheme or a ramification for the implementation of the "bind" function.
2.5) Unbind: The unbind Mu-function removes a reference of a conceptual entity called source from the target. Unbind is the inverse of bind, and could operate in the two modes described above for the bind operator.
2.6) Move: The move Mu-function is employed to move a reference of a conceptual entity called source to the target.
2.7) Add/Insert: The add/insert Mu-function is employed to add fluents to components. This function is also employed to add entities, which cannot be represented as conceptual objects to target. For example, a wrapper object reference could be a non-conceptual object. Finally, it may be noted that the type field could give indications on the type of addition or insertion, which could take place.
2.8) Remove: This function is the inverse of the add/insert function stated above, and may be used to remove fluents from components or non conceptual objects from a component.
2.9) Send: The send Mu-function is employed to send a signal or fluent, from a source_component+port to a target_component+port.
  The semantics of "send" are noteworthy; A send would invoke a receive function on the target port, and the µ-function procedure associated with the receive function at the target port would be executed. Similarly, a receive function would invoke a send function at the source port.
2.10) Receive: The receive Mu-function is employed to receive a signal or fluent, from a source_component+ port to a target_component+port.
2.11) Increase, Decrease, Set, Reset: These Mu-Functions operate upon characteristics of fluents or components.
2.12) Compute: The compute Mu-function invokes a Type-9 KBM rule, by its group rule id.
  For the operation "compute", type could denote a variant of the operation, and this may be viewed as similar to operational color of KB (ref-1).
  The "compute" µ-function takes, a single operand (besides the five fixed operands), which is a group rule id of a Type-9 KBM rule.
  The Type-9 KBM Rule is executed against the conceptual objects in the O-context, and the result is stored in the O-Context.

2.13) Perform: The perform Mu-function is employed to implement, if-then-else, for, and while control structures.
  The type parameter denotes the kind of control structure like "if-then", "if-then-else", "while-condition", "repeat-while", etc.
  It may be noted that the operand-list may be µ-functions or µ-function procedures.
  The "perform" µ-function takes either 1 or 2 operands depending upon the type of the operation. In this µ-function, situation plays a major role.
  perform, type=1=>if-then control structure; takes one operand, which is a µ-function procedure.
  perform, type=2=>if-then-else control structure; takes two operands, which are µ-function procedures.
  perform, type=3=>while control structure; takes one operand, which is a µ-function procedure.
  perform, type=4=>repeat control structure; takes one operand, which is a µ-function procedure.
2.14) Start, Stop, Pause: The start, stop and pause Mu-functions, operate upon the functions of a conceptual entity.
2.15) Publish, Subscribe: The publish and subscribe Mu-functions, may be employed to create events, and event handlers.
3) Operands: The operands of the Mu-functions are detailed below.
  In the description given below source and target are operands,
  with the following general format.
  component[[.component][.port][.fluent][.characteristic] [.function]]; —or—µ-function-proc;
  3.1) The following µ-functions take a single operand (after the fixed operands).

| create, delete | : conceptual entity; |
| new | : conceptual entity; or any entity; |
| start, stop, pause | : function; |
| publish | : event; |
| increase | : characteristic+colors; |
| decrease | : characteristic+colors; |
| set | : characteristic+colors; |
| reset | : characteristic; |

3.2) The following µ-functions take two operands (after the fixed operands).

| morph | : source+colors , target+colors ; |
| bind | : source , target; (copies ref of source to target) |
| unbind | : source , target; |
| unbind | : source , parms; |
| move | : source , target; (moves ref of source to target) |
| add/insert | : source , target-component; |
| remove | : source , target; |
| remove | : source , parms; |
| subscribe | : event , event-handler; |

3.3) The following µ-functions take three operands (after the fixed operands).

| send | : source-component + port , fluent/signal/event , target-component + port; |
| receive | : source-component + port , fluent/signal/event , target-component + port; |
| bind | : source, parms, target;   // bindings |
| add: | source, parms, target;   // characteristics |

// add / remove source to /from target; and re-evaluate

```
// eg: add fluent to component and re-evaluate fluent state by group-rule
add           : source, target, group-rule;
remove        : source, target, group-rule;
```

APPENDIX-14B

Algorithm for Model Checking
The algorithm for model checking is described below, and comprises of executing the µ-functions derived from the Rule Graphs of the Gears of an Activity.
1) If the µ-function has an event-trigger, it is buffered in the order of arrival, else it is executed.
2) The execution of the µ-function comprises of manipulating the conceptual objects associated with the parameters of the µ-functions, as per the semantics of the µ-function, detailed in Appendix-14A.
3) If the operand of a µ-function, is a procedure, then the procedure is retrieved, and the individual µ-functions are executed in order.
4) After the µ-function (or µ-function procedure) is completely executed, the events produced are added to a temporary store.
5) The events in the temporary store are used to check if any previously buffered µ-functions has these events as triggers. All such µ-functions are identified and executed according to their order in the buffer. Unused events, are cached for later use.
6) After processing all events, the next sequential µ-function in the execution stream is selected for execution, until the end of the µ-function execution stream is reached.

APPENDIX-15

Operation of Code Generated for KBM Rule Processing
The operation of code generated by the KBM Translator modules for KBM Rule processing is described below, with the aid of FIG. 16B.
1) The stub code generated by the KB Translator (ref-1) invokes the EntityRefs module generated by the KBM Translator. It may be noted that the stub code is generated in Step-9 of the KB EvalEqt Module (Please refer to Appendix-1).
2) The EntityRefs module would establish the entity references of the entity types specified as terms of the KBM Rule. The operation of the EntityRefs module is described in Appendix-16.
3) The code generated by the KB Translator for executing the KBM rule would use the "save datasets" (established by the EntityRefs module), of Step-2, to retrieve the entity references of the entity types specified as terms of the KBM Rule.

APPENDIX-16

Operation of Code Generated for EntityRefs Module
The operation of code generated by KBM Translator for EntityRefs module is described below. The details of the code generation are described in appendix-2.
1) The kbmccontext reference is retrieved from clbparm.
2) The KBM Entity Cache Object reference is retrieved from the kbmccontext, using the statement id, cdft-seq-num, and dft-seq-num. The status of the find is depicted by a flag called "KBMECfound". Please refer to appendix-21, for a description of the KBM Entity Cache Object.
3) If a proc color is specified, then the following steps are performed.
   3.1) If kbm entity cache is not found (KBMECfound is false), then a reference of the proc object is created, by calling the code generated for this purpose.
   3.2) If kbm entity cache is found (KBMECfound is true), then the proc reference is obtained from the entity cache.
4) If a data set color is specified, then the following steps are performed.
   4.1) If kbm entity cache is not found (KBMECfound is false), then the list of data set colors are saved in an array.
   4.2) If kbm entity cache is found (KBMECfound is true), then the entity reference and the entity reference index are obtained from the entity cache.
5) For each term, the following steps are performed in a do-while loop.
   5.1) If KBMECfound flag is true and the first-time flag for the term is also true, then the following steps are performed.
      5.1.1) The invalidate flag for the term is retrieved from the entity cache.
      5.1.2) If the invalidate flag is set to true, then—
         for proc color: the next object reference is retrieved using the proc.
         for dataset color: the next object reference is retrieved using the OContextHelper.
      5.1.3) If the invalidate flag is set to false, then—
         for proc color: the current object reference is retrieved using the proc.
         for dataset color: there is nothing to do, object is preloaded in step-4.
      5.1.4) The first-time flag of the term is set to false.
   5.2) This is the else part of the condition specified in step 5.1;
      for proc color: the next object reference is retrieved using the proc.
      for dataset color: the next object reference is retrieved using the OContextHelper.
   5.3) A temp data set with the name "temp-"+cdft-seq-num+dft-seq-num+term-id; is created using the OContextHelper.
   5.4) The object reference created in the above steps 5.1 & 5.2 is stored in the temp data set, created in step 5.3, by using the OContextHelper.
   5.5) If the object reference is not null, then the following steps are performed.
      5.5.1) An instance of the object created for storing the code generated for the colors of the term is created.
      5.5.2) The driver method of the object is invoked, and the return value is stored in a variable called "ret".
         The operation of the code generated for the colors of the term is described in Appendix-17.
   5.6) If the object reference of step 5.5 is null, then the ret flag is set to false.
   5.7) The do-while loop started at step 5, is repeated if the object reference is not null and the ret value is false.
      Explanation: object reference not null=>either the proc or the data source supplied an object, i.e. they have not reached end of source condition.
      ret variable value is false=>at least one of the color rules yielded a false value, i.e. that color is not applicable.
      The while loop continues to check if any other objects in the source would satisfy the requirements of the colors. It may be noted that the while loop of step 5 would terminate if object reference is null or the "ret" variable value is true.

6) If the while loop of step-5 terminated, due to object reference being null, i.e. end of source reached, then the following steps are performed. Please refer to step 3.8 of Appendix-2.
   6.1) If a previous term exists, then the following steps are performed.
      6.1.1) The object reference is set to null; the dataset reference index is set to zero; the proc reference (if exists) is reset.
      6.1.2) The object reference of the previous term is invalidated.
      6.1.3) Control is transferred to the label of the previous term.
   6.2) If a previous term does not exist, then the following steps are performed.
      6.2.1) The object reference is set to null; the dataset reference index is set to zero; the proc reference (if exists) is reset.
      6.2.2) The "entityrefsfailed" flag in clbparm is set to true;
      6.2.3) The failedterm in clbparm is set to the current term.
      6.2.4) The method returns to the caller.
7) A save data set is created for the entity type. The temp data set is copied to the save data set. The OContextHelper is used to accomplish these operations.
8) An object called Entity Cache is created with the termids, object refernces, proc references, and object reference indexes (within data sets), obtained in the above steps. The invalidate flags for the terms are set to "false".
9) If the Entity Cache is not found (KBMECfound is false), in the kbmccontext reference of clbparm, then it is added to kbmccontext, else it is replaced with the latest version, created above.
10) The method returns to the caller.

APPENDIX-17

Operation of Code Generated for Colors of a Term
KBM Translator generates code for the colors of a term in a separate module (i.e. class file). Typically this module contains a method for each kbm color of the term. In addition, two special methods called driver and controller are generated by KBM Translator to control the execution of the colored rules. The KBM Vertical structural rule class module acts as guidance for the controller method, and also provides services for exception handling.
The operation of the driver, controller and exception handler are described below. It may be noted that the code generation details are already described in Appendix-3.
I) Operation of Driver Method
1) A new object called Vertical Structure Rule is created; the vertical structural rule for the term is passed as input parameter to this object's constructor. The process method of this object is invoked, which would process the vertical structural rule.
   It may be noted that vertical structural rule is in the form of vertical dependencies, which have the format: <source rule, source term, target rule, target term>; where, the source rule and target rule correspond to sequence numbers of colors of a term.
   The vertical dependency is depicted by an object called KBMVDep.
2) The colored rules to be executed are added to a vector called "dynamic Rules" in KBMVDep format, described above.
3) The driver then performs the following tasks in an "endless for loop".
   3.1) The controller method is invoked with the collaboration parameter, dynamic rules, and vertical structural rule. For a complete description of the parameters of this method, please refer to Appendix-3, Step 2.3.8.8.
   3.2) If the size of the dynamic rules vector has reduced to zero after the controller has processed the dynamic rules, then the execution breaks out of the "endless for loop".
   3.3) The dynamic rules vector is sorted on the target rule (please refer to the KBMVDep object format, described in step-1).
4) The next section of the code (which is executed, when the above for loop breaks out), checks if all the colored rules have produced a Boolean True; If any colored rule has produced a Boolean false, then a false value is returned to the caller, else a true value is returned to the caller.
   It may be noted that this module (class file) holds a Boolean results vector, which is updated by the controller method, with the return values of the colored rule after it is executed.
II) Operation of Controller Method
1) The controller method receives the dynamic rules vector form the driver method, as input parameter.
2) The controller reads the first KBMVDep record, from the dynamic rules vector, and retrieves the target rule id, from the record.
3) The controller then checks if there are more KBMVDep records with the same target rule id.
4) All these KBMVDep records are removed from the dynamic rules vector.
5) The target rule id retrieved in step 2, is used to invoke the colored rule associated with the color. It may be noted that KBM Translator had already generated code for the colored rules in separate methods of this module, along with a switch statement, which uses the target rule id, to invoke these methods.
6) The return value received due to the invocation of the method is saved in the results vector of the module.
7) The controller method executes a very important method of the KBMVStrucRule object called chkEntityRefsFailed, which takes care of the exceptions encountered during the processing.
8) The controller method returns to the caller.
III) Operation of chkEntityRefsFailed method of KBMVStrucRule Object
1) The chkEntityRefsFailed method receives the clbparm, the current rule id, the dynamic rule vector, the kbmvstrucrule object as parameters. In addition this method also receives the term id of the parent rule, the cdftseqnum of the parent rule, the color indexes for the term which are mapped to kbm rules, and their associated cdftseq numbers.
2) The method checks if the execution of the EntityRefs phase of the rule identified by ruleid has reached a normal completion. This is accomplished by checking for the entityRefsFailed flag in clbparm.
3) If EntityRefs Phase has failed, then the following steps are performed, else the method terminates, and returns to the caller.
   3.1) The failed term of the rule is retrieved from the clbparm.
   3.2) The affected dependencies are identified by executing the method getAffectedDependencies, which is provided by the KBMVStrucRule Object.

3.2.1) If the affected dependencies are null, then the following steps are performed.
   3.2.1.1) All rules in the dynamic rules vector are deleted.
      It may be noted that when a rule fails and if it has no further dependencies, then nothing can be done further; hence all dynamic rules are deleted. This situation is typically observed when the first (topmost) rule fails for Entityrefs.
   3.2.1.2) The clbpram entries for rule failure, which are entityRefsFailed, and failedTerm are reset.
   3.2.1.3) The method returns to the caller.
3.2.2) If the affected dependencies are not null, then the following steps are performed. (Please refer to Algorithm-18 and 19 for a comprehensive description of the Invalidation procedures).
   3.2.2.1) The first affected dependency is retrieved.
   3.2.2.2) The invalid flag in entity cache is set for the target rule id, and target term id, of the first affected dependency.
3.3) A new vertical dependency object is created with the current rule id, and failed term. This new vertical dependency object is added to the affected dependencies vector.
3.4) The affected dependencies vector is added to the dynamic rules vector.
3.5) The clbpram entries for rule failure, which are entityRefsFailed, and failedTerm are reset.
4) The method returns to the caller.

APPENDIX-18

Invalidation Techniques in KBM Rule Processing
The following techniques are employed for invalidating object and procedure references in KBM rule processing.
It may be noted that owing to the KBM horizontal and vertical structural rules, we have two different types of invalidation schemes.
Horizontal Terms: Consider a simple KBM rule given as:

$T1*T2*T3;$

When the source of T3 is at end-of-source, we need to get next entity reference of term T2. The attributes of T2 could have an effect on the proc object of T3, i.e. we need to re-determine the proc object reference of T3.
Further, it may be noted that T2 is at end-of-source, implicitly implies T3 is also at end-of-source, due to the nested-for loop nature of horizontal structural rules.
Thus, for a horizontal sequence of terms, we need to perform two operations:
a) Invalidate the proc of current entry. As stated above, invalidation implies we need to re-determine the proc object reference of the term.
   If data sets are specified instead of procs, they must be reset, to index 0.
b) Invalidate the object of previous term.
   For simple horizontal terms, this implies we need to transfer control to the previous term, which by default (other than first-time) does a get next object operation. However, this step is more complex than it appears, since a rule may be in execution state or in non execution state. Rules which were executed previously end up in Entity Cache, and we can set the invalidation flag, which would take effect when the rule is re-executed later.

Vertical Terms: Consider a simple KBM rule given as:
T1.%kbm-color-1.%kbm-color-2.%kbm-color-3;
It is assumed that each of the kbm rules associated with the kbm colors cited above have 3 terms;

kbm-color-id-1 rule: $T11*T12*T13;$ kbm-color-id-2 rule: $T21*T22*T23;$ kbm-color-id-3 rule: $T31*T32*T33;$ Let us further assume that the vertical dependencies are as follows:
T31→T12; T22→T12; where, implies dependency.
When T31 is at end-of-source, its proc reference is invalidated.
T12 object reference is invalidated.
Along with the T12 object reference, T13 proc reference is invalidated.
In the above vertical structural rule, we have T22 T12; as affected dependency. When T12 object reference is invalidated, we need to invalidate the proc references of affected dependencies. When a proc reference of a term of a rule is invalidated, the proc references of all terms lower to it in the rule are also invalidated. In other words, the proc references of both T22, and T23 would be invalidated.
The scheme may be generalized as: When a proc or object reference of a higher source is invalidated, the sources lower to it, must get a chance to re-establish their proc references, so their proc references are invalidated.

APPENDIX-19

Implementation of Invalidation Techniques in KBM Rule Processing
The Invalidation techniques are implemented as described below.
1) Object Reference Invalidation: An object reference may be invalidated in two different ways.
   1.1) When the rule is currently in execution, we simply have to pass control to the previous term. Consider a rule with terms T1*T2*T3;
      While establishing Entity refs for term T3, we can assert that T2 was already established, due to nested-for structure. When we pass control to T2, then since it is not the first time T2 is encountered, it leads to get Next Object reference operation on source of T2.
   1.2) It is possible that a rule is currently not in execution, but was executed previously. This happens in case of colored rules due to vertical structural rules. Since the rule is already executed, it would have an Entity Context, in the KBMCContext object (which resides in clbparm). In this case, the Invalid flag for the term may be set, in the entity Context.
      When the rule is scheduled for execution at a later time, it would invalidate the current object reference, and procures the next Object reference.
2) Proc reference Invalidation: The proc reference invalidation technique relies on the proc object.
   The implementation has the following steps.
   2.1) Every KBM proc object must implement an interface called IKBMProcObject (please refer to Appendix-6), which provides interface methods called "setInvalidateFlag", and "chkInvalidateFlag". The former method sets a flag in the proc object, indicating that the proc object is invalidated; and the later method checks for the Boolean truth-value of the flag.

2.2) Before executing a getNextObject or getCurObject method, the application code checks the invalidation flag, in the proc object via the "chkInvalidateFlag".
2.3) If the Invalidation flag of the proc is true, then the following steps are performed.
    2.3.1) The application re-establishes the proc object reference, by invoking the proc color method generated by the KBM Translator.
    2.3.2) Since the proc reference is newly established, the getNextObject reference is executed to get the next object reference from the proc.
    2.3.3) The invalidation flag is set to false.
2.4) If the Invalidation flag of the proc is false, the application code continues with it's processing.

Note: The KBM Translator would generate the above code automatically. Since this code applies to low-level methods like getCurObject and getNextObject, describing this code along with the rest of the code generated, could lead to many folds of code complexity. Hence, this important procedure is shown as an additional step, that is performed by the KBM Translator during its code generation.

APPENDIX-20

KBM Planning Algorithm

The KBM planning algorithm receives initial and goal states as inputs, and attempts to discover a set of activities called workflow, which could take the initial state to the goal state. The algorithm utilizes the "Activity Switching" Table (FIG. 22), described in the description section.

One of the challenges faced by the planning algorithm may be informally described as a "chicken-egg" problem. More specifically, we need inputs to determine the activities involved in the workflow (by executing the planning gears). However, the requirements for these inputs would be known, only if we know what activities exist in the workflow.

Figure 23:
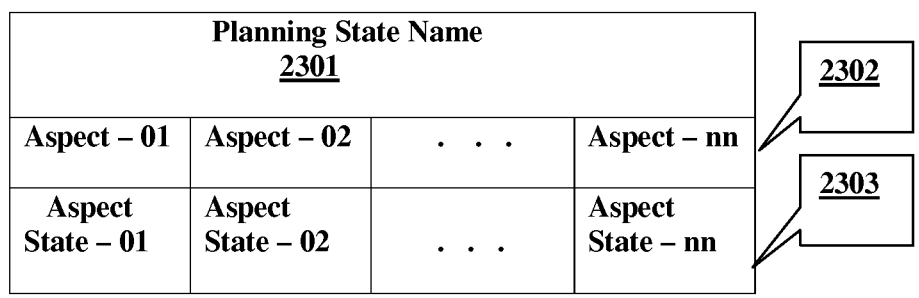

In order to overcome the deadlock cited above, KBM Planning algorithm, divides the planning task into three phases, namely—
a) Abstract Planning Phase
b) Concrete Planning Phase
c) Work Flow Planning Phase In the algorithm given below, planning state implies, states of a set of aspects of macro entities. Thus, the initial and goal states may be viewed as initial and goal planning states. FIG. 23, depicts the layout of the planning state, which comprises of:

Planning state name 2301, a set of aspects 2302, and a set of states 2303, associated with the set of aspects 2302.

Activities and "planning states" have the following properties:
  A planning state can lead to a set of activities, which may be deduced from the Activity switching table, referred above.
  Two planning states are considered equal if they lead to identical sets of activities.
  An activity may lead to a set of planning states, which are determined by the desired and special states of the activity.
  Planning states may not exactly match states in the activity-switching table.
  A function called "cover" is employed to determine what states of activity switching table may be selected for a given planning state. The cover function ensures that all states of aspects of macro entities of the activity switching table entry (start macro entity aspect vector column) exist in the given planning state.

Planning states are held in an outer containing object, called the Planning node.

Figure 24:
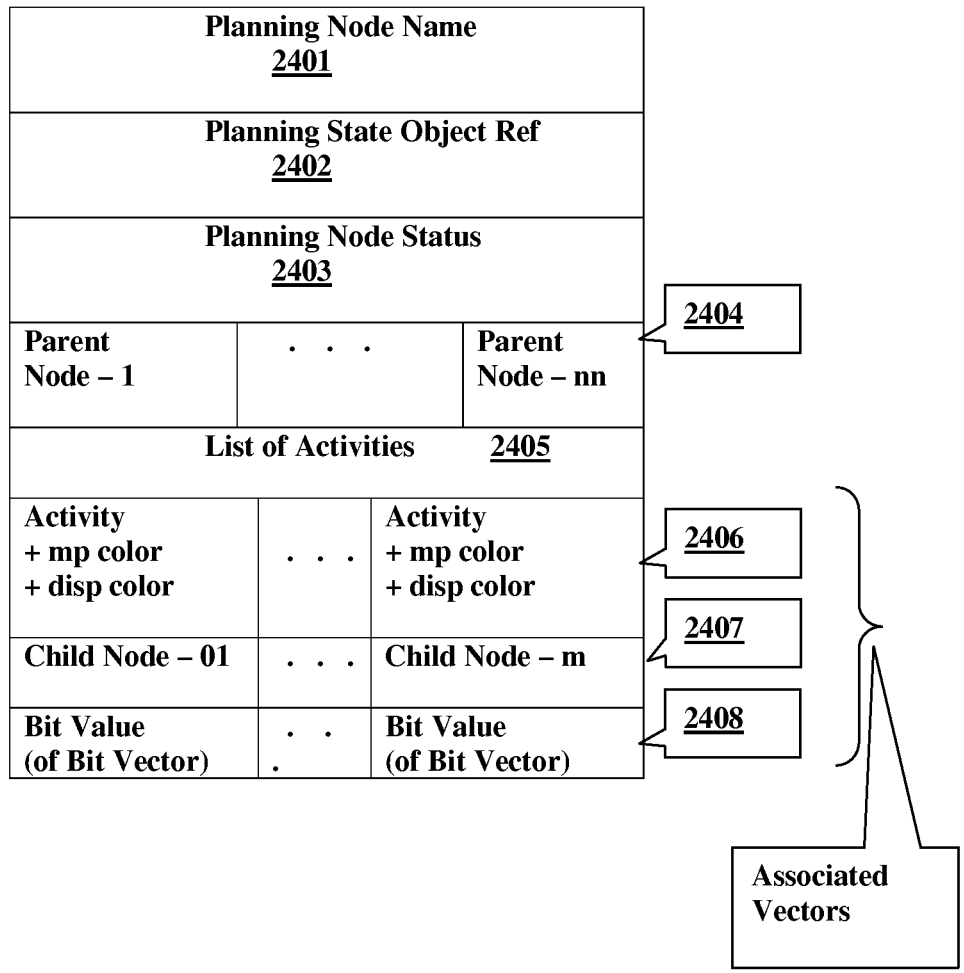

FIG. 24, depicts the planning node, which comprises of: planning node name (2401), planning state (2402), status of the planning node (2403), a set references to parent nodes of the current planning node (2404), list of activities the state can lead to (2405), vector of activities plus disposition color and mode of processing color (2406), vector of references to child nodes of the current planning node (2407), a bit vector (2408), which indicate whether the child nodes still exist or logically pruned.

Planning nodes described above may be employed to create a graph (or tree) structure. Graph/Tree traversal algorithms use Breadth-First or Depth First techniques, which are popularly referred to as BFT and DFT traverse techniques. Traversal of graph/tree structures is a very old and well-understood prior art. Hence traversal algorithms are omitted, to keep the description simple, and concise.

Phase-I—Abstract Planning: This algorithm constructs the Abstract Planning Graph as described below.

1) A new planning node is created. The initial planning state is saved in the planning node. The status of the newly created planning node is set as "not visited". The reference of this node is held in a special variable as the root of the abstract planning graph.
2) The abstract planning graph is searched for "not visited" nodes, and the next "not visited" node is selected, and set as current planning node. If there are no more planning nodes to be visited, then control is transferred to Step 10.
    2.1) If the planning state of the current planning node matches the goal state, then the status of the planning node is set as "goal". Control is transferred to Step 2.
3) The activities that may be deduced from the planning state (in the current planning node) are determined, by searching the activity-switching table, and by making use of the cover function described above.
    3.1) If no activities could be deduced, then the status of the planning node is set as "leaf". Control is transferred to Step 2.
    3.2) The list of activities are stored in current planning node (2405).
4) If the activities of any other planning node (other than this node), exactly match the activities of this planning node, then the status of the current planning node is set to "repeat". It may be noted that if the activities repeat, then the child states repeat or match exactly.
    4.1) The parents of the current planning node are identified.
    4.2) In each of the parents, the reference of the current planning node is searched in the child nodes references list.
    4.3) The child node reference is now switched to the planning node that matched the current planning node.
    4.4) The current planning node would become an orphan, so it is added to a list, for later deletion/garbage collection.
5) For each activity of step-3, the intermediate planning states that the activity can lead to are determined by looking up the "target state" column (2205 of FIG. 22) of the activity-switching table. There could be several intermediate planning states, as target state of an activity is dependent upon the disposition color and the mode of processing color.
6) For each intermediate planning state obtained in step-5, a planning node is created, and the intermediate planning state is saved in the newly created planning node.

The status of the newly created planning nodes, are set as "not visited".
7) The activity plus the disposition and mode of processing color, which caused the intermediate states of step-5 are stored in the current planning node (column 2406).
   The references of the new planning nodes created in step-6 are saved in the current planning node as child planning nodes (2407).
8) The status of the current planning node is set as "visited".
9) Control is transferred to step 2.
10) A new planning node is created, with planning state as null, and its status is set as "final goal". The reference of this planning node is saved in a special variable called final goal node.
    10.1) All nodes in the planning graph with status as "goal" are obtained.
    10.2) The reference of the new planning node created above with status as "final goal" is added as child to all the nodes who have status as "goal".
11) The abstract planning graph is stored in persistable storage. It is assumed that the underlying platform and host language mechanisms provide "object persistence". In the absence of such a mechanism, the nodes may be assigned unique integer values as keys, and the links (references) to nodes may be replaced by these key values, to get a persistable graph. It may be noted that the nodes are independently persistable, as it is a very straight forward operation to convert a node to a database row or record.
12) The name of the file where the Abstract Planning Graph is persisted is returned to the caller.

Phase-II—Concrete Planning: This algorithm constructs the Concrete Planning Graph, from the Abstract planning graph, as described below.
1) The Phase-1 of the algorithm is executed and the name of the file where the Abstract Planning Graph is persisted is obtained as input parameter. The graph is reconstructed from persistable storage into main storage (or memory), or read in parts as and when necessary. It may be noted that all nodes that can be reached from the root constitute the "Abstract Planning Graph".
2) A new vector called control vector is created and the "final goal" node is added to this vector. Another vector called activities vector is created and initialized.
3) The abstract planning graph is traversed from the "final goal" towards the "root", i.e. in reverse order. This would produce a sub graph, devoid of branches, which do not lead to the "final goal" node. This graph is called the "Concrete Planning Graph". The following steps are performed during this traversal.
   3.1) The next node is retrieved (removed) from the top of the control vector of step 2. At end control is transferred to step 4. The node retrieved is regarded as the current node.
   3.2) The parents of the current node are retrieved, and their references are stored in a vector, called temporary vector. The temporary vector is recreated if it exists already.
   3.3) If the current node is "final goal" node, control is transferred to step 3.5.
   3.4) For each of the parents of the current node, which now exist in the temporary node, the following step is performed.
      3.4.1) The index of the current node in its parent is obtained. It may be noted that a parent node stores the links (references) of the child nodes.
      3.4.2) The corresponding bit (at the index), in the bit vector is set to 1.
   3.5) The temporary vector of parent nodes is added to the control vector of step 2.
   3.6) For each of the nodes in the temporary vector, the activities of the node are added to the activities vector created in step 2, if the corresponding bit is set to 1.
   3.7) Control is transferred to step 3.1.
4) An error is generated if the root node is not reached, during the above process.
5) All the activities in the "Activity Vetcor" are listed out, and the requirements to execute the planning gears of these activities is compiled, as input requirements to execute the workflow.
6) The abstract planning graph is now stored in persistable storage as Concrete Planning Graph. It may be noted that this algorithm modified the bit vectors of the abstract planning graph.

It may be noted that concrete planning allows us to discover the activities, which are potential candidates for inclusion into the workflow. All nodes that can be visited from the root, by taking into consideration the bit vectors, constitute the "Concrete Planning Graph".

Finally, it may be noted that the inputs of all the activities of the concrete planning graph, are what is to be sought from the user for discovering the workflow. It may be noted that inputs of activities may be dependent upon each other, and this dependency may be captured either by the underlying database schema or any other information schema. Thus, in most cases, the amount of input required to run the activities in the concrete planning graph could be condensed appropriately, however this topic is considered to be outside the scope of KBM. An implementer may choose a suitable optimization technique, from several techniques available in prior art.

Phase-III—Workflow Planning:
This algorithm attempts to prune the arcs of the concrete planning graph by taking into consideration the disposition of the activity. The resulting graph could provide a workflow, if a path exists from the root node to the final goal node, after the pruning branches, whose bit values are set as zeroes. It is possible that a plan i.e. workflow, may not always be found for a given "Concrete planning Graph".
The details of the algorithm are furnished below.
1) The name of the file where the Concrete Planning Graph is persisted is obtained as input parameter. The graph is reconstructed from persistable storage into main storage (or memory), or read in parts as and when necessary.
   It may be noted that all nodes that can be visited from the root, by taking into consideration the bit vectors, constitute the "Concrete Planning Graph".
2) A new vector called control vector is created and initialized. The root node is added to the control vector.
3) The next (top) node is retrieved (removed) from the control vector.
   At end control is transferred to step 8.
   The node retrieved above is regarded as the current node.
   If current node status is "goal" then control is transferred to step 7.
4) The activities of the current node are added to a temporary activities vector.
5) For each activity in the temporary activities vector, the following steps are performed.
   5.1) The planning gear of the activity is executed, and the disposition color is obtained.
   5.2) The child nodes of a planning node (FIG. 24) are associated with:
      activity-name+disposition-color+mode-of-processing-color;

It may be noted that there could be several disposition and mode of processing colors for an activity.

The current bit values in the bit vector (2408) of the current planning node are retained for the current activity name and the disposition color obtained in step 5.1 (for all mode of processing colors). The remaining bit values are reset i.e. set to zero.

This step gives us the true picture of what links can be traversed, and what links should be abandoned.

It may be noted that if a bit in the bit vector has zero, in the bit vector, the corresponding child link, is considered to be abandoned or pruned.

5.3) The child links (2407) of the current planning node are searched with the current activity name and the disposition color obtained in step 5.1.

5.4) All the link references i.e child nodes which have their bit set as "1" in the corresponding index position of the bit vector of the current node, are added to the control vector.

6) Control is transferred to step 3.

7) A special flag is set, indicating that at least one path to final goal is determined. Control is transferred to step 3.

8) If the special flag of step 7 is not set, then the procedure is terminated with an error message. This implies, that the procedure failed to find a path to the final goal, i.e. a workflow could not be established, using the initial & final states.

9) If the special flag of step 7 is set, then the Concrete Planning Graph is persisted as the Workflow Graph.

It may be noted that if the graph has multiple paths between the root node and the final goal node, then there are potentially multiple ways of realizing the goal state from the initial state. Any of these paths may be chosen for implementing the workflow. Typically, the shortest path is regarded as the default plan.

Traversal of the Workflow graph is now a straightforward problem well known in prior art (Graph Theory). The only important point to note is that a child link is considered to be abandoned, if the corresponding bit in the bit vector has a zero value.

A workflow may be generated either by hand or automatically, for a given set of activities. Workflow with Concur tags cannot be generated automatically, by KBM, as inter-dependencies between activities, is beyond the scope of KBM.

Finally, it may be noted that generating the workflow XML (with SEQ tags only) from a path of the Workflow graph is a trivial and straightforward exercise.

Note: The graph traversal algorithms, could perform implicit backtracking, and revisit an old node. An implementation may therefore adopt the well-known prior art technique, wherein, "Planning Gears" do not update the data bases directly, but write updates to sequential files, and reload their last state, when the node is revisited.

APPENDIX-21

Layout of KBM Entity Cache
The KBM Entity Cache holds the references of the entities, procedure objects and invalidation flags by colored rule and sub rule for each KB/KBM statement.
The KBM Entity Cache, is held in an object called KBMCContext, which in turn is held in the Collaboration parameter (clbparm).

The layout of KBM Entity Cache is provided below.

```
public class KBMEntityCache {
    public String stmt;
    public int cdftseqnum;
    public int dftseqnum;
    public Vector termids;         // kbm terms
    public Vector entityrefs;
    public Vector procrefs;
    public Vector entityrefidxs;   // last kbmdsrefidx
    public Vector invalidflags;    // terms invalidates
    // code - - - omitted
} // end class - KBMEntityCache
```

Layouts of KBM ClbParm, and KBM EqtInfo
The enhancements to ClbParm and the EqtInfo, which are derived from KB (ref-1), are trivial in nature, and are omitted, except for the brief description, provided below.

```
KBM ClbParm has these extra fields -
    public int lastcdftseqnum;
    public KBMCContext kbmccontext;    // holds Entity Cache
                                          objects
    public boolean entityRefsFailed;
    public int failedTerm;
KBMEqtInfo has these extra fields -
    int cdftSeqNum;
    Vector<Integer> kbmterms;
```

APPENDIX-22

Code Listings: The details of the code listings are provided below.

The code is generated by an Alpha Version of the KBM Translator, and may not reflect all the features cited in the specification, and may contain a few bugs.

The code was executed in a java programming environment.

| S No | File Name |
|---|---|
| 1 | CarSpec.xml |
| 2 | CarProb.xml |
| 3 | KBM Rules Table.txt |
| 4 | KBM Structural Rule Table.txt |
| 5 | KB Verb Dist Table.txt |
| 6 | CarSpec__$$print__XYZ__stmt0__1__0__EntityRefs.java |
| 8 | CarSpec__$$print__XYZ__stmt0__4__0__EntityRefs.java |
| 9 | stmt0__0__0__T0.java |
| 10 | stmt0__1__0__T0.java |
| 12 | stmt0__3__1.java |
| 13 | stmt0__3__2.java |
| 14 | stmt0__4__0__T0.java |
| 15 | stmt0__5__1.java |
| 16 | stmt0__5__2.java |
| 17 | stmt0__5__3.java |
| 18 | stmt0__5__4.java |
| 19 | stmt0__6__1.java |
| 20 | stmt0__6__2.java |
| 21 | stmt0__6__3.java |
| 22 | stmt0__6__4.java |
| 23 | stmt0__7__1.java |
| 24 | stmt0__7__2.java |
| 25 | stmt0__7__3.java |
| 26 | stmt0__7__4.java |
| 27 | CarProb.java |
| 28 | CarProbProc.java |
| 29 | CarProbProc__$$init__XYZ.java |
| 30 | CarProbProc__$$next__XYZ.java |
| 31 | CarProbProcX.java |
| 32 | CarReq.java |
| 33 | CarSpec.java |
| 34 | CarSpec__$$print__XYZ.java |

-continued

| S No | File Name |
|---|---|
| 35 | CarSpec__$$print__XYZ__stmt0__0__0__EntityRefs.java |
| 36 | CarSpec__$$printInfo__XYZ.java |
| 37 | CarSpecProc.java |
| 38 | CarSpecProc__$$init__XYZ.java |
| 39 | CarSpecProc__$$next__XYZ.java |
| 40 | CarSpecProcX.java |
| 41 | ICarProbProc__$$init.java |
| 42 | ICarProbProc__$$next.java |
| 43 | ICarSpec__$$print.java |
| 44 | ICarSpec__$$printInfo.java |
| 45 | ICarSpecProc__$$init.java |
| 46 | ICarSpecProc__$$next.java |
| 47 | KBMAPP03.java |
| 48 | ValTable__CarProbProc__$$init.java |
| 49 | ValTable__CarProbProc__$$next.java |
| 50 | ValTable__CarSpec__$$print.java |
| 51 | ValTable__CarSpec__$$printInfo.java |

What is claimed is:

1. A method executed by one or more processors, for processing activity models, contained locally or remotely on one or more processor readable storage devices, wherein, rules called Knowledge Base Modeler (KBM) rules, which were devised to depict complex processing scenarios, are obtained by, augmenting the method of the system called Knowledge Base System (KB), for representing and processing static and dynamic information, wherein the improvement comprises:

a) a new set of colors called reference colors, which are devised for augmenting reference mechanisms of entities, wherein, a type of reference color called "Data Set" color, can be assigned to terms of KBM rules, which implies, that entity references restricted to a partition or logical grouping implied by the data set color, are sought for the term of the KBM rule; and the absence of the said "Data Set" color, implies a default partition; Said entity references of the terms of KBM rules are stored in a container, capable of providing said partitions or logical groupings;

b) a new set of colors called complex colors, which are used for depicting complex processing notions;

c) a new set of colors called process colors, which are used for depicting effects of process structures on entities;

d) a new set of colors called conceptual colors, which are used for depicting rule graphs, in an abstract form;

e) new specialized structural rules called KBM Structural rules, for structuring the integration of said KBM rules;

f) an enhanced Object Context (O-Context), wherein each entity type, can hold a plurality of entity references, segregated into partitions, called data sets;

g) an extensible framework for creating new color types, and mapping these colors to said KBM rules;

said reference colors, complex colors, process colors, and conceptual colors are collectively referred to as KBM colors; and rules of said KB system, can be further enhanced by utilizing said KBM colors;

said KBM rules, are further integrated into larger process structures, by a framework called KBM "Desired Special Complex" (DSC) framework, which facilitates integration of process structures of lower order to process structures of higher order, recursively, until higher level process structures called "KBM Rule Graphs", "KBM Gears", and "KBM Activities" are progressively generated;

said KBM activities, can be configured for execution by generic workflow engines, which comprises:

h) Associating a queue called workflow queue, and a record called "Activity Failure record", with each of said KBM activities, based on the state reached by the activity upon execution, for integration with workflow engines, and storing these associations as metadata in a file called configuration file of the activity;

i) Associating a plurality of controls called "process controls", with each of said KBM activities, and storing these associations, in the configuration files of the activities, such that an activity is invoked, using one of the configured process controls, called default process control, or re-executed with a different process control after a previous failure;

such that, said KBM activities grouped into a set of sequential or concurrent activity blocks, called KBM workflow, depicts the activity flow of a complex application system or subsystem, which could be executed, to accomplish the goals of the application system or subsystem, by any generic workflow engine, specialized to process the said KBM activity meta data, in said activity configuration files, or by a pre-supplied module called KBM work flow coordinator.

2. The method of claim 1, comprises:

a) Assigning a type of reference color called "Instance Id" color, to terms of KBM rules, which implies, that an entity reference having the unique identification token, specified in the color value, is sought for the term of the KBM rule;

b) Assigning a type of reference color called "local reference" color, to terms of KBM rules, which implies that entity references held dynamically in a cache or special storage mechanism, of the parent entity, are sought for the term of the KBM rule, for which the color value is specified; Said parent entity is capable of holding several said cache storages simultaneously, and said local reference color, provides identification of the cache to be used for retrieving the entity references of the term of the KBM rule;

c) Assigning a type of complex color called "category color" to terms of KBM rules, which implies, that an entity reference possessing a predefined set of features, and/or relations or bindings with other entities, and/or a pre-specified rank or metric among a plurality of entity references, which are applicable or available for the term of the KBM rule, is sought for the term; and the requirement said features, relations, bindings, rank, or metric must satisfy is encoded as a kbm rule, which is associated with the said category color;

d) Assigning a type of complex color called "form color", which implies, that an entity reference possessing a predefined set of features, and/or relations or bindings with other entities, is sought for the term; and the requirement said features, relations, bindings, must satisfy is encoded as a kbm rule, which is associated with the said form color;

e) Assigning a type of complex color called "model color", which implies, that the an entity reference, whose sub entities have a predefined arrangement with respect to each other and with respect to their parent, identified by their features, characteristics, relations and bindings, is sought for the term; and the requirement said arrangements, must satisfy is encoded as a kbm rule, which is associated with the said model color;

f) Assigning a type of complex color called "capability color", which implies, that an entity reference, which has a set of capabilities, is sought for the term; Said capabilities are defined directly as features or attributes of the entity, or defined indirectly as meta data or via a token called taxonomy identification; and the requirement said capabilities must satisfy is encoded as a kbm rule, which is associated with the said capability color;

g) Assigning a type of complex color called "characteristics color", which implies, that an entity reference possessing a predefined set of dynamic characteristics, is sought for the term; and the requirement said characteristics, must satisfy is encoded as a kbm rule, which is associated with the said characteristics color;

h) Assigning a type of complex color culled "binding color", which implies, that an entity reference possessing a set of bindings, with a predefined target entity, is sought for the term; Said bindings, could possess parameters, which are stored in the entity configuration files; Said bindings can be further constrained by binding parameters, features, relations, characteristics of the source and the target of the binding, and these requirements are encoded as a kbm rule, which is associated with the said binding color;

i) Assigning a type of complex color called "procedure color", which depicts the source for entity references of the entity type specified for the term of a rule; Said source is typically encoded as a class, method, and method color, and the mapping is stored in a mapping document called "Entity Maps", which is provided as part of configuration of the entity bearing the said color;

j) Mapping a path of execution of a process structure to a type of color called "process execution color", which depicts the runtime state of the process structure;

k) Assigning a color value of color type called "functional color" to entity references participating in a process structure, based on process execution color of the process structure and optionally the previous color values for the functional color type, already acquired by the entities; Said functional color type implies a map from old functional color values and current process execution color to new functional color values;

l) Assigning a color value of color type called "transformational color" to entity references participating in a process structure, which implies, that said entity reference, acquired a set of predefined functional colors, in succession;

m) Assigning a color value of color type called "disposition color" to a process structure, which implies, that the entities of the said process structure possess a characteristic called plasticity, which guides the entities towards a particular path, among a plurality of possible execution paths for the process stricture;

n) Assigning a type of color called "mode of processing" to process structures, which implies that the process structure defined with a predefined set of process control values, is to utilize one of the process controls, identified by the mode of processing color;

o) Mapping said complex colors like "category color", "form color", "model color", "capability color", "binding color", and "characteristic color" to KBM rules, by a mapping document called "Entity Maps", which is provided as part of configuration of the entity bearing the said colors; Said KBM rules associated with said colors are called colored rules, and can in turn contain terms having said complex colors, and so on in a recursive manner;

p) Applying a set of operators called KBM operators, to terms of said KBM rules, for determining existence of entities, assigning characteristics, for binding entities, and for assigning colors; Said characteristics, bindings, and colors are stored in internal caches of the entity and are accessible via predefined interfaces of the KBM System;

q) Assigning a type called Type-7A to said KBM rules, wherein the terms of said Type-7A rule, could represent fields with or without method invocations and KBM colors or any of Type-1 thru Type-9 rules of KB/KBM, with or without KBM colors, and any of said KBM operators;

r) Assigning a type called Type-7C to said KBM rules, wherein the terms of said Type-7C rule, could represent fields with or without method invocations and KBM colors or any of Type-1 thru Type-9 rules of KB/KBM, with or without KBM colors, and employ logical operators and return Boolean values as output;

s) Assigning a type called Type-7E to said KBM rules, wherein the terms of said Type-7E rule, could represent fields with or without method invocations and KBM colors or any of Type-1 thru Type-9 rules of KB/KBM, with or without KBM colors, and any of said KBM operators; Said Type-7E rules can receive the process execution color of another kbm rule, for which this rule is configured as effect rule;

t) Assigning a type called Type-8 to said KBM rules, wherein said Type-8 rule comprises of two terms, which are Type-7A rules, wherein the terms of the first Type-7A rule, are depicted by Type-4 or Type-5 KB rules, and the terms of the second Type-7A rule are depicted by Type-7A rules, such that the arrangement represents a case block;

u) Assigning a Type called Type-9 to said KBM rules, wherein the said KBM rule is assigned a group rule id, and all such kbm rules possessing the same group rule id, is invoked by the group rule id; The execution of the Type-9 kbm rule, comprises of selecting one of the kbm rules of the group, whose terms on the RHS side of the expression are satisfied by the current state of the application contexts, and returning the LHS as the result of execution of the rule;

v) Assigning a structural rule called horizontal structural rule to a kbm rule, which defines the order of determination of the entity references and their dependencies in a "nested-for", format;

w) Assigning a structural rule called vertical structural rule for each term of the said rule, which defines the order of evaluation of the said colored rules and their dependencies in a "nested-for", format; The dependencies of said colored rules are defined as source-colored-rule, term-of-source-colored-rule, and target-colored-rule, term-of-target-colored-rule;

x) Said Type-7A/7C/7E, 8, 9 KBM rules, along with said Type-1 thru Type-6 KB rules employing KBM colors, are collectively regarded as KBM rules.

3. The method of claim 1, comprises:

a) Integrating process structures of any granularity into graphs, whereby said KBM rules are integrated into KBM rule graphs, and said KBM rule graphs are further integrated into KBM gears, and said KBM Gears are further integrated into KBM Activities, such that, a path reached by the graph of a process structure during execution, is assigned a state called desired, or special or complex;

b) Linking process structures to each other based on the state reached, such that a desired state reached by a process structure could optionally link to another process structure;

c) Linking process structures to each other based on the state reached, such that a special state reached by a first process structure is always linked to a second process structure, except when the first process structure is a leaf node of the graph, or when a higher level structure containing the first process structures as child process structure, undertakes the responsibility to handle the special state reached by the first process structure as its own special state;

d) Linking process structures to each other based on the state reached, such that a complex state reached by a process structure called original process structure is always linked to another new process structure, wherein the new process structure or its descendants link back to the said original process structure, whenever they reach a state marked as desired state;

Accordingly, said KBM rule graphs and said KBM Gears possess desired, special or complex states; whereas said KBM activities possess desired or special states.

4. The method of claim 1, further comprises of— a) Translating said KBM rules to statements of a predefined host language, by a predefined software module called KBM Translator, whenever said KBM colors are encountered, in the said rule, which is under translation; Said KBM translator, is invoked by the Translator of said KB system, whenever said KBM colors or operators are encountered; Said KB Translator holds a plurality of runtime control parameters like Collaboration parameter (Clbparm), Equation Info (EqtInfo);

b) Translating said KBM colors by said KBM Translator, wherein a sequence number called color-dft-seqnum is assigned to each colored rule, by traversing each colored rule, due to colors of terms of the rule, in a depth-first-traversal (dft) order; The main rule is assigned a predefined value of zero; Said KBM rule also inherits an identification number called dft-seq-num-assigned by KB Translator to the KBM rule, c) Generating a method referred to as "EntityRefs" method, to determine the applicable entity references for the terms of a KBM rule, based on data set or procedural colors and horizontal structural rule specification, such that said entity references are now available for said KBM colored rules, which would come into effect due to said KBM color specification, for the terms of the KBM rule being translated;

d) Translating said KBM colors by said KBM translator, wherein said KBM colors of a term are translated as methods, and these methods are held in an outer containing object, such that special methods called "driver" and "controller" generated as part of the translation could control the execution of the generated methods, based on the structuring requirements specified by the end user, as vertical structure rule for the term; The body of said KBM rule, is then translated by said KB Translator, as if it is devoid of KBM Colors;

e) Executing said KBM rule, whereby the code generated by the KB Translator when executed, invokes said EntityRefs method generated by said KBM Translator for determining the entity references of the terms of the said KBM rule being executed;

Said EntityRefs method generated, utilizes a specialized data structure called Entity cache, which is held in said runtime control parameter of KB called clbparm, for storing said entity references and procedure object references of the terms of the said KBM rule, and data set indexes, and a set of flags called Invalidate flags, which indicate if a term of the said KBM rule is still valid, along with the cdft-seq number and the dft seqnumber of the said KBM rule;

Storing colors, and characteristics of object references, in a predefined object called KBMAdapter, and for providing access to this information via a predefined interface, called IKBMColorPalette.

5. The method of claim 4, comprises:

a) Retrieving prior recordings of the entity references, and procedure object references, data set indexes, and invalidate flags from the said Entity cache by utilizing the said colored dft seq number and the said dft seq number of the said KBM rule;

b) Evaluating the procedure object references of the terms of said KBM rule, by creating the objects depicted by the respective procedure colors, when said procedure colors are specified for the terms;

c) Retrieving the current entity reference by invoking the get current object method of the said procedure object reference, when said term has procedure color, and when the said entity cache has the said procedure object reference, and if it is the first time, the entity reference of the term is being evaluated, and the invalidate flag of the term is not set;

d) Retrieving the next entity reference by invoking the get next object method of the said procedure object reference, when said term has procedure color, and when the said entity cache has the said procedure object reference, and if it is not the first time, the entity reference of the term is being evaluated, or if the invalidate flag of the term is set;

e) Retrieving the next entity reference by invoking the get next object method of the said procedure object reference, when said term has procedure color, and when the said entity cache has no entry for the current rule, or if it is not the first time, the entity reference of the term is being evaluated;

f) Evaluating the entity references of the terms of the rule, by retrieving the elements of the data sets depicted by the data set colors, in the collaboration object depicted by the term of the rule, when said data set colors are specified for the term; Said evaluation comprises of:

Retrieving the current entity reference, when the said entity cache has entry for the current rule, and if it is the first time, the entity reference of the term is being evaluated, and the invalidate flag of the term is not set;

Retrieving the next entity reference, when the said entity cache has entry for the current rule, and if it is not the first time, the entity reference of the term is being evaluated, or if the invalidate flag of the term is set;

Retrieving the next entity reference, when the said entity cache has no entry for the current rule, or if it is not the first time, the entity reference of the term is being evaluated;

g) Evaluating the entity reference by retrieving the elements of the last data set of the collaboration object depicted by the term of the rule, when neither a procedure color or a data set color are specified for the term;

h) Storing the said entity reference obtained either by the procedure color or the data set color, or from the default dataset, in a temporary data set called the temp data set, whose name is augmented by the said color-dft-seq-num of the rule, and the dft-seq-num of the rule;
i) Evaluating the said colors of the rule, by executing kbm rules associated with the colors, such that said kbm colored rules could now utilize the entity references determined by the evaluation of the said procedure color or data set color or their default;
j) Invoking the said driver method of the outer containing object, which has the code generated for the kbm colored rules of the term, as methods;
k) Repeating the process, for each term of the said KBM rule, by retrieving entity references from the procedure implied by the procedure color or from the data sets implied by the data set color of from the default data set color, and evaluating the colored rules by invoking the said driver method associated with the container of the colored rules, until there are no more entity references in any of the sources, or an entity reference of the term, has satisfied the requirements of the colored rules specified for the term, and returned a Boolean true value;
l) Executing the reset method of the procedure object, and setting the object reference is to null, and the data set index is set to zero, when none of the entity references, implied by the procedure color or data set colors or default, satisfied the requirements of the colored rules specified for the term;
m) Invalidating the procedure object reference, if the term has specified a procedure color, when none of the entity references, implied by the procedure color or data set colors or default, satisfied the requirements of the colored rules specified for the term;
n) Invalidating the object reference, of the previous term, and transferring control to the label of the previous term, if a previous term exists, and if none of the entity references, implied by the procedure color or data set colors or default, satisfied the requirements of the colored rules specified for the term;
o) For each of the terms of the rule, copying the said entity reference in the temporary data set called the temp data set, which is augmented by the said color-dft-seq-num of the rule, and the dft-seq-num of the rule, to a new data set called "save" data set, of the collaboration object, implied by the term of the rule, when the said driver of the term has returned a Boolean true value, implying that all the colored rules were evaluated satisfactorily, that is, all the specified colors are applicable to the current entity reference;
p) Saving said entity references and said procedure object references of the terms of the said KBM rule, and said data set indexes, and said Invalidate flags, along with the colored-dft-seq number and the dft seqnumber of the said KBM rule, in said Entity cache, when entity references of all the terms of the said rule are established;
q) Returning control to the caller, after setting special flags in the control parameters, indicating a failure to establish entity references, if a previous term does not exist, and if none of the entity references, implied by the procedure color or data set colors or default, satisfied the requirements of the colored rules specified for the term.

6. The method of claim 4, further comprises of—
a) Checking for the invalidate flag of the said procedure object reference, which is held by the said procedure object itself as an internal attribute or field, before invoking the get current or get next object methods of the procedure object;
b) Re-establishing the said procedure object reference, by invoking the method generated for the procedure color, and establishing an object reference by invoking the get next object reference, when the invalidate flag is set to true.

7. The method of claim 4, further comprises of—
a) Retrieving the vertical structural rule specified for a term of the rule, and splitting it into constituents comprising of source rule, source term, destination rule, destination term, wherein, said source rule and said destination rule are colored rules, and correspond to colors of the current term being evaluated, such that an object called Vertical dependency object, which comprises of the said source rule, source term, destination rule, destination term is created for each constituent of the said vertical structural rule specification;
b) Storing said Vertical dependency objects created from the said vertical structural rule, in an object called Vertical Structural Rule Object;
c) Creating an object based on said Vertical dependency object template, for each kbm color specified for the current kbm term of the said kbm rule, and adding the newly created objects to a vector called the dynamic rules vector, wherein, fields corresponding to source vile and source term of the object are set to −1, and the field corresponding to destination rule is set to the index of current kbm color, and the field corresponding to destination term is set to −1;
d) Said dynamic rules vector, provides abilities to inject colored rules into the execution stream, based on vertical dependencies specified for the colors of the term;
e) Invoking a method called controller, which executes the colored rules, associated with the colors of a term;
f) Checking for the size of the dynamic rules vector, and terminating the process, and returning to the caller, when the dynamic rules vector reaches a size of 0;
g) Sorting the dynamic rules vector, based on the destination rule id field, wherein elements of said dynamic rules vector, hold the destination rule id field;
h) Repeating steps "e thru g" until the size of the dynamic rules vector reaches zero, and returning a Boolean true value, when all colored rules executed produced a Boolean true value, and returning a Boolean false value, when any colored rules executed produced a Boolean false value.

8. The method of claim 7, further comprises of—
a) Retrieving vertical dependency objects from the dynamic rules vector, until a control break occurs on the destination rule, and deleting all such objects from the dynamic rules vector, and executing the colored rule depicted by the destination rule id;
b) Checking for the status of the execution of the said colored rule, by inspecting the special flags in the control parameters, which could indicate a failure to establish entity references, and when such a failure is detected, said vertical dependencies of the currently failed rule are retrieved from the Vertical Structural Rule Object, and added to the dynamic rules vector, along with the current colored rule, which has failed;
c) Updating the status of execution of the colored rule in a vector called results vector, which is vector of Boolean variables.

9. The method of claim 8, further comprises of—
a) Searching the Vertical Structural Rule Object, and obtaining the target destination rule and term, when the source rule id of an element of Vertical Structural Rule Object, matches the colored rule id, which has failed;
b) Said target destination rule and term is then used to search the Vertical Structural Rule Object, on destination rule and term attributes and the source rule id fields of the matched rows, are retrieved as affected dependencies;

c) Invalidating the procedure object reference of the term, which failed, if the term has a procedure color;

Invalidating the object reference of the term depicted by the said target destination rule and term;

e) Invalidating procedure object references and resetting data set indexes of all terms, bound by a horizontal structural rule, in the said target destination rule, which have a term id, higher than the said target destination term;

f) Invalidating the procedure object reference and resetting data set index of an affected dependency term, and for all terms in the rule of the affected dependency, bound by a horizontal structural rule, which have a term id higher than the said affected dependency term; and repeating the procedure for all such affected dependencies, which are either directly affected or indirectly affected, due to recursion.

10. The method of claim 1, further comprises of— a) Translating said KBM Rule Graphs, KBM Gears, and KBM Activities, which are process structures of higher granularity, into class files called process structure code files;

b) Said process structure code files, comprises of a set methods, to invoke the translated process structures of lower order, a special method called init to initialize the internal storage variables used by the process structure code file, and a special method called finish which performs the necessary house keeping, before termination;

c) Generating code to determine the process execution color based on the execution path of the process structure graph, and the configuration defined in the process structure table;

d) Generating code to determine the functional color of the entities participating in the process structure based on the execution path of the process structure graph, when a functional color is defined for the process structure in the functional color table;

e) Generating code to determine the transformation color of the entities participating in the process structure based on the functional colors of the entities of the process structure, when a transformational color is defined for the process structure in the functional color table;

f) Representing rule graphs, as abstract rule graphs, wherein, each node and arc, is depicted using abstract rules, and the terms of the said abstract rules, are encoded with an abstract type, and conceptual colors;

g) Translating abstract rule graphs, to concrete rule graphs, by successive translations of abstract rules encoded with conceptual colours to semantic roles and methods, followed by the translation of semantic role and method to a KBM rule.

11. The method of claim 1, further comprises of— a) Capturing a request for executing said KBM workflow, when an online or batch request is made by the end user, and recording it in a queue called KBM Workflow queue; Said request comprises of name of workflow and information regarding the key fields of the entities that participate in the processing of the workflow;

b) Retrieving the request for executing the Workflow from the said KBM Workflow Queue, by KBM WorkFlow Coordinator, supplied as part of KBM runtime, and tools, which schedules and controls the execution of KBM Workflows;

c) Retrieving the Workflow specification document, based on the workflow name received as input in the said KBM Workflow queue record;

d) Parsing said Workflow document, and identifying the activity blocks, which are scheduled for execution;

e) Scheduling the activity contained in the next block for execution if said block is enclosed in special tags called "SEQ", which imply that the activity is to be executed in sequential order, by creating an instance of the activity module to be executed, and executing the "init" method, and subsequently the "execute" method, and creating a record in a table called KBM WorkFlow Execution status table, indicating that the activity was scheduled for execution;

f) Scheduling all the activities contained in the next block for execution if said block is enclosed in special tags called "CONCUR", which imply that the activities are to be executed in concurrent order, by repeating the process described for said single activity delimited by "SEQ" tags, for each of the activities specified in the block, delimited by the "CONCUR" tags;

g) Executing the process structures of lower order contained in the current process structure recursively, by executing their init, execute and finish methods, until the current activity being executed, reaches a desired or special state;

h) Updating said KBM Workflow Execution status table, when activities scheduled by workflow coordinator for the said KBM Workflow, have reached a desired or special state;

i) Monitoring the Execution status of the activities already scheduled for execution by the said KBM Workflow coordinator, based on a preset timer;

j) Scheduling the next workflow block of the current workflow for execution, if all the activities of the current workflow block have reached a desired state;

k) Updating said KBM Workflow Execution status table, with the completion status of the workflow, when all activities scheduled by workflow coordinator for the said KBM Workflow, have reached a completion state.

12. The method of claim 11, further comprises of— a) Generating a record called Activity Failure record, for each of the activities of the current workflow block, which have reached a special state, and writing the said Activity Failure record to a queue specified for the special state of the activity, in the activity configuration file;

b) Said Activity failure record is the result of failure of a KBM Gear of the failed activity, and is derived from an object called Gear Failure record, which is generated by a KBM gear of said activity when it has failed, and reached a special state, and when that special state reached is not connected to another KBM gear, but is handled by the activity, which is the container for the said failed KBM Gear;

c) Rescheduling the activity, which has reached a special state, and which was marked as "resched with mp-color", by the user module, executed to handle the special state.

13. A method executed by one or more processors for determining the conceptual model of an activity, wherein, specialized entities called conceptual entities are employed to depict conceptual structures, and effects of processing on real entities, and wherein, states of particular aspects of a subset of said conceptual entities called macro entities, could yield new states, owing to the conceptual execution of said activity, such that a sequence of activities called KBM workflow, is determined from an initial set of macro entities and the states of their aspects, called initial planning state, and a final set of macro entities and the states of their aspects called goal planning state, by a framework called KBM workflow planning, which comprises:

a) Assigning a type to said conceptual entity, whereby said conceptual entity is classified as entity, process, or wrapper, and wherein the entity type is further sub classified as component, port, fluent, signal, channel, connector, event or concept;

b) Storing Conceptual entities in memory by means of a predefined data structure called Conceptual object data structure, which assists in accessing and manipulating the contents of the conceptual entity;

such that, said components could store other components, ports, fluents, characteristics, and functions;

said ports store channels or connectors as components;

said channel or connector stores source and target components as components, and source and target ports as ports;

said conceptual entities of all types store their colors, characteristics, in a predefined object called KBMAdapter;

c) Associating complete or partial paths of execution of said KBM rule graphs or any generic process structure with novel functions called conceptual Mu-Functions, which operate on said conceptual entities; such that, Said Mu-Functions, operate on conceptual entities and perform operations such as, create, morph, delete, bind, unbind, move, insert, remove, send, receive, increase, decrease, set, reset, compute, perform, start, stop, pause, publish, subscribe;

d) Compiling a list of applicable Mu-functions, for a particular path of KBM activity based on contained KBM gears, and the contained KBM graphs within the said contained KBM gears, based on specifications in a table called process structure table;

e) Executing the said Mu-functions compiled for an activity from the contained KBM Gears and KBM Rule graphs, with a pre-specified initial configuration of conceptual entities, which when executed yields a transformed configuration of the initial configuration, in terms of conceptual entities;

f) Evaluating said configuration further by a set of predefined kbm rules, called aspect rules, of said macro entities, to yield new states of particular aspects of macro entities;

g) Storing the state switching behavior of said activities with respect to said aspects of the said macro entities, in the form of a table, called Activity Switching table, wherein the said initial configuration is depicted by "Start Macro Entity Aspect vector" or start state, and the transformed configuration is depicted by "Target Macro Entity Aspect vector" or target state.

14. The method of claim 13, further comprises of— a) Creating a node called "root" planning node and storing the said initial planning state in the root-planning node; Said root node is set as current planning node or state, to assist recursive processing;

b) Searching the entries of said Activity Switching table, for the planning state, in the current planning node, such that all the states of aspects of macro entities of a starting planning state of an entry of the said Activity Switching table, are covered by the said current planning state; The activities of said entries, which matched, are stored in current planning node, along with the disposition and mode of processing colors;

c) Creating planning nodes, for each of the target states depicted by the said entries of the Activity Switching table, which matched the current planning state, and adding these nodes as child nodes of the current planning node;

d) Recursively processing the newly created planning nodes, as stated above, and expanding the planning node set as a graph called "Abstract Planning Graph", until the goal planning state is reached;

e) Storing the "Abstract Planning Graph" in a persistable storage;

f) Pruning the branches or arcs of the said "Abstract Planning Graph", if they do not lead towards to the goal state, by using bit values assigned to branches; Said pruning is accomplished by traversing the graph from the goal node, and assigning bit values to branches, which are in the path towards the root node;

g) Creating a graph called "Concrete Planning Graph", by traversing the said "Abstract Planning Graph" from the root, and by taking into consideration the pruned branches via the said bit values, and persisting the said Concrete planning graph to persistable storage;

h) Compiling input requirements by taking into consideration, the input requirements of the activities of the said "Concrete Planning graph", and any interdependencies that could exist owing to data base schemas; Said activities depict their input requirements, and a special gear called planning gear in their configuration documents;

i) Capturing the inputs from the user, using said input requirements complied from the said "Concrete Planning graph" and asserting that the inputs satisfy the initial planning state;

j) Traversing the said "Concrete Planning graph", from the root, by executing the planning gears associated with said activities of planning nodes, with implicit backtracking;

k) Preserving the bit values of only those branches, which correspond to the activity and the disposition color determined by the planning gear, and setting the rest of the bit values of the planning node to zero;

l) Selecting activities in the path from root to final goal, of the said "Concrete Planning graph", as possible workflows, wherein only those branches, which correspond to the activity and the disposition color determined by the planning gear, are regarded as viable.

15. A system, stored in a non-transitory computer readable medium, called Knowledge Base Modeler (KBM), including computer usable program code for processing Activity Models, wherein, rules called KBM rules, which were devised to depict complex processing scenarios, and which utilize the norms employed for representing and processing the static and dynamic information of the Knowledge Base (KB) system, are further integrated into larger process structures, by a framework called KBM "Desired Special Complex" (DSC) framework, which facilitates integration of process structures of lower order to process structures of higher order, recursively, until higher level process structures called "KBM Activities" are generated, and wherein, specialized entities called conceptual entities are employed to depict conceptual structures, and effects of processing on real entities, and wherein, states of particular aspects of a subset of said conceptual entities called macro entities, could yield new states, owing to the conceptual execution of said activity, such that a sequence of activities called KBM workflow, is determined from an initial set of macro entities and the states of their aspects, and a final set of macro entities and the states of their aspects called goal, by a novel framework called KBM workflow planning, and said KBM workflow, which depicts the activity flow of a complex application system, is executed to accomplish the goals of the application system, comprises:

a) A tool called KBM translator, means for translating—
said KBM rules, utilizing said KBM colors, and process structures derived recursively from said KBM rules, like KBM rule graphs, KBM Gears and KBM activities to equivalent statements of a predetermined host language;

b) A tool called KBM Planner, means for—
determining a sequence of activities, based on an initial, and goal planning states, wherein, said planning state comprises of states of aspects of a set of Macro entities;

c) A plurality of tables called KBM tables, means for storing—predefined configurations and associations, of said KBM colors, KBM rules, and process structures; and a plurality of Configuration files called KBM Configuration files, means for storing—predefined configurations and associations, of said KBM colors, KBM rules, and process structures;

d) A plurality of modules called KBM tools and Runtime, means for supporting the execution of user activities and code generated by said KBM Translator, for said KBM rules, and said process structures like KBM rule graphs, KBM Gears, and KBM activities, for a predefined host language;

e) Means for storing the configuration of colors and their mappings to KBM rules, in a predefined configuration document, called Entity Maps document; and means for storing colors and characteristics of object instances, determined at run time, in a predefined object called KBMAdapter and for providing access to this information, via a predefined interface called IKBMColorPalette;

f) Means for storing mappings of abstract entity specified with taxonomy and auxiliary colors, and a token, or an interaction of several abstract entities with taxonomy and auxiliary colors to a semantic role and method of the abstract entity;

g) Means for storing the mapping of semantic role and method of an abstract entity to a kbm rule, and its verb color;

h) Means for storing conceptual objects in memory, for processing;

i) Means for storing the configuration of KBM rule graphs, and their states and effects, in a predefined configuration document called the KBM Rule Graph document;

j) Means for storing the configuration of KBM Gears, and their states and effects, in a predefined configuration document called the KBM Gear document;

k) Means for storing the configuration information for the operational model of said KBM activities, and their states, in a predefined configuration document called the Operational description of KBM Activity;

l) Means for storing the configuration information for the conceptual model of said KBM activities, in a predefined configuration document called the Conceptual description of KBM Activity;

m) Means for storing the configuration information for the deployment of said KBM activities, in a predefined configuration document called the Deployment description of KBM Activity;

n) Means for storing the configuration information of said KBM Workflow, in a predefined configuration document called the description of KBM WorkFlow;

o) Means for storing KBM rules in a predefined table called KBM rules table, wherein, the columns of KB rules table are inherited from KB System, and new columns comprising of Unique Rule id, Group rule id, Type of output, Type and name of color, effect rule, function handler class name, are added to support the functionality of the KBM system;

p) Means for storing the structural rules in a predefined table called the structural rules table;

q) Means for storing the Collaboration objects in memory in partitions called datasets, in a data structure called the CObject structure;

Said KBM rules are executed against said collaboration objects held in a table called O-Context of KB System, which now employs said CObject structure, to store a plurality of entity references partitioned as data sets;

r) Means for storing the effects of process structures on entities as functional and transformation colors;

s) Means for storing the configuration information of Macro Entities, in a predefined configuration document called the Macro Entity Description document;

t) Means for storing the execution status of kbm workflows, and their activities in a predefined table called KBM Workflow execution status table;

u) Means for storing the transformation of states of aspects of macro entities by activities, in a predefined table called Activity Switching table; and means for storing planning state and planning node as data structures in memory;

v) Means for storing the mapping of a higher level process structure to lower level process structures, in a table called the Process Structure table;

w) Means for receiving as input, a request for executing a KBM Workflow, wherein a queue entry in a predefined queue called KBM Workflow queue, is created by an online or batch program, which is initiated by the end user;

x) Means for storing Activity failure records in a queue specified by the end user in the configuration files of the said Activity, when the activity reaches a special state, for which the queue is configured.

16. The system of claim 15, further comprises:
a) Means for parsing the various configuration files;
b) Means for invoking a predefined KBM runtime software module, called KBM Workflow coordinator, whenever a new entry is made in the said KBM Workflow queue, by message queuing software systems;
c) Means for invoking a user module, whenever a new entry is made in a queue configured to receive "Activity Failure Records", by message queuing software systems.

17. The system of claim 15, further comprises:
a) Means for implementing the method recited in claim
b) Means for implementing the method recited in claim 13.

* * * * *